US012789178B2

(12) United States Patent
Sahu et al.

(10) Patent No.: US 12,789,178 B2
(45) Date of Patent: Nov. 10, 2026

(54) STYRENIC FLUOROPOLYMERS AND METHODS FOR MAKING AND USING SAME

(71) Applicant: UNIVERSITY OF LOUISIANA LAFAYETTE, Lafayette, LA (US)

(72) Inventors: Sushant P. Sahu, Lafayette, LA (US); Yu Wang, Lafayette, LA (US)

(73) Assignee: UNIVERSITY OF LOUISIANA AT LAFAYETTE, Lafayette, LA (US)

( * ) Notice: Subject to any disclaimer, the term of this patent is extended or adjusted under 35 U.S.C. 154(b) by 455 days.

(21) Appl. No.: 18/134,676

(22) Filed: Apr. 14, 2023

(65) Prior Publication Data

US 2024/0307863 A1 Sep. 19, 2024

Related U.S. Application Data

(60) Provisional application No. 63/330,865, filed on Apr. 14, 2022.

(51) Int. Cl.
*B01J 41/14* (2006.01)
*C02F 1/42* (2023.01)
(Continued)

(52) U.S. Cl.
CPC ................. *B01J 41/14* (2013.01); *C02F 1/42* (2013.01); *C08F 293/00* (2013.01); (Continued)

(58) Field of Classification Search
CPC ....... B01J 41/14; C02F 1/42; C02F 2001/422; C02F 2101/36; C08F 293/00; C08G 65/323
See application file for complete search history.

(56) References Cited

PUBLICATIONS

Sahu, Sushant P. et al, "Polystyrene-based fluorinated ionic receptor for selective remoal of perfluoroalkyl contaminants from water" , Reactive and Functional Polymers 207, pp. 1-9, 2025.*

* cited by examiner

*Primary Examiner* — In Suk C Bullock
(74) *Attorney, Agent, or Firm* — Ted M. Anthony; Sarah B. Dupont

(57) ABSTRACT

Provided herein are styrenic fluoropolymers comprising the formula:

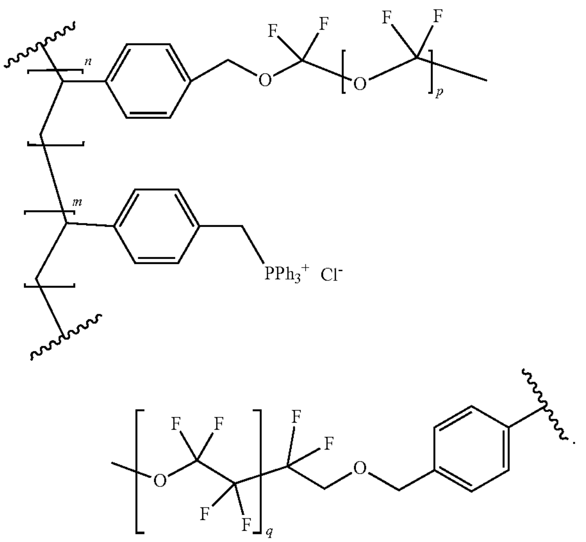

Also provided are methods for making the styrenic fluoropolymers and using them as anion exchange resin to at
(Continued)

least partially separate perfluoro alkyl and polyfluoro alkyl substances (PFAS) from mixtures.

7 Claims, 25 Drawing Sheets

(51) Int. Cl.
*C08F 293/00* (2006.01)
*C08G 65/323* (2006.01)
*C02F 101/36* (2006.01)

(52) U.S. Cl.
CPC ...... *C08G 65/323* (2013.01); *C02F 2001/422* (2013.01); *C02F 2101/36* (2013.01)

STYRENIC FLUOROPOLYMERS AND METHODS FOR MAKING AND USING SAME

CROSS-REFERENCE TO RELATED APPLICATIONS

This patent application claims the benefit of and priority to U.S. Provisional Application No. 63/330,864 entitled, "Styrenic Fluoropolymers and Methods For Making and Using Same" filed on Apr. 14, 2022, which is hereby incorporated by reference in its entirety.

BACKGROUND

Field

Disclosed herein are compositions that include styrenic fluoropolymers. In one specific embodiment, the styrenic fluoropolymers can be made by contacting a styrene substituted perfluoropolyether with triphenyl-4-vinyl benzyl phosphonium chloride. In another specific embodiment, the styrenic fluoropolymers can be used as an anionic exchange resin to separate perfluoro alkyl and polyfluoro alkyl (PFAS) substances from mixtures.

Description of Related Art

Perfluoro alkyl and polyfluoro alkyl (PFAS) substances are a class of man-made compounds that are used to manufacture consumer products and industrial chemicals. PFAS are used as surfactants and surface coatings in consumer products, such as fire-fighting foams, non-stick cookware, textiles, carpet, paper, upholstery, packaging, and lubricants. The utility of PFAS is due to their exceptional stability and favorable physicochemical properties. However, the characteristics that make PFAS beneficial for these applications can also prevent them from readily degrading in the environment and make them challenging to remediate. For example, PFAS have carbon-fluorine bonds, which among the strongest bonds in nature and are resistant to breakdown. Temperatures above 600° C., are necessary to effectively breakdown certain PFAS compounds. Additionally, PFAS are highly water soluble and have low volatility, which can result in large, dilute plumes if they are released into the environment.

Toxicity concerns of PFAS in human and living systems due to their bioaccumulation are well-known. These risks include cancer, estrogen disruption, protein misfolding, immune deficiency, neurotoxicity, and birth defects. For example, laboratory PFAS exposure studies on animals have shown problems with growth and development, reproduction, and liver damage. In 2016, the U.S. Environmental Protection Agency (EPA) issued the following health advisories (HAs) for perfluorooctanesulfonic acid (PFOS) and perfluorooctanoic acid (PFOA): 0.07 μg/L for both the individual constituents and the sum of PFOS and PFOA concentrations, respectively. However, current water treatment systems and methods to remove PFAS from water have limited effectiveness. For example, activated carbon adsorption systems and methods to remove PFAS from water have shown to be somewhat effective on the longer chain PFAS, but have difficulty in removing branched and shorter chain compounds. Other conventional methods have been tried, such as biological treatment, air stripping, reverse osmosis, and advanced oxidation; however, these techniques also have limited abilities at removing PFAS from water.

Consequently, there is need for new compositions that can be used for the selective separation of PFAS from mixtures and the environment.

SUMMARY

Disclosed herein are styrenic fluoropolymers of a Formula 1:

Formula 1

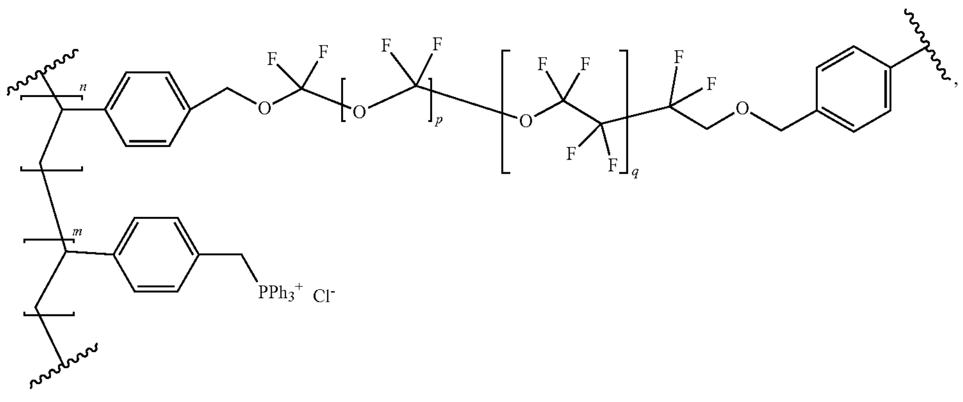

styrenic fluropolymer where m, n, p, and q can be independently selected from an integer in the range of 1 to 1,000.

In a specific embodiment, a method of making styrenic fluoropolymers can include contacting a perfluoropolyether-diol of Formula 2:

Formula 2

$$HO-(CH_2CH_2O)_s-CH_2-CF_2-O-(CF_2-CF_2O)_t-(CF_2O)_v-CF_2-CH_2-O-(CH_2-CH_2O)_w-OH,$$

where, s, t, v, and w are independently selected from an integer from 1 to 1000, with a 4-vinyl benzyl chloride to make a styrene substituted perfluoropolyether of Formula 3:

Formula 3

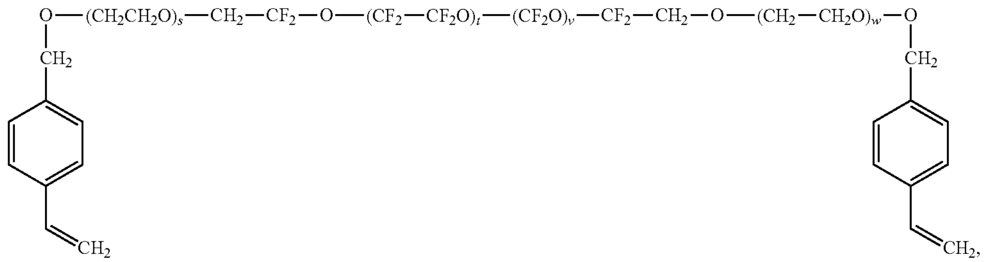

wherein, s, t, v, and w are independently selected from an integer from 1 to 1000.

The method can further include contacting triphenyl phosphene with 4-vinyl benzyl chloride to make a triphenyl-4-vinyl benzyl phosphonium chloride. Then, contacting the triphenyl-4-vinyl benzyl phosphonium chloride with the styrene substituted perfluoropolyether of Formula 3 to make a styrenic fluoropolymer comprising a Formula 1.

In another specific embodiment, a method for at least partially removing perfluoroalkyl or poly fluoroalkyl substances from a mixture can include contacting a mixture containing one or more perfluoroalkyl or polyfluoroalkyl substances with a styrenic fluoropolymers of Formula 1 and separating the styrenic fluoropolymer from the mixture after the content of the one or more perfluoroalkyl or poly fluoroalkyl substances has been reduced.

BRIEF DESCRIPTION OF THE DRAWINGS

The present disclosure can be better understood by referring to the following drawings. The drawings constitute a part of this specification and include exemplary embodiments of the styrenic fluoropolymers, which may be embodied in various forms.

DETAILED DESCRIPTION

Figure 1:
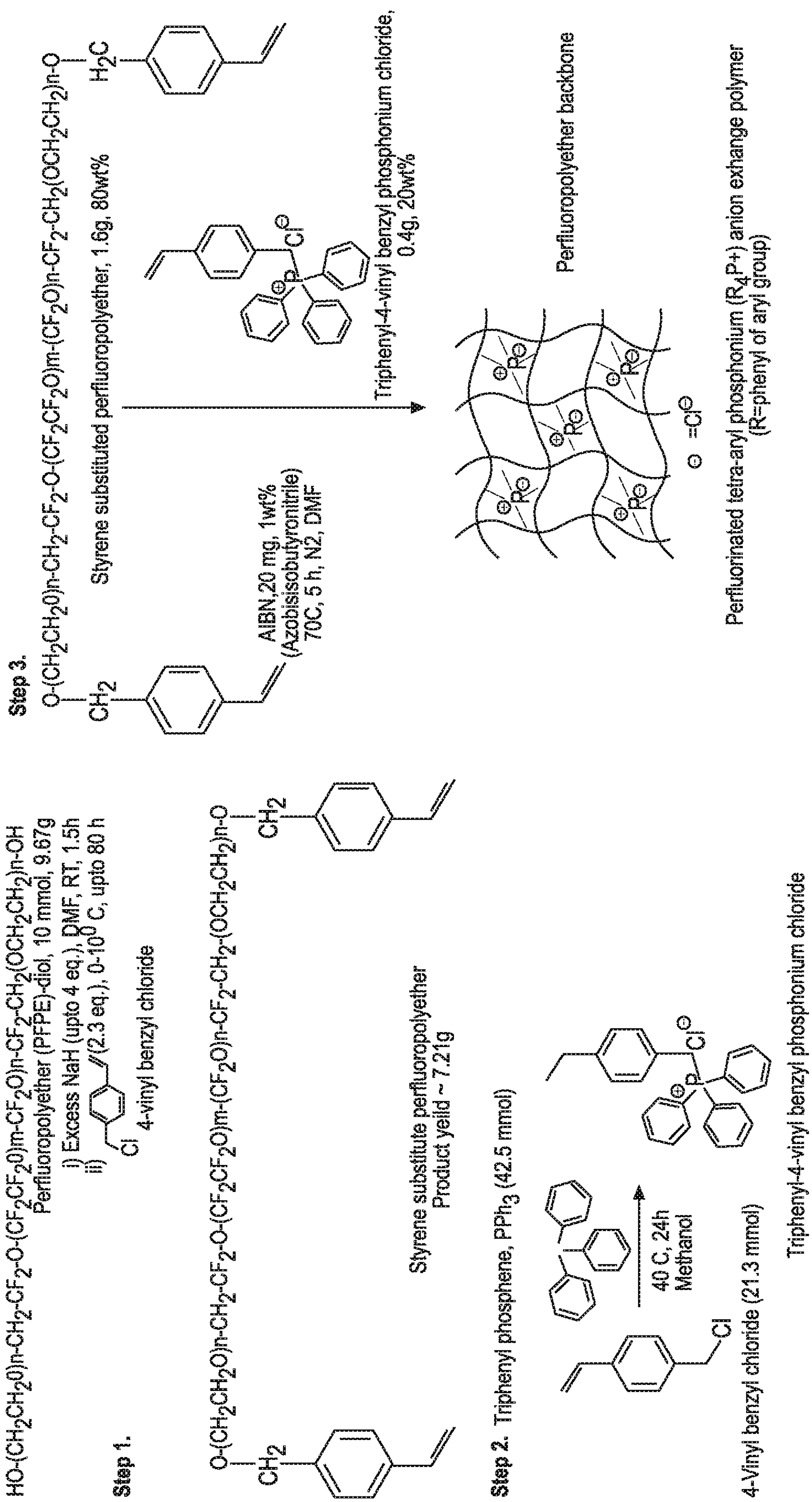
FIG. 1 shows an embodiment of a reaction scheme for making the styrenic fluoropolymers.

Per- and polyfluoroalkyl substances (PFAS) and their high molecular weight polymer analogs (e.g., polytetrafluoroethylene) are also dubbed as "Forever Chemicals" due to their exceptional stability imparted by strong C—F bonds and these fluorinated surfactants possess excellent physicochemical properties for their use in consumer products.[1-8] For example, surfactant-like characteristics of PFAS coatings containing PFOA and PFOS have enabled their growing utilization in common consumer goods (e.g., nonstick cookware, grease-resistant food packaging, waterproof clothing, carpet, fire-fighting foams, lubricants, etc.) that make up our everyday life. This has unfortunately led to their continuous disposal into the environment posing serious remediation challenges.[9,10] Toxicity concerns of synthetic PFAS in human and living systems due to their bioaccumulation are well-documented which included cancer, [11] estrogen disruption, [12] protein misfolding,[13] birth defects in children, [14,15] and other health risks in humans.[16-18] These challenges have incited renewed interests in the investigation of PFAS for sensing,[19,20] separation[21-25] and destructive sequestration technologies.[26-31] Among this large family of PFAS compounds, US EPA has set health advisory limit of 70 ng/L for the total concentration of perfluorooctanoic acid (PFOA) and perfluorooctane sulfonic acid (PFOS) in drinking water[32,33] while European health commission has set the health advisory limit of about 100-500 ng/L of these combined PFAS in drinking water.[34,35]

Traditionally most common separation methods for removing PFAS involve the use of granular activated carbon.[36-38] ion exchange resins[38,39] and inorganic materials[40-42] which however suffer from modest treatment volumes before saturation, low affinity for long- and short chain PFASs and limited selectivity for PFASs because of strong adsorption affinity for other organic or inorganic co-contaminants in water. These limitations motivated researchers to design novel adsorbents such as cross-linked b-cyclodextrin polymers.[43-45] ionic fluorogels.[22,46-48] metal-organic frameworks[49,50] and covalent organic frameworks[23,51] in remediation of PFAS. Among most notable works, cross-linked b-cyclodextrin based polymers containing tetra alkyl ammonium cations demonstrated highly efficient removal of PFAS at ultralow concentrations.[43-45] However, in addition to expensive cross-linkers, limited selectivity is observed in the presence of other organic micropollutants/drugs considering the hydrophobic cavity of b-cyclodextrin based polymers which are also widely employed as a drug carrier to deliver hydrophobic drugs into cells.[43] To address selective PFAS removal from waters. Kumarasamy et. al reported the design of ionic fluorogels composed of alkyl ammonium bearing perfluoropolyether backbone with methacrylate chain-end functionality which showed excellent selectivity in the removal of a wide range of PFASs mixture from deionized and river waters.[22] However, the presence of the ester groups at the methacrylate chain ends in the polymers is susceptible to nucleophilic attack enabling the potential polymer degradation in a basic environment and in the presence of strong nucleophiles.[22] In addition, it is postulated that phosphonium based organic cations possess excellent thermal stability and ionic conductivity in reference to their corresponding alkyl ammonium counterparts considering the larger size and lower electronegativity of the central phosphorous atom. P bearing cations in reference to the central nitrogen atom. N bearing cation moieties.[52,53] Therefore, the objective of ionic fluoropolymer design is to introduce highly stable polystyrene functionality into the polymer backbone along with phosphonium cations to impart much higher performance and durability of fluoropolymer in selective removal of perfluoroalkyl species from diverse water matrices including real environmental water matrices.

Using design concepts of electrostatic and selective fluorophilic interactions C—F - - - F—C, rational design and application of styrene incorporated anion exchange fluoropolymer bearing phosphonium cations for selective separation of perfluoroalkyl substances (e.g., PFOA, PFOS, etc.) from waters at sub-ppb levels have been made. This molecular design is achieved by leveraging fundamental principles of electrostatic interactions for targeted anion exchange with the ionic fluoropolymer which is facilitated by favorable non-covalent forces of interactions with fluorophilic groups in the polymer backbone. A class of quaternary tetra-aryl phosphonium bearing styrene based perfluorinated anion exchange polymer is synthesized via multi-step nucleophilic substitution reactions of di-alcohol terminated perfluoropolyether compound in presence of sodium hydride and 4-vinyl benzyl chloride to incorporate styrene functionality at the chain end to impart critical stability. This is followed by a thermally induced radical copolymerization reaction between the styrene functionalized perfluorinated monomer with triphenyl 4-vinyl benzyl phosphonium chloride monomer prepared separately and AIBN to obtain the styrene-based crosslinked ionic fluoropolymer network prepared in the chloride form. The obtained fluoropolymer is structurally characterized and confirmed using NMR, IR spectroscopy and MALDI spectrometry analyses. The polymer is demonstrated for the treatment of model PFAS compounds (e.g., PFOA and PFOS) in their removal from water at both high (mM) and ultralow concentrations (mg/L) in different water matrices and lake water containing various inorganic constituents and dissolved organic co-contaminants like phenols. The results revealed that fluoropolymer selectively removes PFOA and PFOS with excellent removal efficiency (>90% removal efficiency) through irreversible anion exchange aided by strong van der Waal forces of interaction with fluorine rich backbone of the polymer. The selectivity of ionic fluoropolymer is further delineated using phenol as a model organic contaminant in water by employing pure hydrocarbon-based ionic polymer without fluorophilic component and neutral perfluoropolyether compound. This study highlighted the requirement for anion-exchange sites (prepared in chloride form) within perfluorinated backbones and side chains with quaternary phosphonium groups to promote the anion exchange process for PFOA or PFOS anions which is further assisted by favorable non-covalent interactions between the fluorophilic groups of the polymer and the perfluorinated anionic species (PFOA and PFOS) in water.

The styrenic fluoropolymers can include compounds of Formula 1:

Formula 1

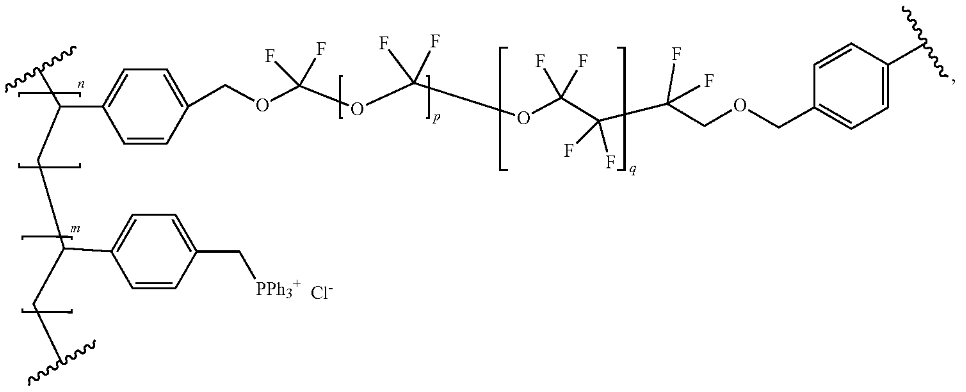

styrenic fluropolymer where m, n, p, and q can be independently selected from an integer greater than 1, greater than 2, greater than 5, greater than 10, greater than 20, greater than 50, greater than 100, greater than 200, or greater than 500. For example, the m, n, p, and q can be independently selected from an integer in the range of 1 to 1,000, 1 to 800, 1 to 600, 1 to 500, 1 to 200, 1 to 100, 10 to 100, 15 to 80, 20 to 200, 17 to 50, 34 to 112, 9 to 46, or 5 to 20. In another example, the m, n, p, and q can be independently selected from an integer 1, 2, 3, 4, 5, 6, 7, 8, and 9. The styrenic fluoropolymer of Formula 1 can include a perfluorinated tetra-aryl phosphonium, $R_4P^+$, where R is a phenyl or aryl group.

The styrenic fluoropolymers can have a weight-average molar mass (Mw) that varies widely. For example, the styrenic fluoropolymers can have a weight-average molar mass from a low of about 300 g/mol, about 3,000 g/mol, or about 10,000 g/mol, to a high of about 80,000 g/mol, about 100,000 g/mol, or about 200,000 g/mol. In another example, styrenic fluoropolymers can have a weight-average molecular weight that is less than 8,000 g/mol, less than 5,000 g/mol, or less than 1,000 g/mol. In another example, the styrenic fluoropolymers can have a weight-average molar mass from about 300 g/mol to about 200,000 g/mol, about 300 g/mol to about 1,200 g/mol, about 1,000 g/mol to about 10,000 g/mol, about 2,000 g/mol to about 50,000 g/mol, about 100,000 g/mol to about 200,000 g/mol. The molar mass of the styrenic fluoropolymers can be measured by gel permeation chromatography with tri-detectors.

The styrenic fluoropolymers can have a number-average molar mass (Mn) that varies widely. For example, the styrenic fluoropolymers can have a number-average molar mass from a low of about 300 g/mol, about 1,000 g/mol, or about 3,000 g/mol, to a high of about 80,000 g/mol, about 100,000 g/mol, or about 200,000 g/mol. In another example, styrenic fluoropolymers can have a number-average molar mass that is less than 500 g/mol, less than 6,000 g/mol, or less than 10,000 g/mol. In another example, the styrenic fluoropolymers can have a number-average molar mass from about 300 g/mol to about 2,000 g/mol, about 3,000 g/mol to about 20,000 g/mol, about 2,000 g/mol to about 8,000 g/mol, about 40,000 g/mol to about 80,000 g/mol, about 100,000 g/mol to about 200,000 g/mol.

The styrenic fluoropolymers of Formula 1 can be used as an anion exchange resin for at least partial and selective removal of PFAS substances by leveraging fundamental concepts of ionic and non-covalent interactions. The styrenic fluoropolymers can include, but are not limited to, a quaternary tetra aryl phosphonium bearing styrene substituted fluorinated anion exchange resin. The structural characteristics with crosslinked polystyrene network containing phosphonium ion units can be superior in terms of polymer stability and PFAS removal efficiency in reference to other counterparts containing tetra-alkyl ammonium units in a fluorinated polymer. For example, the styrenic fluoropolymer can have a removal efficiency of greater than 80% of perfluorooctanoic acid and perfluorooctane sulfonic acid at environmentally relevant concentrations.

In an embodiment, the synthesis of the styrenic fluoropolymers can include, but is not limited to: a first reaction for the synthesis of styrene functionalized perfluorinated monomer,

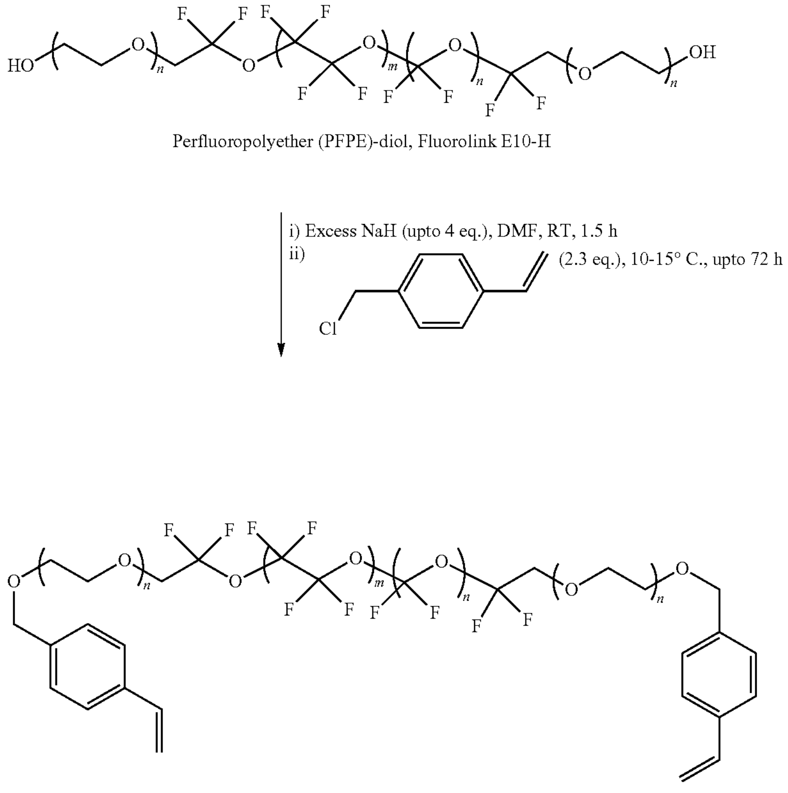

Perfluoropolyether (PFPE)-diol, Fluorolink E10-H

Styrene substituted perfluoropolyether compound (perfluorinated monomer)

a second reaction for the synthesis of triphenyl-4-benzyl phosphonium chloride monomer,

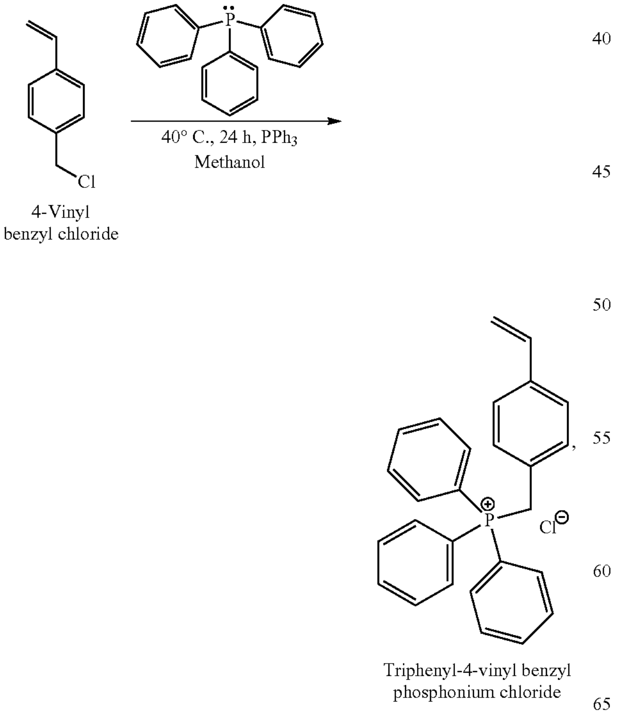

4-Vinyl benzyl chloride

Triphenyl-4-vinyl benzyl phosphonium chloride and a third reaction, a polymerization reaction, to make styrenic fluoropolymers.

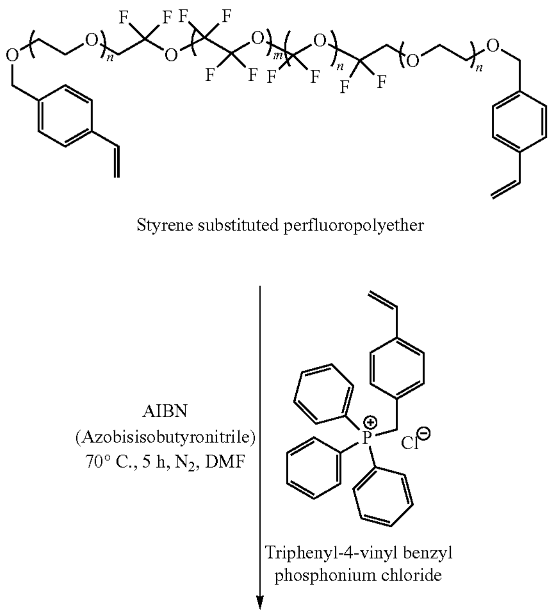

Styrene substituted perfluoropolyether

Triphenyl-4-vinyl benzyl phosphonium chloride

-continued

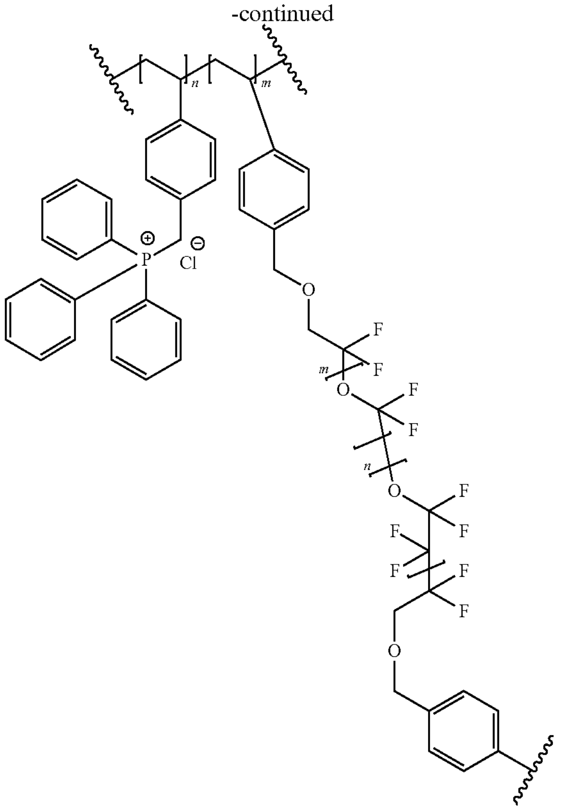

Perfluorinated tetra-aryl phosphonium ($R_4P^+$) anion exchnage polymer (Ionic Fluoropolymer) (R = phenyl or aryl group)

The subscripts m and n can be an integer greater than 1, greater than 2, greater than 5, greater than 10, greater than 20, greater than 50, greater than 100, greater than 200, or greater than 500. For example subscripts m and n can be independently selected from an integer in the range of 1 to 1,000, 1 to 800, 1 to 600, 1 to 500, 1 to 200, 1 to 100, 10 to 100, 15 to 80, 20 to 200, 17 to 50, 34 to 112, 9 to 46, or 5 to 20.

In another embodiment, the synthesis of the styrenic fluoropolymers can include, but is not limited to: a reaction scheme depicted in FIG. 1. The method of making a styrenic fluoropolymer can include contacting a perfluoropolyether-diol of Formula 2 with a 4-vinyl benzyl chloride to make a styrene substituted perfluoropolyether of Formula 3 in a Reaction 1. The subscripts s, t, v, and w in Formula 2 and Formula 3 can be an integer greater than 1, greater than 2, greater than 5, greater than 10, greater than 20, greater than 50, greater than 100, greater than 200, or greater than 500. For example, s, t, v, and w can be independently selected from an integer in the range of 1 to 1,000, 1 to 800, 1 to 600, 1 to 500, 1 to 200, 1 to 100, 10 to 100, 15 to 80, 20 to 200, 17 to 50, 34 to 112, 9 to 46, or 5 to 20. The perfluoropolyether-diol of Formula 1 can be contacted with the 4-vinyl benzyl chloride in a Mixture 1. Mixture 1 can include, but is not limited to, a base and a solvent.

Reaction 1

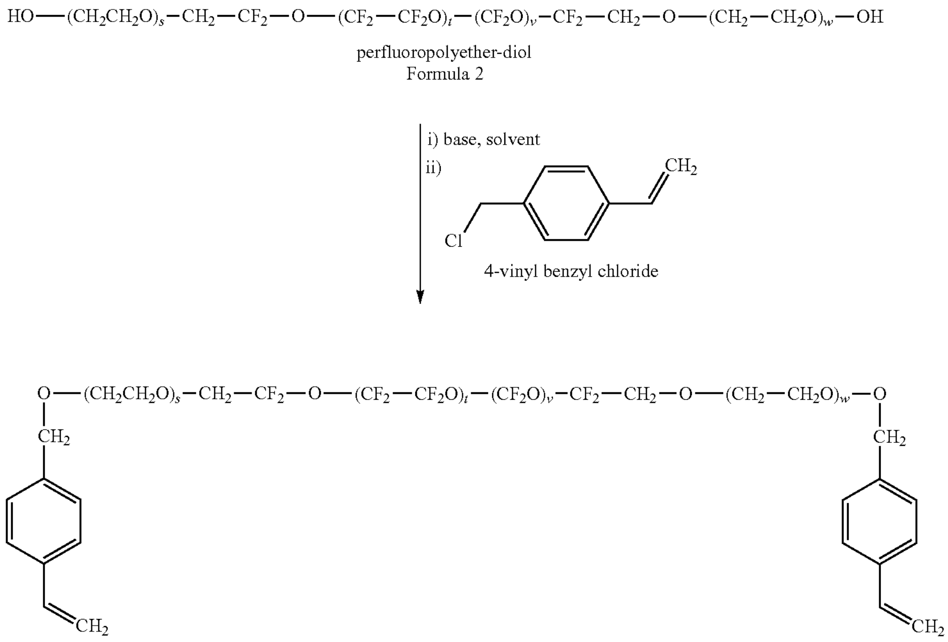

styrene substituted perfluoroether
Formula 3

A wide range of equivalents of 4-vinyl benzyl chloride can be used to contact one equivalent of perfluoropolyether-diol of Formula 1. For example, a low of about 0.5 equivalents, about 1 equivalent, about 1.5 equivalents of 4-vinyl benzyl chloride can be contacted with one equivalent of perfluoropolyether-diol of Formula 1, to a high of about 5 equivalents, 10 equivalents or about 50 equivalents of 4-vinyl benzyl chloride can be contacted with one equivalent of perfluoropolyether-diol of Formula 1. In another example, about 0.5 equivalents to about 1 equivalent of 4-vinyl benzyl chloride can be contacted with one equivalent of perfluoropolyether-diol of Formula 1, about 1 equivalents to about 2 equivalent of 4-vinyl benzyl chloride can be contacted with one equivalent of perfluoropolyether-diol of Formula 1, about 2 equivalents to about 2.5 equivalent of 4-vinyl benzyl chloride can be contacted with one equivalent of perfluoropolyether-diol of Formula 1, or about 2.2 equivalents to about 3 equivalents of 4-vinyl benzyl chloride can be contacted with one equivalent of perfluoropolyether-diol of Formula 1.

A wide range of molar ratios of 4-vinyl benzyl chloride can be contacted 1 mol of perfluoropolyether-diol of Formula 1. For example, a low of about 0.5 mols, about 1 mol, or about 1.5 moles of 4-vinyl benzyl chloride can be contacted with 1 mol of perfluoropolyether-diol of Formula 1, to a high of about 5 mols, 10 mols or about 50 mols of 4-vinyl benzyl chloride can be contacted with 1 mol of perfluoropolyether-diol of Formula 1. In another example, about 0.5 mols to about 1 mol of 4-vinyl benzyl chloride can be contacted with 1 mol of perfluoropolyether-diol of Formula 1, about 1 mol to about 2 moles of 4-vinyl benzyl chloride can be contacted with 1 mole of perfluoropolyether-diol of Formula 1, about 2 mols to about 2.5 mols of 4-vinyl benzyl chloride can be contacted with 1 mol of perfluoropolyether-diol of Formula 1, or about 2.2 mols to about 3 mols of 4-vinyl benzyl chloride can be contacted with 1 mol of perfluoropolyether-diol of Formula 1.

Perfluoropolyether-diol of Formula 1 can be added to Mixture 1 in a weight percent from about 10 wt % to about 90 wt %, based on the total weight of Mixture 1 or based on the total weight perfluoropolyether-diol of Formula 1, 4-vinyl benzyl chloride, base, and solvent.

4-Vinyl benzyl chloride can be added to Mixture 1 in a weight percent of about from about 10 wt % to about 90 wt %, based on the total weight of Mixture 1 or based on the total weight perfluoropolyether-diol of Formula 1, 4-vinyl benzyl chloride, base, and solvent.

The solvents for Mixture 1 can include, but is not limited to: acetic acid, acetone, acetonitrile, benzene, 1-butanol, 2-butanol, 2-butanone, t-butyl alcohol, carbon tetrachloride, chlorobenzene, chloroform, cyclohexane, 1,2-dichloroethane diethylene glycol diethyl ether, diglyme diethylene glycol dimethyl ether), N,N-dimethylformamide (DMF), 1,2-dimethoxy-ethane (glyme, DME), dimethyl sulfoxide (DMSO), 1,4-dioxane, ethanol, ethyl acetate, ethylene glycol, glycerin, heptane, hexamethylphosphoramide (HMPA), hexamethylphosphorous triamide (HMPT), hexane, methanol, methyl t-butyl ether (MTBE), methylene chloride, N-methyl-2-pyrrolidinone (NMP), nitromethane, pentane, petroleum ether (ligroine), 1-propanol, 2-propanol, pyridine, tetrahydrofuran (THF), toluene, triethyl amine, triethyl amine, water, o-xylene, m-xylene, and p-xylene.

The base of Mixture 1 can include, but is not limited to, sodium hydride, ethoxide ion, butyl lithium (n-BuLi), lithium diisopropylamide ($C_6H_{14}LiN$), lithium diethylamide (LDEA), sodium amide ($NaNH_2$), sodium hydride (NaH), lithium bis(trimethylsilyl)amide, $((CH_3)_3Si)_2NLi$, lithium hydroxide (LiOH), (NaOH), potassium hydroxide (KOH), rubidium hydroxide (RbOH), cesium hydroxide (CsOH), calcium hydroxide ($Ca(OH)_2$), strontium hydroxide $Sr(OH)_2$, and barium hydroxide ($Ba(OH)_2$).

Reaction 1 or Mixture 1 can be heated to a temperature from a low of about 0° C., about 15° C., and about 25° C., to a high of about 35° C., about 65° C., and about 100° C. For example, Mixture 1 can be heated to a temperature between about 25° C., to about 28° C., 25° C. to about 35° C., or 30° C., to about 45° C., 43° C., to about 78° C. In another example, Mixture 1 can be at room temperature.

Reaction 1 or Mixture 1 can be reacted and/or stirred for a Reaction Time 1. Reaction Time 1 can be from a short of about 15 s, about 120 s, or about 300 s, to a long of about 24 h, about 96 h, or about 1 one week. For example, Reaction Time 1 can be from about 1 min to about 15 min, about 5 min to about 45 min, about 60 min to about 2 h, about 35 min to about 80 h, about 1 h to about 5 h, about 5 h to about 50 h, about 1 min to about 15 min, about 24 h to about 96 h, and about 40 h to about 1 week.

Reaction 1 or Mixture 1 can be reacted and/or stirred in an open reaction container or a closed container. Reaction 1 or Mixture 1 can be reacted and/or stirred under a vacuum. Reaction 1 or Mixture 1 can be reacted and/or stirred under an inert atmosphere, such as He, Ne, Ar, $N_2$, Ar.

In an embodiment, the method of making a styrenic fluoropolymer can further include contacting triphenyl phosphene, $PPh_3$, with 4-vinyl benzyl chloride to make a triphenyl-4-vinyl benzyl phosphonium chloride in a Reaction 2. The triphenyl phosphene, $PPh_3$, can be contacted with 4-vinyl benzyl chloride in a Mixture 2. Mixture 2 can also include, but is not limited to, a base and a solvent.

Reaction 2

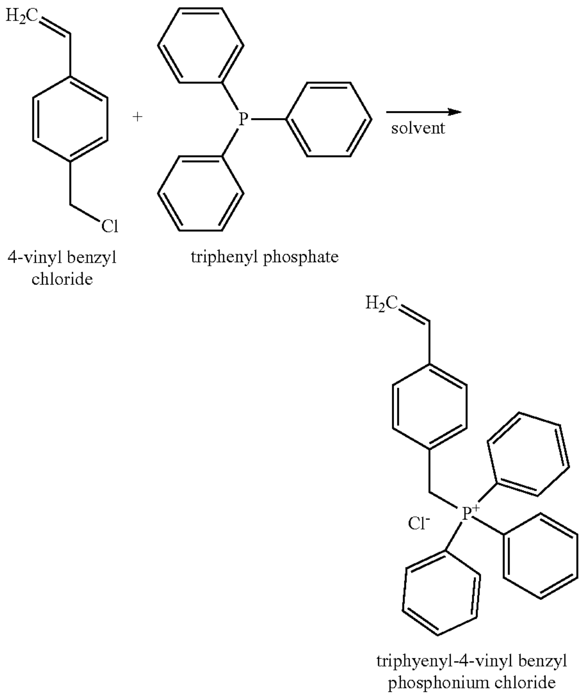

4-vinyl benzyl chloride triphenyl phosphate triphyenyl-4-vinyl benzyl phosphonium chloride A wide range of equivalents of triphenyl phosphene can be used to contact one equivalent of 4-vinyl benzyl chloride. For example, a low of about 0.5 equivalents, about 1 equivalent, about 1.5 equivalents of triphenyl phosphene can be contacted with one equivalent of 4-vinyl benzyl chloride, to a high of about 5 equivalents, 10 equivalents or about 50 equivalents of triphenyl phosphene can be contacted with one equivalent of 4-vinyl benzyl chloride. In another example, about 0.5 equivalents to about 1 equivalent of triphenyl phosphene can be contacted with one equivalent of 4-vinyl benzyl chloride, about 1 equivalents to about 2 equivalent of triphenyl phosphene can be contacted with one equivalent of 4-vinyl benzyl chloride, about 2 equivalents to about 2.5 equivalent of triphenyl phosphene can be contacted with one equivalent of 4-vinyl benzyl chloride, or about 2.2 equivalents to about 3 equivalent of triphenyl phosphene can be contacted with one equivalent of 4-vinyl benzyl chloride.

A wide range of molar ratios of triphenyl phosphene can be contacted 1 mol of 4-vinyl benzyl chloride. For example, a low of about 0.5 mols, about 1 mol, or about 1.5 moles of triphenyl phosphene can be contacted with 1 mol of 4-vinyl benzyl chloride, to a high of about 5 mols, 10 mols or about 50 mols of triphenyl phosphene can be contacted with 1 mol of 4-vinyl benzyl chloride. In another example, about 0.5 mols to about 1 mol of triphenyl phosphene can be contacted with 1 mol of 4-vinyl benzyl chloride, about 1 mol to about 2 moles of triphenyl phosphene can be contacted with 1 mole of 4-vinyl benzyl chloride, about 2 mols to about 2.5 mols of triphenyl phosphene can be contacted with 1 mol of 4-vinyl benzyl chloride, or about 2.2 mols to about 3 mols of triphenyl phosphene can be contacted with 1 mol of 4-vinyl benzyl chloride.

The triphenyl phosphene can be added to Mixture 2 in a weight percent from about 10 wt % to about 90 wt %, based on the total weight of Mixture 2 or based on the total weight triphenyl phosphene, 4-vinyl benzyl chloride, base, and solvent.

The 4-vinyl benzyl chloride can be added to Mixture 2 in a weight percent of from about 10 wt % to about 90 wt %, based on the total weight of Mixture 2 or based on the total weight triphenyl phosphene, 4-vinyl benzyl chloride, base, and solvent.

The solvents for Mixture 2 can include, but is not limited to: acetic acid, acetone, acetonitrile, benzene, 1-butanol, 2-butanol, 2-butanone, t-butyl alcohol, carbon tetrachloride, chlorobenzene, chloroform, cyclohexane, 1,2-dichloroethane diethylene glycol diethyl ether, diglyme diethylene glycol dimethyl ether, N,N-dimethylformamide, 1,2-dimethoxy-ethane, dimethyl sulfoxide, 1,4-dioxane, ethanol, ethyl acetate, ethylene glycol, glycerin, heptane, hexamethylphosphoramide, hexamethylphosphorous triamide, hexane, methanol, methyl t-butyl ether, methylene chloride, N-methyl-2-pyrrolidinone, nitromethane, pentane, petroleum ether, 1-propanol, 2-propanol, pyridine, tetrahydrofuran, toluene, triethyl amine, triethyl amine, water, o-xylene, m-xylene, and p-xylene.

Reaction 2 or Mixture 2 can be heated to a temperature from a low of about 0° C., about 15° C., and about 25° C., to a high of about 35° C., about 65° C., and about 100° C. For example, Mixture 2 can be at room temperature. In another example, Mixture 2 can be heated to a temperature between about 25° C., to about 28° C., 25° C., to about 35° C., or 30° C., to about 45° C., 43° C., to about 78° C.

Reaction 2 or Mixture 2 can be reacted and/or stirred for a Reaction Time 2. Reaction Time 2 can be from a short of about 15 s, about 120 s, or about 300 s, to a long of about 24 h, about 96 h, or about 1 one week. For example, Reaction Time 2 can be from about 1 min to about 15 min, about 5 min to about 45 min, about 60 min to about 2 h, about 35 min to about 80 h, about 1 h to about 5 h, about 5 h to about 50 h, about 1 min to about 15 min, about 24 h to about 96 h, and about 40 h to about 1 week.

Reaction 2 or Mixture 2 can be reacted and/or stirred in an open reaction container or a closed container. Reaction 2 or Mixture 2 can be reacted and/or stirred under a vacuum. Reaction 2 or Mixture 2 can be reacted and/or stirred under an inert atmosphere, such as He, Ne, Ar, $N_2$, Ar.

In an embodiment, the method of making a styrenic fluoropolymer of Formula 1 can further include contacting styrene substituted perfluoropolyether of Formula 2 with the triphenyl-4-vinyl benzyl phosphonium chloride to make a styrenic fluoropolymer of Formula 1 in a Reaction 3. The styrene substituted perfluoropolyether of Formula 2 can be contacted with the triphenyl-4-vinyl benzyl phosphonium chloride in a Mixture 3. Mixture 3 can also include, but is not limited to, a radical initiator and a solvent.

Reaction 3

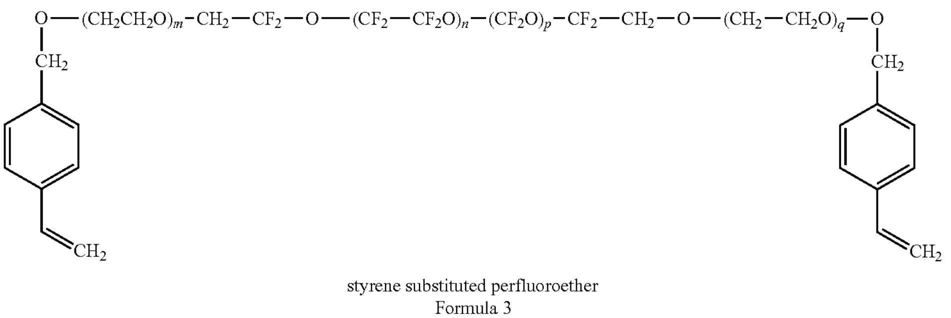

styrene substituted perfluoroether
Formula 3

+

-continued

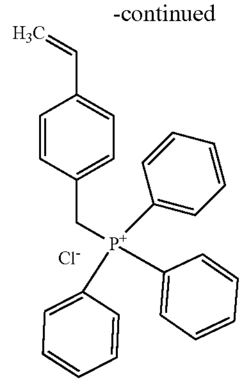

triphyenyl-4-vinyl benzyl phosphonium chloride

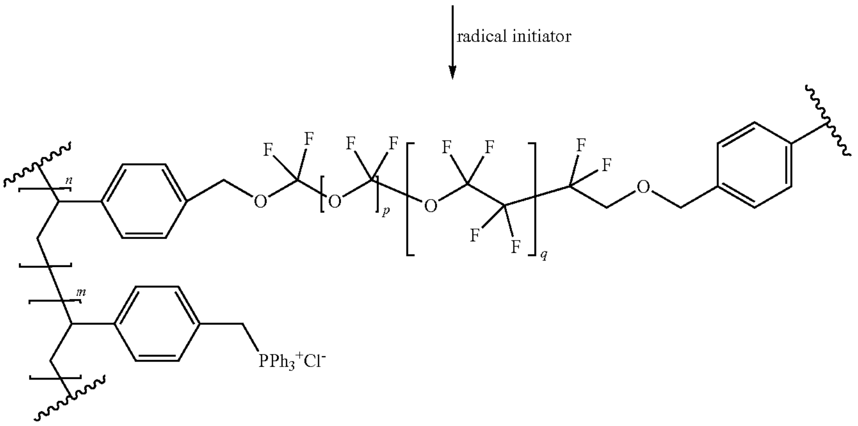

styrenic fluoropolymer
Formula 1

A wide range of molar ratios of styrene substituted perfluoropolyether of Formula 2 can be contacted 1 mol of triphenyl-4-vinyl benzyl phosphonium chloride. For example, a low of about 1 mol, about 5 mol, or about 10 moles of styrene substituted perfluoropolyether of Formula 2 can be contacted with 1 mol of triphenyl-4-vinyl benzyl phosphonium chloride, to a high of about 50 mols, 100 mols or about 500 mols of styrene substituted perfluoropolyether of Formula 2 can be contacted with 1 mol of 4 triphenyl-4-vinyl benzyl phosphonium chloride. In another example, about 0.5 mols to about 1 mol of styrene substituted perfluoropolyether of Formula 2 can be contacted with 1 mol of triphenyl-4-vinyl benzyl phosphonium chloride, about 1 mol to about 2 moles of styrene substituted perfluoropolyether of Formula 2 can be contacted with 1 mole of 4 triphenyl-4-vinyl benzyl phosphonium chloride, about 2 mols to about 2.5 mols of styrene substituted perfluoropolyether of Formula 2 can be contacted with 1 mol of 4 triphenyl-4-vinyl benzyl phosphonium chloride, or about 2.2 mols to about 3 mols of styrene substituted perfluoropolyether of Formula 2 can be contacted with 1 mol of triphenyl-4-vinyl benzyl phosphonium chloride.

A wide range of weight ratios of styrene substituted perfluoropolyether of Formula 2 can be contacted with triphenyl-4-vinyl benzyl phosphonium chloride. For example, about 90) wt % styrene substituted perfluoropolyether of Formula 2 can be contacted with about 10 wt % triphenyl-4-vinyl benzyl phosphonium chloride, about 80 wt % styrene substituted perfluoropolyether of Formula 2 can be contacted with about 20 wt % triphenyl-4-vinyl benzyl phosphonium chloride, about 70) wt % styrene substituted perfluoropolyether of Formula 2 can be contacted with about 30 wt % triphenyl-4-vinyl benzyl phosphonium chloride, or about 60) wt % styrene substituted perfluoropolyether of Formula 2 can be contacted with about 40 wt % triphenyl-4-vinyl benzyl phosphonium chloride.

The styrene substituted perfluoropolyether of Formula 2 can be added to Mixture 3 in a weight percent of from about 10 wt % to about 90 wt %, based on the total weight of Mixture 3 or based on the total weight of styrene substituted perfluoropolyether of Formula 2 triphenyl-4-vinyl benzyl phosphonium, chloride radical initiator, and a solvent.

The triphenyl-4-vinyl benzyl phosphonium chloride can be added to Mixture 3 in a weight percent of from about 10 wt % to about 90 wt %, based on the total weight of Mixture 3 or based on the total weight of styrene substituted perfluoropolyether of Formula 2 triphenyl-4-vinyl benzyl phosphonium, chloride radical initiator, and a solvent.

A radical initiator can be added to Mixture 3 to commence a free radical polymerization reaction. The free radical initiator can be activated thermally, photochemically, or through an oxidation-reduction reaction. The free radical initiator can be added to Mixture 3 in an amount of about 0.02 wt % to about 10 wt %, based on the total weight of the radical initiator, styrene substituted perfluoropolyether of Formula 2, and triphenyl-4-vinyl benzyl phosphonium chloride.

The radical initiators can include, but are not limited to: azo compounds, peroxides, hydroperoxides, and persulfates. Exemplary azo compounds include 2,2'-azobis[2-(2-imidazolin-2-yl)propane]dihydrochloride, 2,2'-azobis(2-amidinopropane)dihydrochloride, and 4,4'-azobis-(4-cyanopentanoic acid). Examples of commercially available thermal azo compound initiators include materials available from DuPont Specialty Chemical (Wilmington, Del.) under the "VAZO" trade designation such as VAZO 44, VAZO 56, and VAZO 68. Suitable peroxides and hydroperoxides can include acetyl peroxide, tert-butyl hydroperoxide, cumene hydroperoxide, and peroxyacetic acid. Suitable persulfates can include sodium persulfate and ammonium persulfate. The free radical initiator can also include ammonium or sodium persulfate, N,N,N',N'-tetramethylethylenediamine (TMEDA), ferrous ammonium sulfate: ferrous ammonium sulfate: cumene hydroperoxide and N,N-dimethylaniline.

The solvents for Mixture 3 can include, but is not limited to: acetic acid, acetone, acetonitrile, benzene, 1-butanol, 2-butanol, 2-butanone, t-butyl alcohol, carbon tetrachloride, chlorobenzene, chloroform, cyclohexane, 1,2-dichloroethane diethylene glycol diethyl ether, diglyme diethylene glycol dimethyl ether, N,N-dimethylformamide, 1,2-dimethoxy-ethane, dimethyl sulfoxide, 1,4-dioxane, ethanol, ethyl acetate, ethylene glycol, glycerin, heptane, hexamethylphosphoramide, hexamethylphosphorous triamide, hexane, isooctane, isododecane, methanol, methyl t-butyl ether, methylene chloride, N-methyl-2-pyrrolidinone, nitromethane, n-octane pentane, petroleum ether, 1-propanol, 2-propanol, pyridine, tetrahydrofuran, toluene, triethyl amine, triethyl amine, water, o-xylene, m-xylene, and p-xylene.

Reaction 3 or Mixture 3 can be heated to a temperature from a low of about 0° C., about 15° C., and about 25° C., to a high of about 35° C., about 65° C., and about 100° C. For example, Mixture 3 can be at room temperature. In another example, Mixture 1 can be heated to a temperature between about 25° C., to about 28° C., 25° C., to about 35° C., or 30° C., to about 45° C., 43° C., to about 78° C.

Reaction 3 or Mixture 3 can be reacted and/or stirred for a Reaction Time 3. Reaction Time 3 can be from a short of about 15 s, about 120 s, or about 300 s, to a long of about 24 h, about 96 h, or about 1 one week. For example, Reaction Time 3 can be from about 1 min to about 15 min, about 5 min to about 45 min, about 60 min to about 2 h, about 35 min to about 80 h, about 1 h to about 5 h, about 5 h to about 50 h, about 1 min to about 15 min, about 24 h to about 96 h, and about 40 h to about 1 week.

Reaction 3 or Mixture 3 can be reacted and/or stirred in an open reaction container or a closed container. Reaction 3 or Mixture 3 can be reacted and/or stirred under a vacuum. Reaction 3 or Mixture 3 can be reacted and/or stirred under an inert atmosphere, such as He, Ne, Ar, $N_2$, and Ar.

The Reactions and/or Mixutes for making the styrenic fluoropolymers and/or anion exchange resins can have a viscosity that varies widely. For example, the Reactions and/or Mixutes can have a viscosity from a low of about 100 cP, about 1,000 cP, or about 100,000 cP, to a high of about 250,000 cP, about 900,000 cP, or about 2,500,000 cP. In another example, the Reactions and/or Mixutes can have a viscosity from about 100 cP to about 2,500,000 cP, about 1,000 cP to about 250,000 cP, about 2,500 cP to about 250,000 cP, about 2,500 cP to about 200,000 cP, about 10,000 cP to about 100,000 cP, about 10,000 cP to about 50,000 cP, about 100,000 cP to about 250,000 cP, about 620,000 cP to about 850,000 cP, about 700,000 cP to about 750,000 cP, about 700,000 cP to about 800,000 cP, about 650,000 cP to about 855,000 cP, about 700,000 cP to about 800,000 cP, about 500,000 cP to about 1,000,000 cP, or about 500,000 cP to about 2,500,000 cP. The viscosity of the Reactions and/or Mixutes can be measured on a Brookfield viscosimeter. The viscosity of the Reactions and/or Mixutes can be measured at various temperatures, such as 25° C., 40° C., 60° C., and 100° C.

Once the free radical polymerization reaction has been initiated, the forming polymeric material can precipitate. The particles of the styrenic fluoropolymer of Formula 1 can be isolated, for example, by filtration or decantation. Suitable solvents for filtration or decantation can include example, water, acetone, methanol, ethanol, n-propanol, and iso-propanol), dimethylsulfoxide, dimethylformamide, N-methylpyrrolidone, and acetonitrile. The resulting styrenic fluoropolymer of Formula 1 can be dried using any suitable method. In some embodiment, the resulting styrenic fluoropolymer of Formula 1 can be fractionated using techniques such as screening, sedimentation, and classification.

In an embodiment, the styrenic fluoropolymers of Formula 1 can be used as an anion exchange resin and/or anion exchange polymer. In another embodiment, the styrenic fluoropolymers of Formula 1 can be added to and/or incorporated in an anion exchange resin and/or anion exchange polymer. The styrenic fluoropolymer of Formula 1 and/or anion exchange resin can adsorb various negatively charged materials, such as negatively charged PFAS, through interaction with the positively charged groups on the anion exchange resin and typically adsorb relatively small amount of material on the non-ionic portions of the anion exchange resin. This low non-specific adsorption can advantageously result in better separation or purification of negatively charged target materials from other materials in a sample.

The styrenic fluoropolymers and/or anion exchange resin can include irregular shape particles or can be spherical or roughly spherical particles. The particles can have an average size from small of about 1 mm, to a large of about 100 mm. For example, the particles can have an average size of at least 20 mm, at least 30 mm, at least 40 mm, at least 50 mm, or at least 60 mm. The particles usually have an average size no greater than 2,000 mm, no greater than 1,000 mm, no greater than 500 mm, or no greater than 200 mm. In some applications, the anion exchange resins have an average particle size of 10 to 2,000 mm, 20 to 2,000 mm, 20 to 500 mm, 50 to 500 mm, 20 to 200 mm, 50 to 200 mm, 50 to 100 mm, 50 to 75 mm, 50 to 70 mm, or 60 to 70 mm.

The styrenic fluoropolymers and/or anion exchange resin can have a distribution of pore sizes. For example, the pore diameters of the anion exchange resin can be from a low of about 1 nm to a high of about 1,000.

The styrenic fluoropolymers and/or anion exchange resin can have surface area from a low about 10 $m^2/g$ to a high of about 20 $m^2/g$. The surface area can be in the range of about 20 $m^2/g$ to about 200 $m^2/g$, about 30 $m^2/g$ to about 200 $m^2/g$, about 20 $m^2/g$ to about 100 $m^2/g$, about 30 $m^2/g$ to about 100 $m^2/g$, or about 40 $m^2/g$ to about 200 $m^2/g$.

In an embodiment, a method for at least partially separating one or more perfluoroalkyl and polyfluoroalkyl substances from a mixture can include, but is not limited to: contacting a mixture containing one or more perfluoroalkyl or poly fluoroalkyl substances with a styrenic fluoropolymer of Formula 1 and separating the styrenic fluoropolymer of Formula 1 from the mixture after the content of the one or more perfluoroalkyl or polyfluoroalkyl substances has been reduced.

Many kinds of perfluoro alkyl and/or polyfluoro alkyl substances can be at least partially removed from mixtures by using a styrenic fluoropolymer of Formula 1 or an anion exchange resin containing a styrenic fluoropolymer of Formula 1. For example, the perfluoro alkyl and/or polyfluoro alkyl substances that can be at least partially removed from a mixture can include, but is not limited to: perfluorooctanoic acid, perfluorooctane sulfonic acid, perfluorooctylsulfonyl fluoride; perfluorododecanoic acid; pentadecafluorooctanoyl fluoride, perfluorooctanoic acid; 1,1,2,2,3,3,4,4,5,5,6,6,7,7,7-pentadecafluoro-1-heptanesulfonyl fluoride; perfluorodecanoic acid; silver(I) perfluorooctanoate; sodium perfluorooctanoate; perfluorohexanesulfonic acid; perfluorobutane sulfonic acid; perfluorononanoic acid; perfluorotetradecanoic acid; 2-[ethyl[(heptadecafluorooctyl)sulfonyl]amino]ethyl methacrylate; methyl 2-perfluorooctanoate; [butyl[(heptadecafluorooctyl)sulfonyl]amino]ethyl acrylate; 2-[ethyl[(heptadecafluorooctyl)sulfonyl]amino]ethyl acrylate; perfluorooctyl iodide; 3,3,4,4,5,5,6,6,7,7,8,8,9,9,10,10,10-heptadecafluoro-1-decanol; 3,3,4,4,5,5,6,6,7,7,8,8,9,9,10,10,11,11,12,12,12-heneicosafluoro-1-dodecanol; 3-[[(heptadecafluorooctyl)sulfonyl]amino]-N,N,N-trimethyl-1-propanaminium iodide; N-ethyl-N-(2-hydroxyethyl)perfluorooctanesulfonamide; perfluorooctane sulfonic acid; 2-methyl-, 3,3,4,4,5,5,6,6,7,7,8,8,9,9,10,10,10-heptadecafluorodecyl ester 2-propenoic acid; 1,1,1,2,2,3,3,4,4,5,5,6,6,7,7,8,8-heptadecafluoro-10-iodo-decane; 1,1,1,2,2,3,3,4,4,5,5,6,6,7,7,8,8,9,9,10,10-heneicosafluoro-12-iodo-dodecane; 2-methyl-, 3,3,4,4,5,5,6,6,7,7,8,8,9,9,10,10,11,11,12,12,12-heneicosafluorododecyl ester; N-butyl-1,1,2,2,3,3,4,4,5,5,6,6,7,7,8,8,8-heptadecafluoro-N-(2-hydroxyethyl)-1-octanesulfonamide; 1,1,1,2,2,3,3,4,4,5,5,6,6,7,7,8,8,9,9,10,10-heneicosafluoro-12-iodo-dodecane; potassium perfluorooctanoate; potassium perfluorooctanesulfonate; N-ethyl-N-[(heptadecafluorooctyl)sulfonyl]glycine; ammonium perfluorooctanoate; potassium undecafluorocyclohexanesulphonate cyclohexanesulfonic acid; potassium 1,1,2,2,3,3,4,4,5,5,6,6,6-tridecafluoro-1-hexanesulfonic acid; sulfluramid; 2-propenoic acid, 2-methyl-, 3,3,4,4,5,5,6,6,7,7,8,8,9,9,10,10,11,11,12,12,13,13,14,14,15,15,16,16,16-nonacosafluorohexadecyl ester; 2-Propenoic acid, 2-methyl-, 3,3,4,4,5,5,6,6,7,7,8,8,9,9,10,10,11,11,12,12,13,13,14,14,14-pentacosafluorotetradecyl ester; hexafluoropropylene oxide dimer acid; octadecanoic acid, pentatriacontafluoro-; 1-nonanesulfonic acid, 1,1,2,2,3,3,4,4,5,5,6,6,7,7,8,8,9,9,9-nonadecafluoro-, ammonium salt; 1,1,2,2-tetrahydroperfluorododecyl acrylate; perfluorooctyl ethylene; 1-octanesulfonamide, 1,1,2,2,3,3,4,4,5,5,6,6,7,7,8,8,8-heptadecafluoro-N-(2-hydroxyethyl)-N-methyl-; 2-[[(heptadecafluorooctyl)sulfonyl]methylamino]ethyl acrylate; 1-decanesulfonyl chloride, 3,3,4,4,5,5,6,6,7,7,8,8,9,9,10,10,10-heptadecafluoro-; 1-dodecanesulfonyl chloride, 3,3,4,4,5,5,6,6,7,7,8,8,9,9,10,10,11,11,12,12,12-heneicosafluoro-; 1,1,2,2-tetrahydroperfluorodecyl acrylate; 1-octanesulfonic acid, 1,1,2,2,3,3,4,4,5,5,6,6,7,7,8,8,8-heptadecafluoro-, ammonium salt; poly (oxy-1,2-ethanediyl), α-[2-[ethyl[(heptadecafluorooctyl)sulfonyl]amino]ethyl]-ω-hydroxy-;

potassium perfluorobutane sulfonate; lithium (perfluorooctane)sulfonate; tetradecane, 1,1,1,2,2,3,3,4,4,5,5,6,6,7,7,8,8,9,9,10,10,11,11,12,12-pentacosafluoro-14-iodo-; 1-Octanesulfonamide, 1,1,2,2,3,3,4,4,5,5,6,6,7,7,8,8,8-heptadecafluoro-N-methyl-; 1,1,2,2-tetrahydroperfluorohexadecyl acrylate; 1,1,2,2-tetrahydroperfluorotetradecyl acrylate; poly [oxy(methyl-1,2-ethanediyl)], α-[2-[ethyl[(heptadecafluorooctyl)sulfonyl]amino]ethyl]-ω-hydroxy-; 1-propanaminium, 3-[[(heptadecafluorooctyl)sulfonyl]amino]-N,N,N-trimethyl-, chloride; 1-tetradecanol, 3,3,4,4,5,5,6,6,7,7,8,8,9,9,10,10,11,11,12,12,13,13,14,14,14-pentacosafluoro-; perfluorobutanesulfonate; 1-propanaminium, N,N,N-trimethyl-3-[[(tridecafluorohexyl)sulfonyl]amino]-, chloride; glycine, N-[(heptadecafluorooctyl)sulfonyl]-N-propyl-, potassium salt; poly (oxy-1,2-ethanediyl), α-[2-[ethyl[(tridecafluorohexyl)sulfonyl]amino]ethyl]-ω-hydroxy-; ethanaminium, N,N,N-triethyl-, salt with 1,1,2,2,3,3,4,4,5,5,6,6,7,7,8,8,8-heptadecafluoro-1-octanesulfonic acid (1; 1); 2-propenoic acid, 2-[ethyl[(pentadecafluoroheptyl)sulfonyl]amino]ethyl ester; 1-heptanesulfonic acid, 1,1,2,2,3,3,4,4,5,5,6,6,7,7,7-pentadecafluoro-, potassium salt; 1-hexadecanol, 3,3,4,4,5,5,6,6,7,7,8,8,9,9,10,10,11,11,12,12,13,13,14,14,15,15,16,16,16-nonacosafluoro-; pyridinium, 1-(3,3,4,4,5,5,6,6,7,7,8,8,9,9,10,10,10-heptadecafluorodecyl)-, salt with 4-methylbenzenesulfonic acid (1:1); hexafluoropropylene oxide dimer acid ammonium salt; hexadecane, 1,1,1,2,2,3,3,4,4,5,5,6,6,7,7,8,8,9,9,10,10,11,11,12,12,13,13,14,14-nonacosafluoro-16-iodo-; poly(difluoromethylene), α-fluoro-ω-(2-hydroxyethyl)-, 2-hydroxy-1,2,3-propanetricarboxylate (3:1); poly(difluoromethylene), α-fluoro-ω-[2-(phosphonooxy)ethyl]-; poly(difluoromethylene), α,α'-[phosphinicobis(oxy-2,1-ethanediyl)]bis[ω-fluoro-; ethanol, 2,2'-iminobis-, compd. with α-fluoro-ω-[2-(phosphonooxy)ethyl]poly(difluoromethylene) (2:1); ethanol, 2,2'-iminobis-, compd. with α,α'-[phosphinicobis(oxy-2,1-ethanediyl)]bis[ω-fluoropoly(difluoromethylene)] (1:1); poly(difluoromethylene), α-fluoro-ω-[2-[(1-oxooctadecyl)oxy]ethyl]-; poly(difluoromethylene), α-fluoro-ω-[2-[(2-methyl-1-oxo-2-propenyl)oxy]ethyl]-; poly(difluoromethylene), α-[2-[(2-carboxyethyl)thio]ethyl]-ω-fluoro-, lithium salt; poly(difluoromethylene), α,α'-[phosphinicobis(oxy-2,1-ethanediyl)]bis[ω-fluoro-, ammonium salt; poly(difluoromethylene), α-fluoro-ω-[2-(phosphonooxy)ethyl]-, monoammonium salt; poly(difluoromethylene), α-fluoro-ω-[2-(phosphonooxy)ethyl]-, diammonium salt; ethanol, 2,2'-iminobis-, compd. with α-fluoro-ω-[2-(phosphonooxy)ethyl]poly(difluoromethylene) (1:1); poly(difluoromethylene), α-[2-[(2-carboxyethyl)thio]ethyl]-ω-fluoro-; poly(oxy-1,2-ethanediyl), α-hydro-ω-hydroxy-, ether with α-fluoro-ω-(2-hydroxyethyl)poly(difluoromethylene) (1:1); poly(difluoromethylene), α-fluoro-ω-(2-hydroxyethyl)-, dihydrogen 2-hydroxy-1,2,3-propanetricarboxylate; poly(difluoromethylene), α-fluoro-ω-(2-hydroxyethyl)-, hydrogen 2-hydroxy-1,2,3-propanetricarboxylate; 2-propenoic acid, esters, 2-methyl-, dodecyl ester, polymer with α-fluoro-ω-[2-[(2-methyl-1-oxo-2-propen-1-yl)oxy]ethyl]poly(difluoromethylene); 2-propenoic acid, 2-methyl-, dodecyl ester, polymer with α-fluoro-ω-[2-[(2-methyl-1-oxo-2-propen-1-yl)oxy]ethyl]poly(difluoromethylene) and N-(hydroxymethyl)-2-propenamide; poly(difluoromethylene), α-fluoro-ω-[2-[(1-oxo-2-propenyl)oxy]ethyl]-, homopolymer; ethanaminium, N,N-diethyl-N-methyl-2-[(2-methyl-1-oxo-2-propenyl)oxy]-, methyl sulfate, polymer with 2-ethylhexyl 2-methyl-2-propenoate, α-fluoro-ω-[2-[(2-methyl-1-oxo-2-propenyl)oxy]ethyl]poly(difluoromethylene), 2-hydroxyethyl 2-methyl-2-propenoate and N-(hydroxymethyl)-2-propenamide; cyclohexanesulfonic acid, decafluoro(pentafluoroethyl)-, potassium salt; glycine, N-ethyl-N-[(undecafluoropentyl)sulfonyl]-, potassium salt; glycine, N-ethyl-N-[(tridecafluorohexyl)sulfonyl]-, potassium salt; 2-propenoic acid, 2-[methyl[(undecafluoropentyl)sulfonyl]amino]ethyl ester; 2-propenoic acid, 2-[methyl[(tridecafluorohexyl)sulfonyl]amino]ethyl ester; 1-propanaminium, N,N,N-trimethyl-3-[[(pentadecafluoroheptyl)sulfonyl]amino]-, iodide; glycine, N-ethyl-N-[(pentadecafluoroheptyl)sulfonyl]-, potassium salt; perfluoropalmitic acid; 1-decanesulfonic acid, 1,1,2,2,3,3,4,4,5,5,6,6,7,7,8,8,9,9,10,10,10-heneicosafluoro-, ammonium salt; 1-octanesulfonamide, N-ethyl-1,1,2,2,3,3,4,4,5,5,6,6,7,7,8,8,8-heptadecafluoro-N-[2-(phosphonooxy)ethyl]-, diammonium salt; 2-propenoic acid, 2-[methyl[(pentadecafluoroheptyl)sulfonyl]amino]ethyl ester; thiols, C4-10, γ-ω-perfluoro; thiols, C6-12, γ-ω-perfluoro; thiols, C10-20, γ-ω-perfluoro; chromium(III) perfluorooctanoate; cyclohexanesulfonic acid, nonafluorobis(trifluoromethyl)-, potassium salt; cyclohexanesulfonic acid, decafluoro(trifluoromethyl)-, potassium salt; alkyl iodides, C4-20, γ-ω-perfluoro; 2-propenoic acid, 2-methyl-, 2-ethylhexyl ester, polymer with α-fluoro-ω-[2-[(2-methyl-1-oxo-2-propen-1-yl)oxy]ethyl]poly(difluoromethylene), 2-hydroxyethyl 2-methyl-2-propenoate and N-(hydroxymethyl)-2-propenamide; 1-heptanesulfonic acid, 1,1,2,2,3,3,4,4,5,5,6,6,7,7,7-pentadecafluoro-, ammonium salt; 1-hexanesulfonic acid, 1,1,2,2,3,3,4,4,5,5,6,6,6-tridecafluoro-, ammonium salt; 1-pentanesulfonic acid, 1,1,2,2,3,3,4,4,5,5,5-undecafluoro-, ammonium salt; poly[oxy(methyl-1,2-ethanediyl)], α-[2-[ethyl[(tridecafluorohexyl)sulfonyl]amino]ethyl]-ω-hydroxy-; poly[oxy(methyl-1,2-ethanediyl)], α-[2-[ethyl[(pentadecafluoroheptyl)sulfonyl]amino]ethyl]-ω-hydroxy-; 2-propenoic acid, 2-[butyl[(heptadecafluorooctyl)sulfonyl]amino]ethyl ester, telomer with 2-[butyl[(pentadecafluoroheptyl)sulfonyl]amino]ethyl 2-propenoate, methyloxirane polymer with oxirane di-2-propenoate, methyloxirane polymer with oxirane mono-2-propenoate and 1-octanethiol; poly(oxy-1,2-ethanediyl), α-[2-[ethyl[(undecafluoropentyl)sulfonyl]amino]ethyl]-o-hydroxy-; poly(oxy-1,2-ethanediyl), α-[2-[ethyl[(pentadecafluoroheptyl)sulfonyl]amino]ethyl]-ω-hydroxy-; poly[oxy(methyl-1,2-ethanediyl)], α-[2-[ethyl[(undecafluoropentyl)sulfonyl]amino]ethyl]-ω-hydroxy-; alcohols, C8-14, γ-ω-perfluoro; 1,4-benzenedicarboxylic acid, dimethyl ester, reaction products with bis(2-hydroxyethyl)terephthalate, ethylene glycol, α-fluoro-ω-(2-hydroxyethyl)poly(difluoromethylene), hexakis(methoxymethyl)melamine and polyethylene glycol; 1-pentanesulfonamide, 1,1,2,2,3,3,4,4,5,5,5-undecafluoro-N-(2-hydroxyethyl)-N-methyl-; 1-hexanesulfonamide, 1,1,2,2,3,3,4,4,5,5,6,6,6-tridecafluoro-N-(2-hydroxyethyl)-N-methyl-; 1-heptanesulfonamide, 1,1,2,2,3,3,4,4,5,5,6,6,7,7,7-pentadecafluoro-N-(2-hydroxyethyl)-N-methyl-; 1-propanaminium, N,N,N-trimethyl-3-[[(pentadecafluoroheptyl)sulfonyl]amino]-, chloride; 1-tetradecanesulfonyl chloride, 3,3,4,4,5,5,6,6,7,7,8,8,9,9,10,10,11,11,12,12,13,13,14,14,14-pentacosafluoro-; 2-propenoic acid, 2-[[(heptadecafluorooctyl)sulfonyl]methylamino]ethyl ester, polymer with 2 [methyl[(nonafluorobutyl)sulfonyl]amino]ethyl 2-propenoate, 2-[methyl[(pentadecafluoroheptyl)sulfonyl]amino]ethyl 2-propenoate, 2-[methyl[(tridecafluorohexyl)sulfonyl]amino]ethyl 2-propenoate, 2-[methyl[(undecafluoropentyl)sulfonyl]amino]ethyl 2-propenoate and α-(1-oxo-2-propenyl)-ω-methoxypoly(oxy-1,2-ethanediyl); 1-propanaminium, N,N,N-trimethyl-3-[[(undecafluoropentyl)sulfonyl]amino]-, chloride; 1-propanaminium, N,N,N-trimethyl-3-[[(undecafluoropentyl)sulfonyl]amino]-, iodide; 1-propanaminium, N,N,N-trimethyl-3-[[(tridecafluorohexyl)sulfonyl]amino]-, iodide; 1-heptanesulfonamide, N-ethyl-1,1,2,2,3,3,4,4,5,5,6,6,7,7,7-pentadecafluoro-; poly(oxy-1,2-ethanediyl), α-[2-[ethyl[(pentadecafluoroheptyl)sulfonyl]amino]ethyl]-ω-methoxy-; poly(oxy-1,2-ethanediyl), α-[2-[ethyl[(heptadecafluorooctyl)sulfonyl]amino]ethyl]-ω-methoxy-; 1-octanesulfonic acid, 1,1,2,2,3,3,4,4,5,5,6,6,7,7,8,8,8-heptadecafluoro-, compd. with 2,2'-iminobis[ethanol] (1:1); 1-heptanesulfonic acid, 1,1,2,2,3,3,4,4,5,5,6,6,7,7,7-pentadecafluoro-, compd. with 2,2'-iminobis[ethanol] (1:1); 1-hexanesulfonic acid, 1,1,2,2,3,3,4,4,5,5,6,6,6-tridecafluoro-, compd. with 2,2'-iminobis[ethanol] (1:1); 1-pentanesulfonic acid, 1,1,2,2,3,3,4,4,5,5,5-undecafluoro-, compd. with 2,2'-iminobis[ethanol] (1:1); thiols, C8-20, γ-ω-perfluoro, telomers with acrylamide; poly(oxy-1,2-ethanediyl), α-methyl-ω-hydroxy-, 2-hydroxy-3-[(γ-ω-perfluoro-C6-20-alkyl)thio]propyl ethers; fatty acids, C6-18, perfluoro, ammonium salts; fatty acids, C7-13, perfluoro, ammonium salts; silane, trichloro(3,3,4,4,5,5,6,6,7,7,8,8,9,9,10,10,10-heptadecafluorodecyl)-; poly(difluoromethylene), α-fluoro-ω-[2-sulphoethyl)-; silane, (3,3,4,4,5,5,6,6,7,7,8,8,9,9,10,10,10-heptadecafluorodecyl)trimethoxy-; poly(difluoromethylene), α-fluoro-ω)-[2-(phosphonooxy)ethyl]-, ammonium salt; thiocyanic acid, γ-ω-perfluoro-C4-20-alkyl esters; alkenes, C8-14 α-, δ-ω-perfluoro; disulfides, bis(γ-ω-perfluoro-C6-20-alkyl); silicic acid (H4SiO4), disodium salt, reaction products with chlorotrimethylsilane and 3,3,4,4,5,5,6,6,7,7,8,8,9,9,10,10,10-heptadecafluoro-1-decanol; siloxanes and silicones, (3,3,4,4,5,5,6,6,7,7,8,8,9,9,10,10,10-heptadecafluorodecyl)oxy Me, hydroxy Me, Me octyl, ethers with polyethylene glycol mono-Me ether; 1,3-propanediol, 2,2-bis[[(γ-ω-perfluoro-C4-10-alkyl)thio]methyl] derivs., phosphates, ammonium salts; 1,3-propanediol, 2,2-bis[[(γ-ω-perfluoro-C6-12 alkyl)thio]methyl] derivs., phosphates, ammonium salts; 1,3-propanediol, 2,2-bis[[(γ-ω perfluoro-C10-20-alkyl)thio]methyl] derivs., phosphates, ammonium salts; 2-propenoic acid, 2-methyl-, 2-(dimethylamino)ethyl ester, polymers with Bu acrylate, γ-ω-perfluoro-C8-14-alkyl acrylate and polyethylene glycol monomethacrylate, 2,2'-azobis[2,4 dimethylpentanenitrile]-initiated; 1-octanesulfonamide, N-[3-(dimethyloxidoamino)propyl]-1,1,2,2,3,3,4,4,5,5,6,6,7,7,8,8,8-heptadecafluoro-, potassium salt; fatty acids, linseed-oil, γ-ω-perfluoro-C8-14-alkyl esters; sulfonic acids, C6-12-alkane, γ-ω-perfluoro, ammonium salts; ethaneperoxoic acid, reaction products with 3,3,4,4,5,5,6,6,7,7,8,8,9,9,10,10,10-heptadecafluorodecyl thiocyanate and 3,3,4,4,5,5,6,6,7,7,8,8,8-tridecafluorooctyl thiocyanate; 2-propenoic acid, 2-methyl-, 2-(dimethylamino)ethyl ester, polymers with γ-ω-perfluoro-C10-16-alkyl acrylate and vinyl acetate, acetates; 2-propenoic acid, 2-methyl-, polymer with butyl 2-methyl-2-propenoate, 3,3,4,4,5,5,6,6,7,7,8,8,9,9,10,10,10-heptadecafluorodecyl 2-propenoate, 2-hydroxyethyl 2-methyl-2-propenoate and methyl 2-methyl-2-propenoate; 2-propenoic acid, 2-methyl-, hexadecyl ester, polymers with 2-hydroxyethyl methacrylate, γ-ω-perfluoro-C10-16-alkyl acrylate and stearyl methacrylate; propanedioic acid, mono(γ-ω-perfluoro-C8-12-alkyl) derivs., di-me esters; propanedioic acid, mono(γ-ω-perfluoro-C8-12-alkyl) derivs., bis[4-(ethenyloxy)butyl] esters; 1,3-propanediol, 2,2-bis[[(γ-ω-perfluoro-C6-12-alkyl)thio]methyl] derivs., polymers with 2,2-bis[[(γ-ω-perfluoro-C10-20-alkyl)thio]methyl]-1,3-propanediol, 1,6-diisocyanato-2,2,4(or 2,4,4)-trimethylhexane, 2-heptyl-3,4-bis(9-isocyanatononyl)-1-pentylcyclohexane and 2,2'-(methylimino)bis[ethanol]; thiols, C4-20, γ-ω-perfluoro, telomers with acrylamide and acrylic acid, sodium salts Many kinds of mixtures that include one or more perfluoro alkyl and/or polyfluoro alkyl substances can be contacted with a styrenic fluoropolymer of Formula 1 to at least partially reduce the one or more perfluoro alkyl and/or polyfluoro alkyl substances. For example, an aqueous mixture of one or more perfluoro alkyl and/or polyfluoro alkyl substances can be contacted with a styrenic fluoropolymer of Formula 1 to at least partially reduce the one or more perfluoro alkyl and/or polyfluoro alkyl substances, resulting in a water mixture that has less perfluoro alkyl and/or polyfluoro alkyl substances.

In an embodiment, a styrenic fluoropolymer of Formula 1 and/or anion exchange resin can be added to an anion exchange vessel. A flow of an aqueous mixture containing one or more PFAS can be introduced to the anion exchange vessel such that the PFAS bind to the styrenic fluoropolymer of Formula 1 and/or anion exchange resin and are thereby removed from the water. A regenerant solution can be introduced to the anion exchange vessel to desorb the PFAS from the styrenic fluoropolymer of Formula 1 and/or anion exchange resin thereby regenerating the anion exchange resin and generating a spent regenerant solution that can include the desorbed PFAS and the regenerant solution. The spent regenerant solution can subjected to a separation and recovery process to recover the regenerant solution for reuse and separate and concentrate the removed PFAS.

A sample containing negatively charged materials, such as PFAS, can be contacted with the styrenic fluoropolymers and/or anion exchange resins at a pH where the anion exchange resin has positively charged groups (e.g., at a pH of 1 to 10). In general, to get effective adsorption of the negatively charged material to the anion exchange resin, a pH of at least about 1 to 2 pH units above the pK of the material can be used. To release the adsorbed material from the styrenic fluoropolymers and/or anion exchange resins, if desired, the pH can be lowered at least 1 to 2 pH units, or more. The adsorption and release processes are typically performed at temperatures near room temperature.

In an embodiment, buffer salts can be used for controlling pH include, but are not limited to, sodium phosphate, sodium carbonate, sodium bicarbonate, sodium borate, sodium acetate, tris(hydroxymethyl)aminomethane, 3-morpholinopropanesulfonic acid, 4-(2-hydroxyethyl)piperazine-1-propanesulfonic acid, and 2-morpholinoethanesulfonic acid.

In an embodiment, the styrenic fluoropolymers and/or anion exchange resins can be used in a chromatographic column. When packed with the styrenic fluoropolymers and/or anion exchange resins, the chromatographic column can be used to separate an ionic material from non-ionic materials or to separate one ionic material from another ionic material with a different charge density. Suitable columns are known in the art and can be constructed of such materials as glass, polymeric material, stainless steel, titanium and alloys thereof, or nickel and alloys thereof. Methods of filling the column to effectively pack the anion exchange resin in the column are known in the art.

The chromatographic columns can be part of an analytical instrument such as a liquid chromatograph. The chromatographic columns can be part of a preparative liquid chromatographic system to separate or purify an ionic material. The preparative liquid chromatographic system can be a laboratory scale system, a pilot plant scale system, or an industrial scale system.

EXAMPLES

To provide a better understanding of the foregoing discussion, the following non-limiting examples are offered. Although the examples can be directed to specific embodiments, they are not to be viewed as limiting the invention in any specific respect.

All chemicals and materials used in experiments were obtained from commercial suppliers and used as received without any further purification unless otherwise stated. Di alcohol terminated perfluoropolyether (PFPE) compound, Fluorolink E10 H (Average MW~1700 amu) was obtained from Solvay Solexis, Inc. 4-vinyl benzyl chloride (90%) was obtained from Acros Organics and sodium hydride (60% dispersion in paraffin liquid) was obtained from TCI chemicals. Triphenyl phosphine (>99%), azobisisobutyronitrile (AIBN) was purchased from Sigma-Aldrich and ethylene glycol, DMF (HPLC grade) was purchased from Oakwood Chemicals. Perfluorooctanoic acid (PFOA, 96%) and potassium perfluorooctane sulfonate potassium salt (PFOS, 98%) were obtained from Sigma Aldrich and Matrix Scientific respectively. Activated carbon powder (Charcoal) U.S.P. was supplied from Mallinckrodt chemicals. Methanol (99.9%), anhydrous diethyl ether (99%), ethyl acetate (>99.5%), hexane (99.5%), dichloromethane (>99.5%) was obtained from Fisher Scientific and used as received. $CDCl_3$ (0.03% v/v TMS; Thermo Scientific; 99.8%) and DMSO-d6 (Thermo Scientific; 99.5%) were used as NMR solvents. Deionized water (Resistivity~18 MΩ) obtained by passing through ion exchange columns is utilized to prepare solutions; local tap drinking water (Louisiana, Lafayette) and commercial RO purified bottled drinking water (Great Value, USA) was used as the drinking water matrices in some experiments. Lake water was collected from Lake Martin, Louisiana and filtered through 0.45 mm syringe filter before use in experiments. All other chemicals and materials employed were of analytical grade and used as received unless otherwise mentioned.

Figure 2:
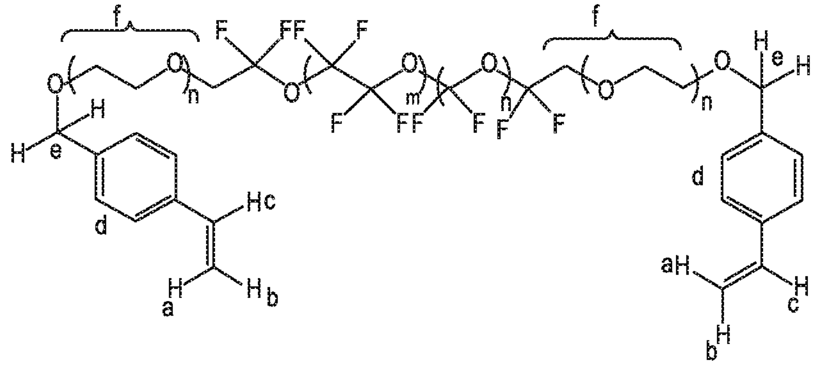
FIG. 2 shows the $^1H$ NMR spectrum of styrene functionalized perfluoropolyether monomer compound (400 MHZ, 298K, DMSO-d6).
Figure 2:
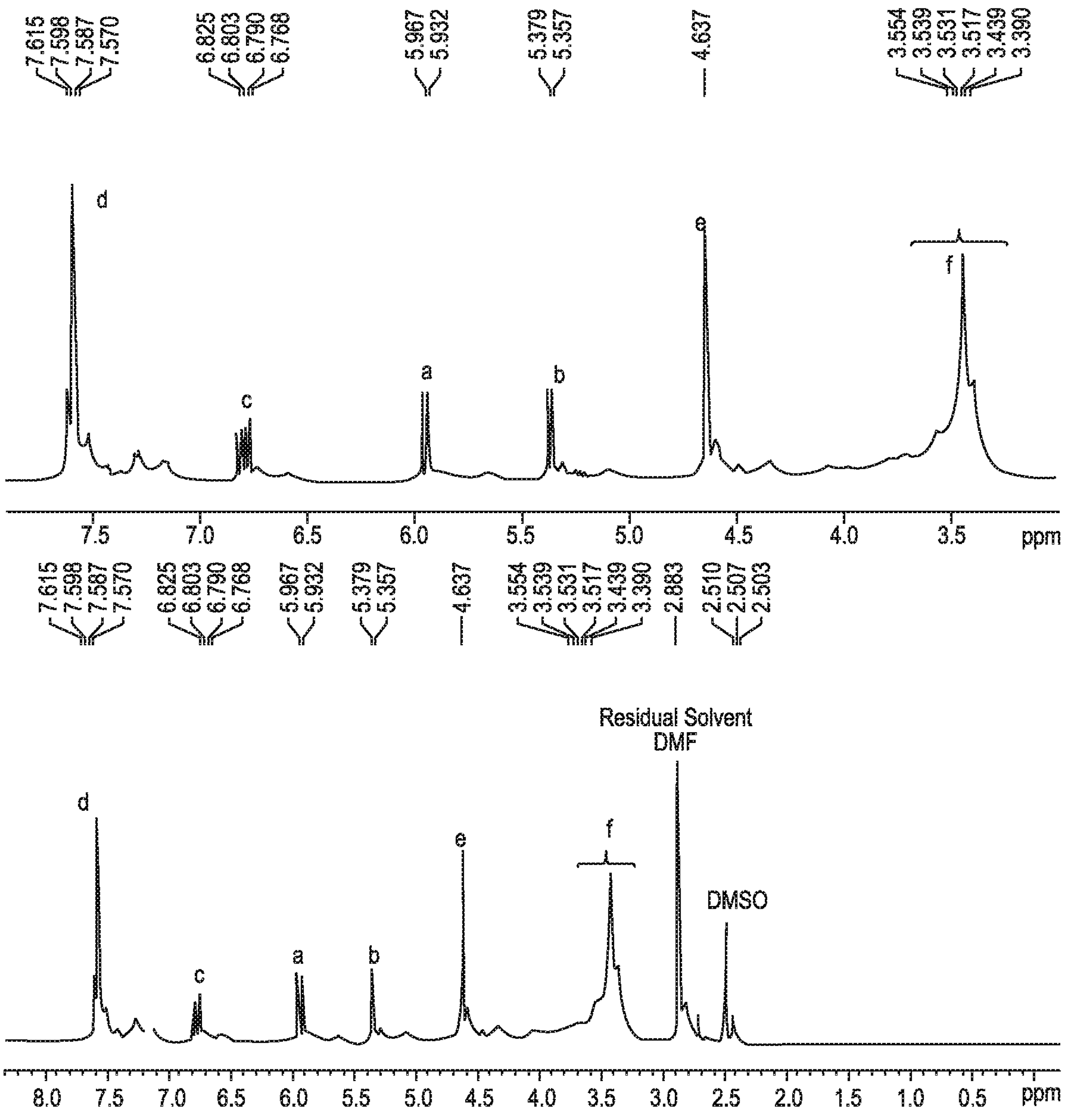
Figure 3:
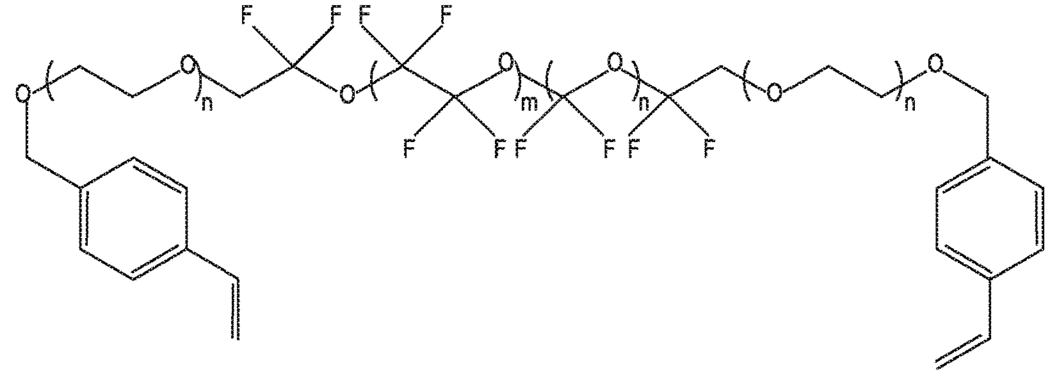
FIG. 3 shows the $^{13}C$ NMR spectrum of styrene functionalized perfluoropolyether monomer compound (100 MHZ, 298K, DMSO-d6).
Figure 3:
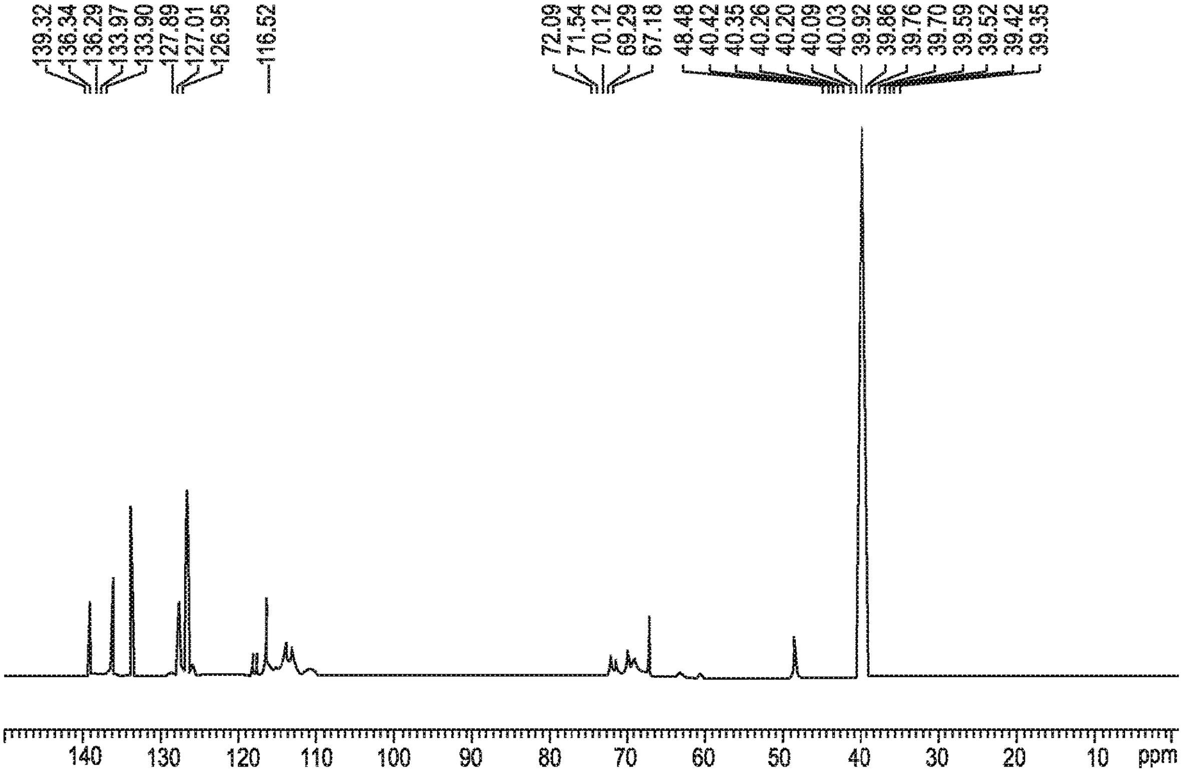
Figure 4:
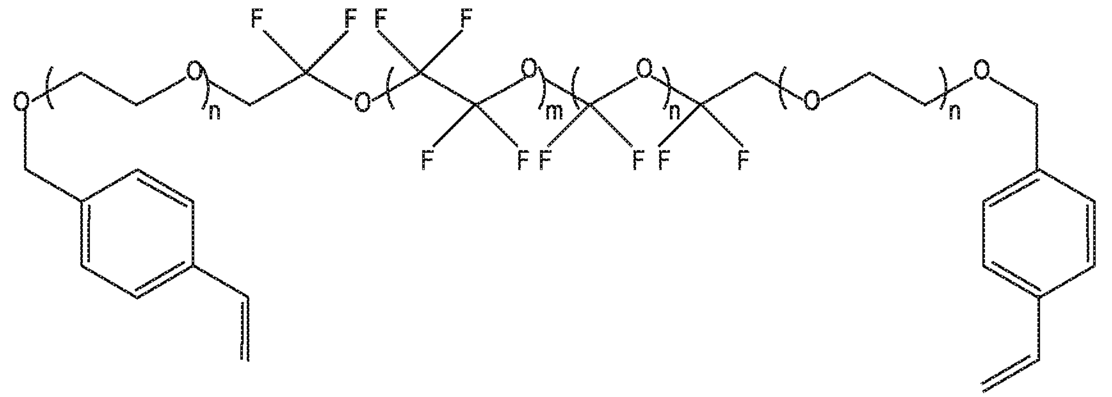
FIG. 4 shows $^{19}F$ NMR spectrum of styrene functionalized perfluoropolyether monomer compound (376 MHZ, 298K, $CDCl_3$).
Figure 4:
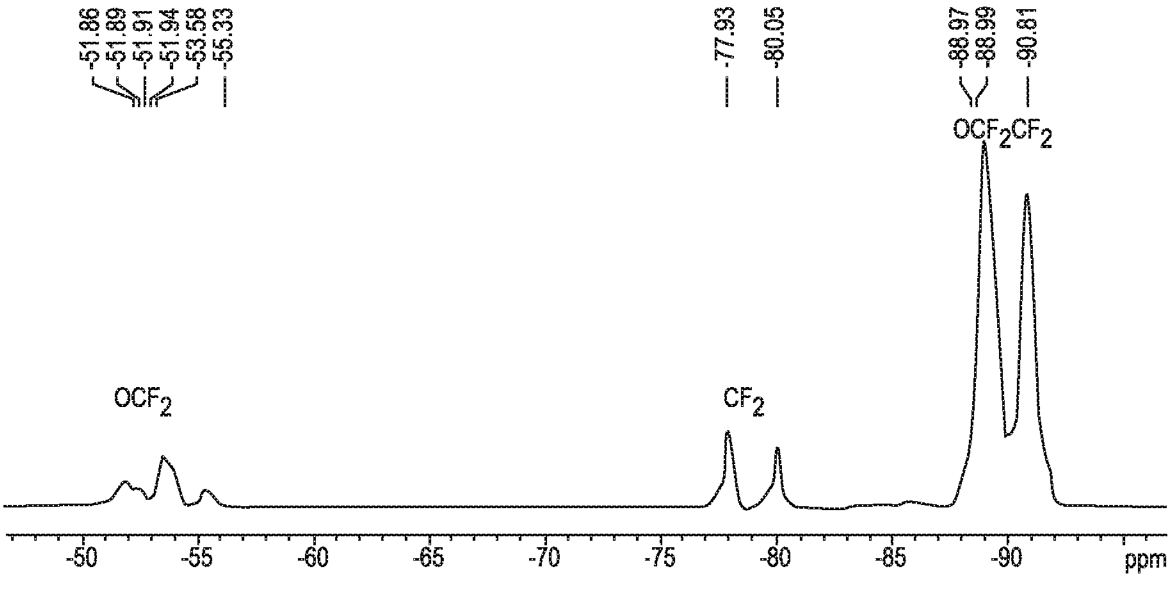
Figure 5:
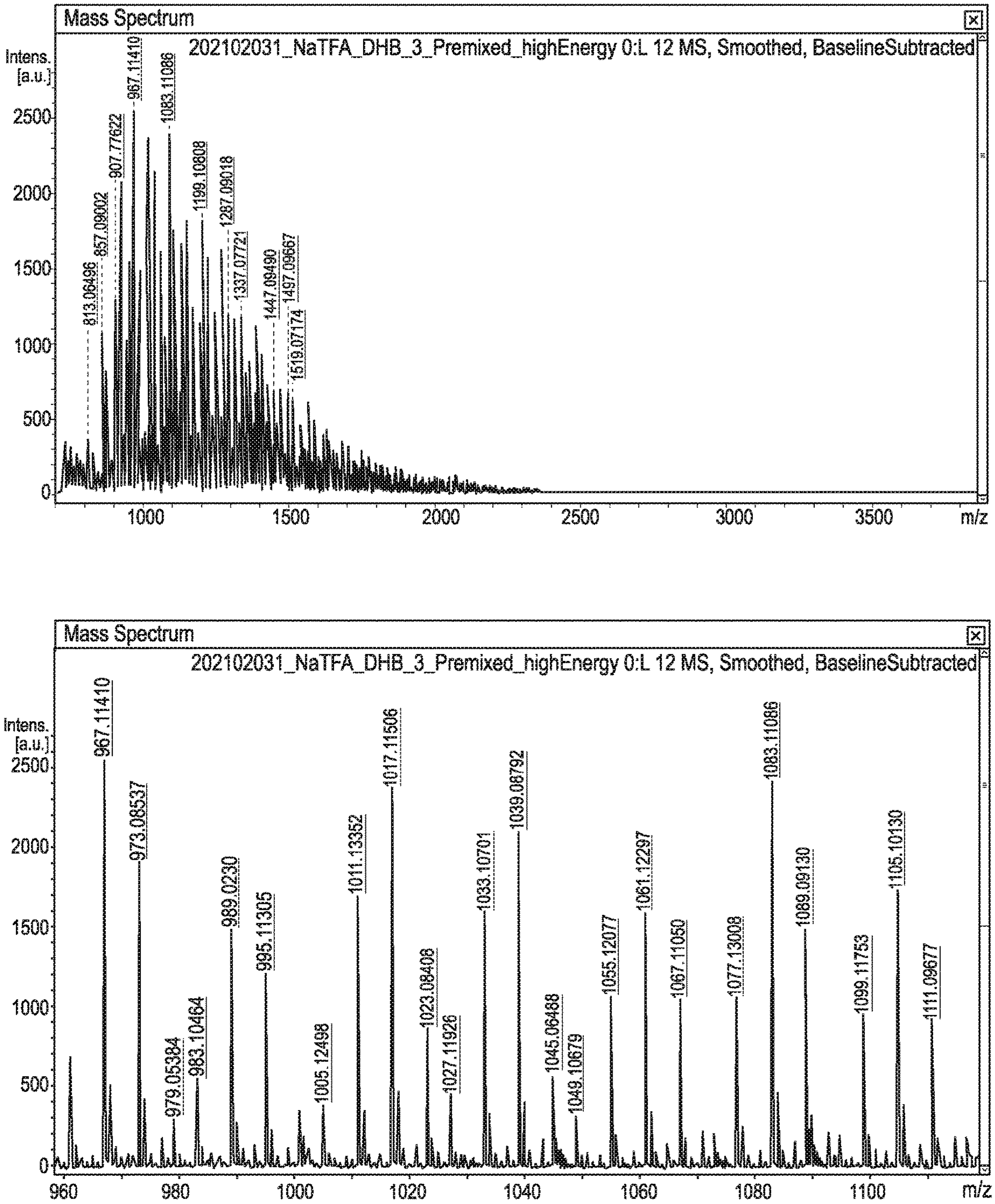
FIG. 5 shows the MALDI mass spectra characterization of perfluoropolyether (PFPE) precursor compound, Fluorolink E10-H (m/z=700-3860).
Figure 6:
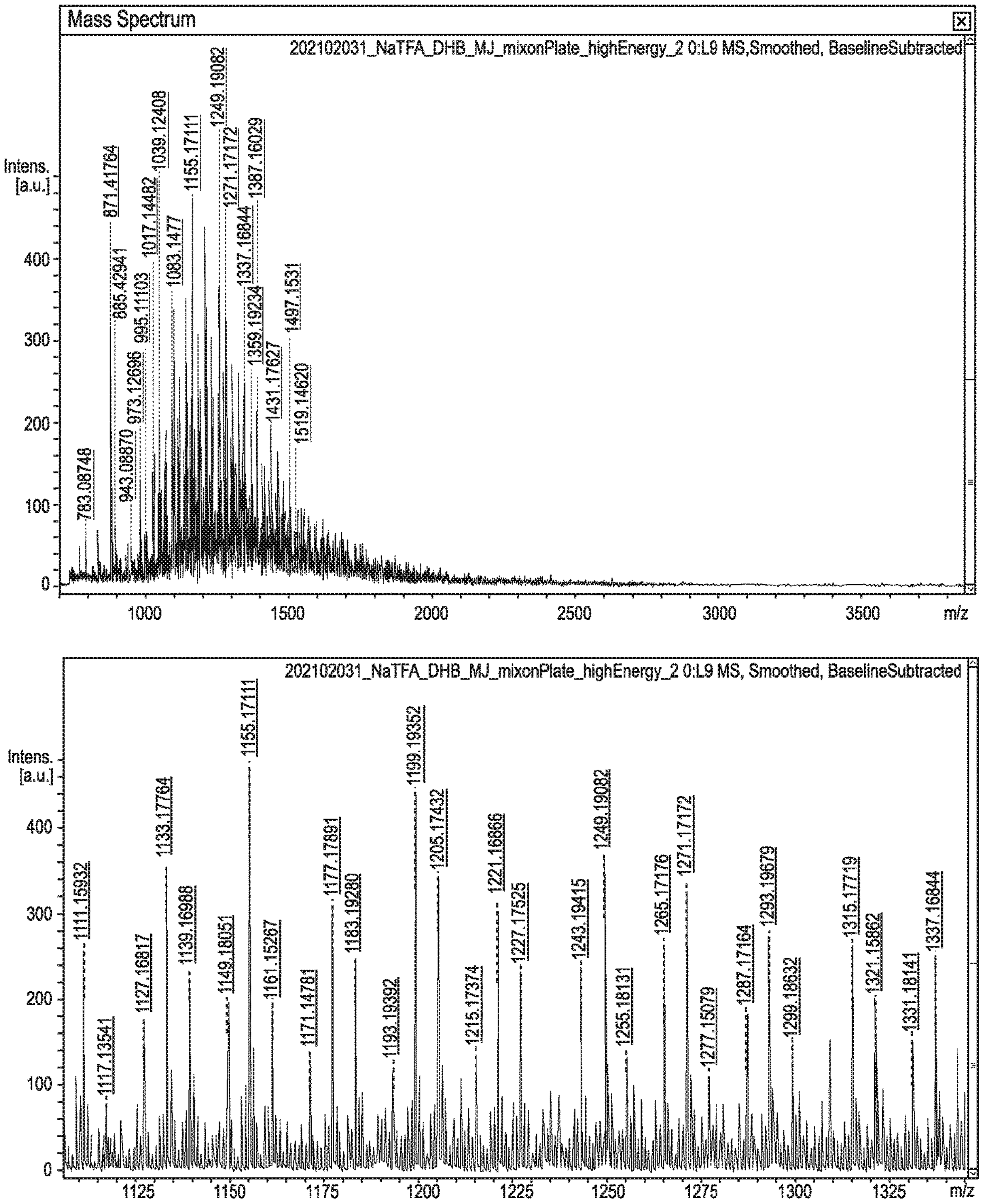
FIG. 6 shows the MALDI mass spectra characterization of styrene substituted perfluorinated monomer compound during the course of reaction (m/z=700-3860).
Figure 7:
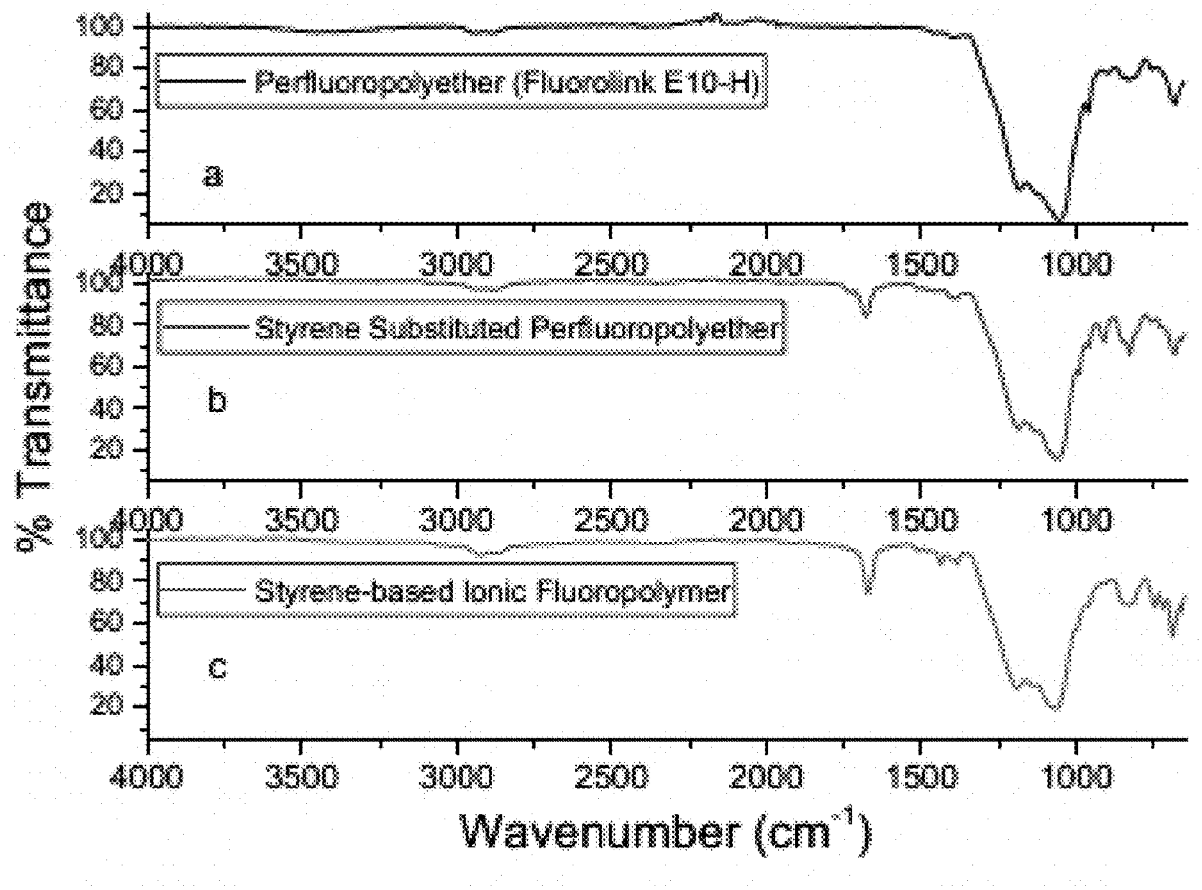
FIG. 7 shows the FTIR spectra of a) perfluoropolyether b) styrene substituted perfluorinated monomer c) styrene-based ionic fluoropolymer.

Commercially available Fluorolink E10-H was chosen as the precursor which is perfluoropolyether (PFPE) with a linear structure terminated with an —OH groups at both ends of an ethoxyilic chain for the development of ion-exchange polymer resin with tunable functionality.[54,55] Amorphous, low-molecular-weight perfluorinated oligomers, or PFPEs, are produced from the gas phase without the use of perfluorinated surfactants.[56] Styrene groups at the chain ends were installed in the PFPE by effectively substituting the primary alcohol groups following a general protocol adopted from Kurth and co-workers[57] with some modifications detailed in the experimental procedure. The first step involved reacting the terminal alcohol groups of the PFPE with the strong base, sodium hydride NaH via hydrogen abstraction evolving $H_2$, to selectively convert —OH into the corresponding alkoxide derivative of PFPE. In-situ generated alkoxide form of PFPE undergoes nucleophilic aromatic substitution reaction in presence of 4-vinyl benzyl chloride at low temperature to form styrene terminated perfluoropolyether monomer compound as the major reaction product (Step-I). The $^1$H NMR spectrum of styrene substituted monomer product revealed the successful installation of styrene groups at the monomer chain end, based on the appearance of well-resolved resonances in the d 5.3-7.6 region for styrene unit as well as the appearance of PFPE proton resonances in the region from d 3.39-3.55 ppm (FIG. 2). $^{13}$C NMR spectroscopy of the perfluorinated monomer indicated carbon resonances between d 116 and 140 ppm for successful incorporation of the styrene group as well as carbon resonances between d 69-72 ppm associated with perfluoropolyether (PFPE) carbons in the perfluorinated monomer (FIG. 3). Additionally, $^{19}$F NMR of perfluorinated monomer indicated a correct number of fluorine resonances appearing at d −51 to −55 ppm for $OCF_2$ groups, −77 & −80 ppm assigned to $CF_2$ end groups and d −88 to −90 ppm for $OCF_2CF_2$ units in the monomer consistent with the expected structure of the monomer (FIG. 4). Matrix Assisted Laser Desorption Ionization (MALDI) mass spectrometry of perfluorinated monomer monitored during the course of the reaction in DMF (~34 h) confirmed successful functionalization of styrene unit. Post-functionalization reaction most intense peak corresponding to the average molecular mass fragment of perfluorinated monomer detected at m/z=1155.17 amu in MALDI-MS was significantly up shifted (higher) in mass with reference to m/z=967.11 for corresponding neat PFPE precursor fragment detected in MALDI mass spectra (FIGS. 5 and 6). Additionally, FTIR spectroscopy results were also consistent with the expected monomer structure with observed peaks at 2871 $cm^{-1}$ and 2936 $cm^{-1}$ (for $CH_2$ stretching), broad vibrational features at 1060 $cm^{-1}$ and 1186 $cm^{-1}$ (for C—F stretching), the appearance of a characteristic peak at 1632 $cm^{-1}$ (for C═C stretching of vinyl bond) (FIG. 7).

Figure 8:
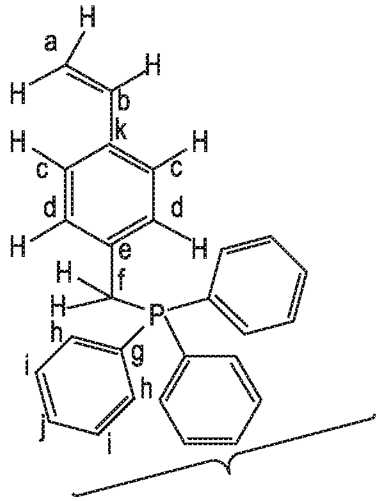
FIG. 8 shows a 1H NMR spectrum of triphenyl vinyl benzyl phosphonium chloride (400 MHZ, 298K, $CDCl_3$).
Figure 8:
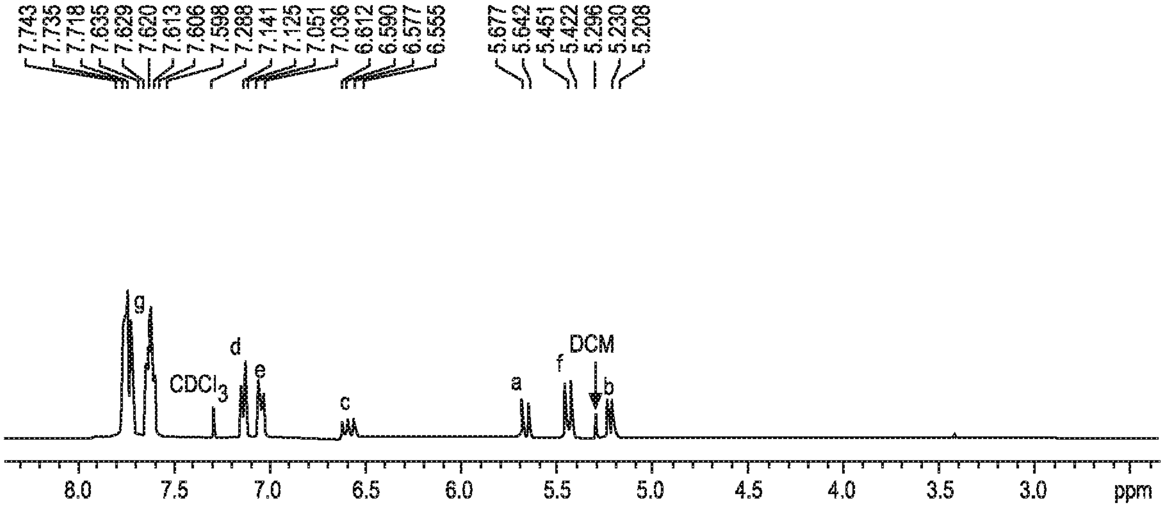
Figure 9:
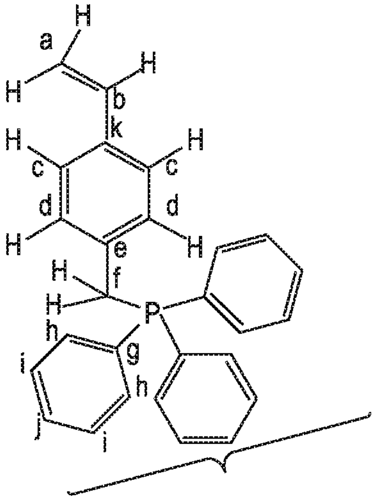
FIG. 9 shows a $^{13}C$ NMR spectrum of triphenyl vinyl benzyl phosphonium chloride (100 MHZ, 298K, $CDCl_3$).
Figure 9:
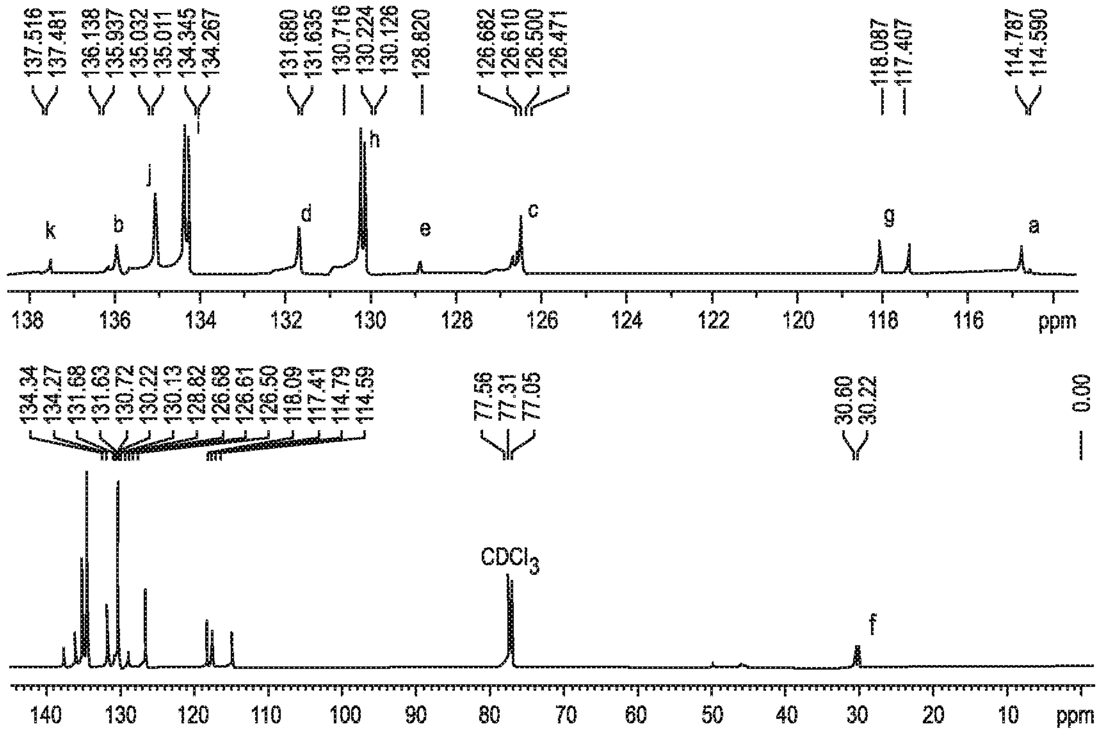
Figure 10:
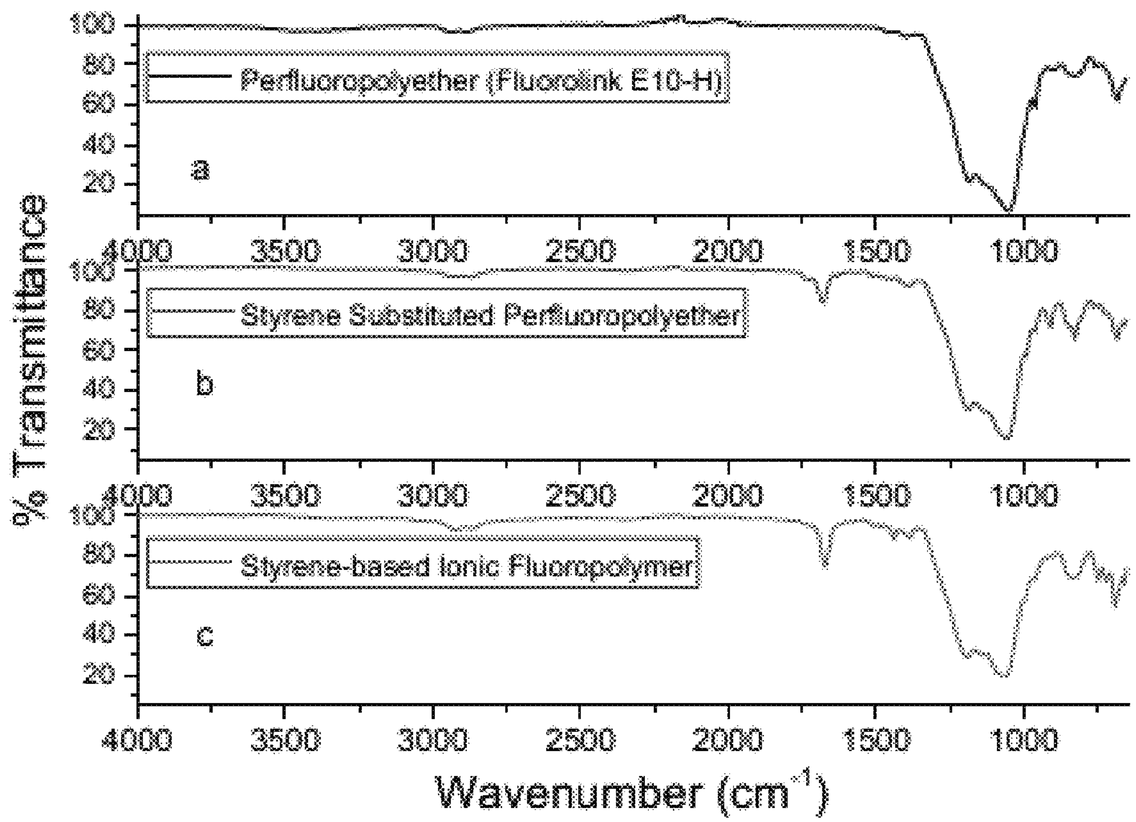
FIG. 10 shows an FTIR spectra of a) perfluoropolyether b) styrene substituted perfluorinated monomer c) styrene-based ionic fluoropolymer.

Triphenyl-4-vinylbenzyl phosphonium chloride monomer was synthesized by nucleophilic substitution reaction between triphenyl phosphine and 4-vinyl benzyl chloride in a mole ratio of 1:2 at 40° C. in methanol as per the reaction scheme (Step II) following a method adapted from Biswas et.al.[58] The $^{1}H$ NMR spectrum of the compound displayed the characteristic resonances at d 7.03 and 7.14 for benzene ring protons of vinyl benzyl chloride and d 5.43 ppm for benzylic —$CH_2$ protons connected to the phosphonium cation. Well-resolved proton resonances observed at d 6.59, 5.68, 5.23 were ascribed to three vinyl protons of the triphenyl-4-vinylbenzyl phosphonium chloride monomer as indicated in FIG. 8. As assigned in FIG. 9, $^{13}C$ NMR spectrum of the triphenyl-4-vinylbenzyl phosphonium chloride monomer showed the correct number of carbon resonances between d 30 to d 137 ppm. The signal at d 30.22-30.60 is attributed to benzylic —$CH_2$ carbon next to the phosphonium cation. The observed carbon signals in $^{13}C$ NMR between 138 and 114 ppm were assigned to three phenyl groups and a styrene unit of the monomer as indicated in the FIG. 9. The successful synthesis of the triphenyl-4-vinylbenzyl phosphonium chloride monomer was further supported by FTIR spectrum (FIG. 10) which showed characteristic peaks at 1436 $cm^{-1}$ (for deformation of P—$CH_2$-Ph of monomer cation), 1109 $cm^{-1}$ (for three P-Ph stretching vibration and 1628 $cm^{-1}$ (for C═C stretching of vinyl bond). Vibrational bands of the aromatic C—H and aromatic C═C linkages are confirmed by the peaks observed at 3055 $cm^{-1}$ and 1587 $cm^{-1}$ respectively (FIG. 10). Final step in the synthesis of phosphoniun bearing ionic fluoropolymer included the thermally induced radical copolymerization reaction between styrene substituted perfluorinated monomer and triphenyl 4-vinyl benzyl phosphonium chloride monomer in presence of radical initiator AIBN as depicted in the reaction scheme (Step III). Typically, 20 wt % of ionic monomer composition bearing tetra aryl phosphonium units with respect to the total weight of ionic fluoropolymer was employed in the polymerization reaction to prepare the polymer materials. This ratio of the charged component in the polymer was chosen based on previous reports where the optimum concentration of ionic charged units in the polymer has been found to be ~20 wt % to 30 wt % above which there was no meaningful improvement in the removal efficiency of the polymers irrespective of the increase in density of the charged groups.[22] Solid gel like polymeric material was obtained post-polymerization, which was finely grounded using a mortar pestle to obtain the polymer powder for use in water treatment experiments. Essentially, negligible swelling of the polymer was observed from water uptake measurements by the ionic polymer composition obtained, indicating tightly crosslinked polymer networks formed in these materials and the presence of water won't significantly affect the resin performance. To elucidate structure-property relationships of the fluoropolymer, pure hydrocarbon-based styrene containing ionic polymer without fluorous component was synthesized similarly by radical polymerization using 1,2-Bis(4-vinylbenzyloxy) ethane and triphenyl-4-vinylbenzyl phosphonium chloride as monomers (See reaction scheme in supporting information).

Additionally, perfluoropolyether (PFPE) elastomer with no ionic component (without tetra aryl phosphonium units) served as controls for perfluorinated non-ionic compound with the fluorous component.

Figure 11:
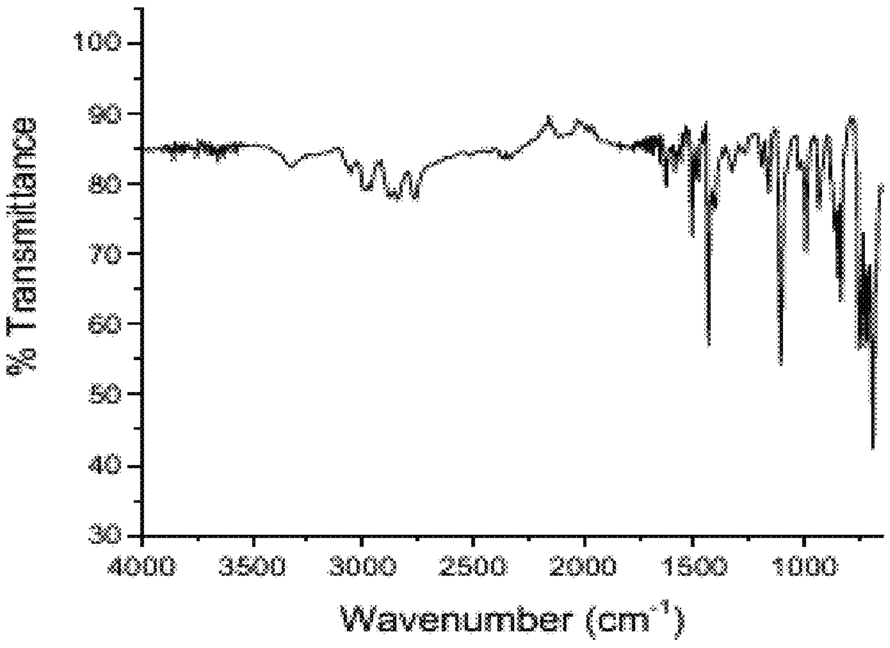
FIG. 11 shows an FTIR spectra of triphenyl vinyl benzyl phosphonium chloride.
Figure 12:
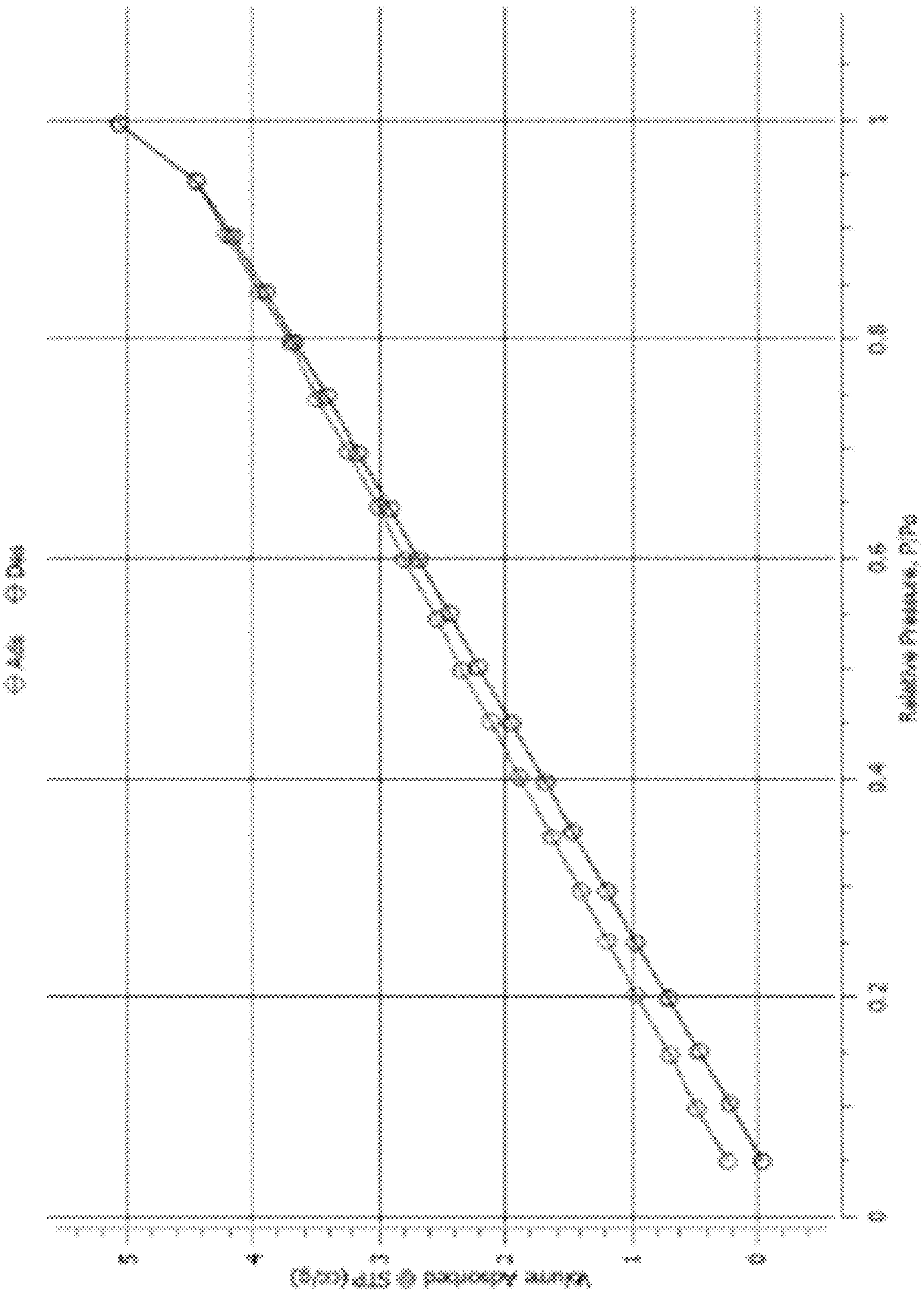
FIG. 12 shows $N_2$ adsorption and desorption isotherms of styrene-based ionic fluoropolymer at 77 K.

The FTIR spectra of the ionic fluoropolymer synthesized indicated successful polymerization of monomers with the disappearance of vinylic C═C stretching signal around 1632 $cm^{-1}$ present in monomers (FIG. 11). The porosity and BET surface area of the fluoropolymer was characterized by $N_2$ adsorption/desorption isotherms illustrated in FIG. 12. The BET surface area of fluoropolymer, which was determined to be 7.87 $m^2/g$ was calculated using the linear portion of the isotherm. The Barrett-Joyner-Halenda (BJH) method was used to calculate the average pore size which was found to be 3.23 nm from adsorption/desorption isotherms suggesting mesoporous adsorbents ideal for fast and efficient adsorption of small molecules like PFOA and PFOS.

Figure 13:
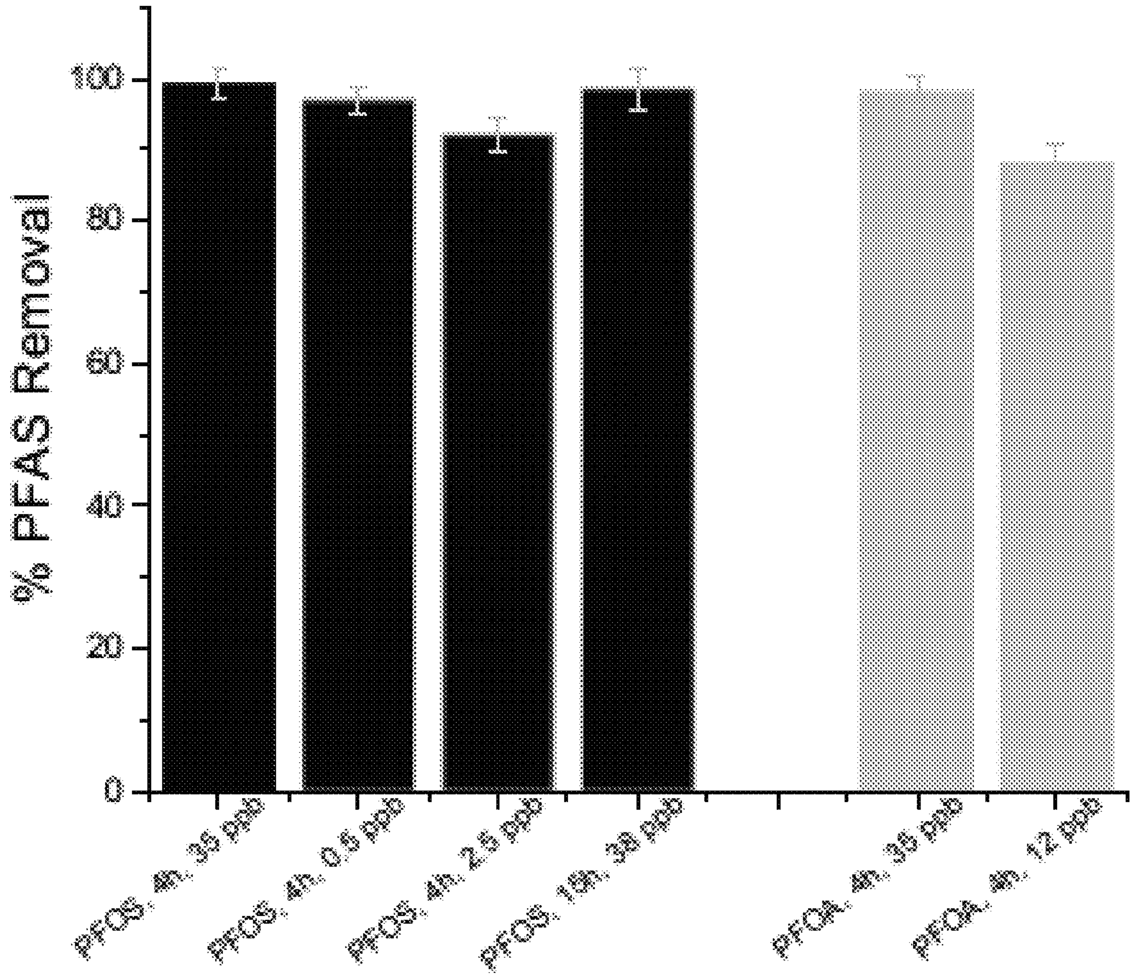
FIG. 13 shows the PFAS removal efficiency upon sorption by ionic fluoropolymer for different time periods spiked at different initial PFOA or PFOS concentrations tested at ppb and sub-ppb levels in water matrices. [Sorbent]=170 mg/L or 100 mg/L: $[PFOS]_0$=35 ppb, 0.5 ppb, 2.5 ppb, 38 ppb and $[PFOA]_0$=35 ppb, 12 ppb spiked in deionized water and/or tap drinking water matrices, pH range=5.60 to 7.66.

Mainly PFOA (pKa~0) and PFOS (pKa~-3)[59,60] were targeted as model PFAS contaminants in water remediation experiments using the ionic fluoropolymer. Initial PFAS removal efficiency studies by the fluoropolymer at polymer loading of 100 mg/L was evaluated by carrying out batch equilibrium adsorption experiments for PFOA/PFOS (Initial concentration of 35 ppb for each compound and additionally PFOS=0.5 ppb, 2.5 ppb, 38 ppb and PFOA=12 ppb) spiked in pure deionized water or tap drinking matrix for various time periods as depicted in the FIG. 13. The initial concentrations of PFAS (PFOA/PFOS) chosen here were mainly based on pKa, hydrophobicity and sensitivity of the liquid chromatography mass spectrometry instrument in the detection of each compound. For both PFOA and PFOS spiked at 35 ppb in tap drinking water, remarkable removal efficiency greater than >98% were observed by the ionic fluoropolymer. As seen from FIG. 13, upon exposure to contaminated water samples as low as 0.5 mg/L or 0.5 ppb of PFOS prepared in deionized water, rapid removal of PFOS exceeding >96% is seen after 4 h of sorption by ionic fluoropolymer at sub-ppb level PFAS concentrations. This would correspond to PFOS content remaining in water below EPA health advisory limit of 70 ng/L or 70 ppt and is of great environmental significance. For PFOS spiked at initial concentration of 2.5 ppb resulted in >92% of PFOS removal after 4 h of adsorption equilibrium time (FIG. 13). For PFOA spiked at 12 ppb, after 0.5 h of adsorption in presence of fluoropolymer, polymer removed more than >88% of PFOA from deionized water matrix (FIG. 13). Overall, the results consistently demonstrated fast and efficient removal of PFOA and PFOS from deionized and tap drinking water matrices with close to 90% or more than >90% PFAS removal efficiency observed. At ultralow concentrations and depending on the pH of water matrix, it was found that removal efficiency for PFOA by the fluoropolymer was slightly lower in comparison to PFOS still approaching close to 90% removal efficiency under otherwise identical conditions. This performance by the polymer adsorbent is not surprising considering the hydrophobicity of PFOA being lower than PFOS and pKa value of PFOA (pKa~0) being higher than PFOS (pKa~-3).[59,60] Such a remarkable performance in PFAS (PFOA/PFOS) removal by the ionic fluoropolymer for a relatively short contact time is caused by combined effects between electrostatic and hydrophobic interactions. This motivated us to further study and understand valuable structure-property relationships by employing different complementary polymers and commercial adsorbent materials including the presence of other organic co-contaminants such as phenols and real water matrices containing a complex mixture of background constituents.

The PFAS removal efficiency upon sorption by the ionic fluoropolymers and/or styrenic fluoropolymers can vary widely. For example, the PFAS removal efficiency upon sorption by the ionic fluoropolymer and/or styrenic fluoropolymers can be from about 1% to about 50%, about 1% to about 20%, about 5% to about 15%, about 10% to about 20%, or about 25% to about 75%.

Figure 14:
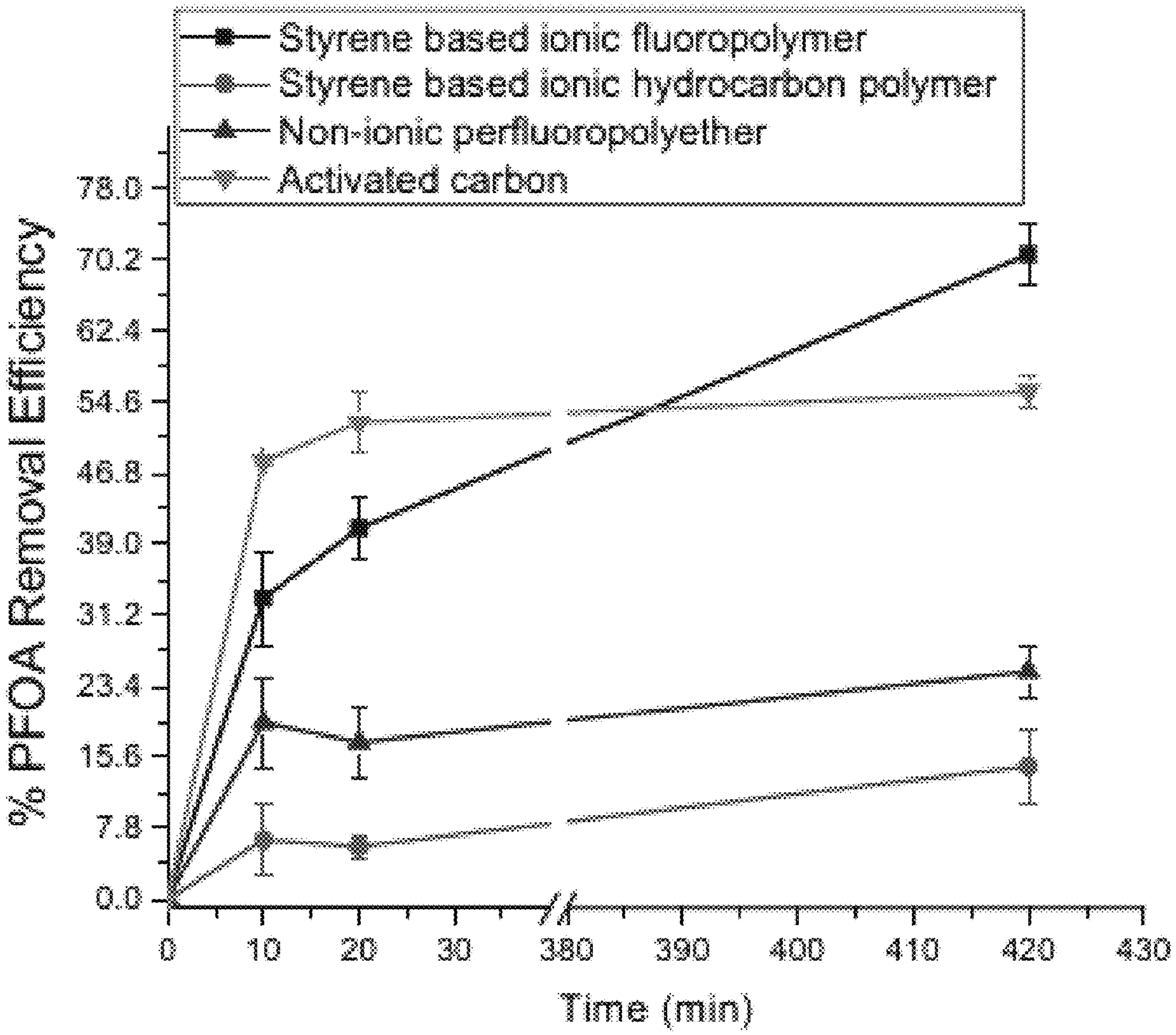
FIG. 14 depicts the kinetics of PFOA removal efficiency tested by various polymer adsorbents employed in this study and powdered activated carbon (charcoal) for comparison purposes in deionized water. [Sorbent loading]=1.5 mg/mL: $[PFOA]_0$=1.75 mM, pH range=2.40 to 2.48.

To understand the degree of how electrostatic, and non-covalent interactions help cooperatively bind PFAS (PFOA/PFOS), adsorption kinetics of PFOA by various polymer adsorbents at relatively much higher concentrations (Initial PFOA concentration of 1.75 mM or ~725 ppm, pH ~2.48) and adsorbent loading of 1.5 mg/mL was studied by monitoring PFOA concentration at different time intervals using HPLC method. FIG. 14 shows the adsorption kinetics of PFOA in presence of styrene based ionic fluoropolymer, styrene based ionic hydrocarbon polymer, neutral perfluoropolyether elastomer and commercial activated carbon samples. Fast removal kinetics for PFOA sorption was observed when exposed to high surface area activated carbon powder within 20 minutes before it leveled off with maximum PFOA removal efficiency of about 55% removal by activated carbon powder (FIG. 14). Relatively slower yet competitive adsorption kinetics was observed for PFOA by styrene-based ionic fluoropolymer showing removal efficiency of 41% after 20 minutes which increased to 71% removal efficiency after 7 h of contact period (FIG. 14). Non-fluorinated styrene-based ionic polymer containing same density of phosphoniun ion units was inefficient in PFOA removal displaying about 6% and 15% PFOA removal after 20 minutes and 7 h respectively, indicating poor performance by ionic hydrocarbon-based polymer without fluorous component under otherwise identical experimental conditions. Non-ionic perfluoropolyether elastomer compound without presence of electrostatic component showed low to moderate efficiency for PFOA removal with ~17% and 25% removal efficiency observed after 20 minutes and 7 h respectively (FIG. 14). These results provided some immediate insights, first that both combination of electrostatic and noncovalent fluorophilic interactions (C—F - - - F—C) by fluoropolymer are critical in selective and highly efficient separation of PFAS. Secondly, the data strongly suggested that extent of contributing fluorophilic interactions (C—F - - - F—C) from fluorous groups and the hydrophobic interactions in the polymer were predominant mechanism of interactions over electrostatic interactions alone in the removal of PFOA which represent long chain PFAS compounds. For direct comparison with currently utilized activated carbon powder (Charcoal) based water treatment technology, we determined the binding capacity of the materials after 7 h of sorption time and the results are tabulated in Table 1.

TABLE 1

Summary of PFOA sorption capacities measured by various polymers and activated carbon in deionized water

| Materials Tested | Adsorption Capacity, $q_r$ (mg/g) after 7 h Sorption |
|---|---|
| Styrene-based ionic fluoropolymer | 343 |
| Styrene-based ionic hydrocarbon polymer | 70 |
| Non-ionic perfluoropolyether | 120 |
| Activated carbon (Charcoal) | 268 |

Styrene-based ionic fluoropolymer designed here showed significantly higher sorption capacity ($q_r$) of 343 mg/g for PFOA uptake in reference to commercial activated carbon standard displaying sorption capacity of 268 mg/g under otherwise identical experimental conditions studied (Table 1). In addition, the adsorption capacity of styrene-based ionic fluoropolymer was found to be far more superior, ~4.9-fold higher than styrene-based ionic hydrocarbon polymer and ~2.9-fold higher in comparison to non-ionic perfluoropolyether elastomer (Table 1). These results guided us to important design principles in the development of ionic fluropolymers that should include combination of both electrostatic component and fluorophilic units for rapid and efficient remediation of PFAS from waters.

Figure 15:
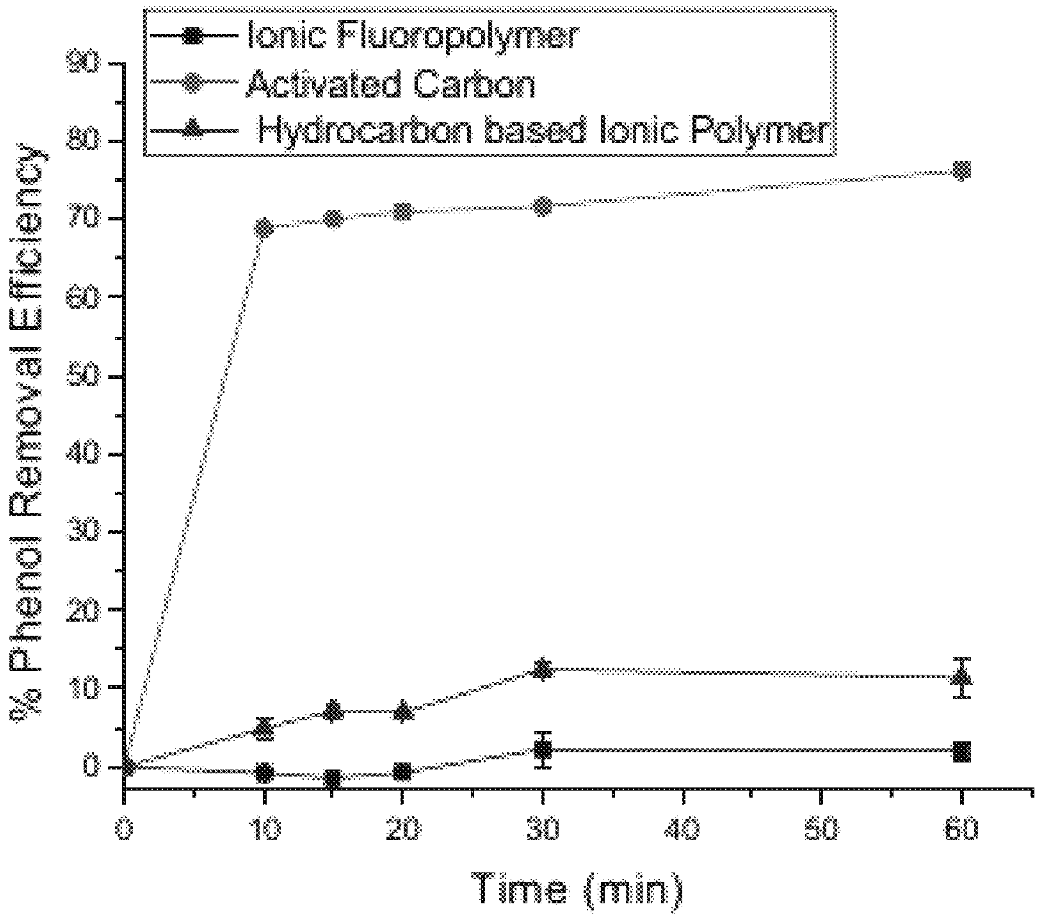
FIG. 15 shows a graph of phenol removal kinetic studies demonstrating selectivity for PFAS by ionic fluoropolymer in presence of phenol as a model organic contaminant in deionized water. [sorbent]=1.5 mg/mL: $[Phenol]_0$=1.75 mM in deionized water, pH range=2.90 to 5.57.
Figure 16:
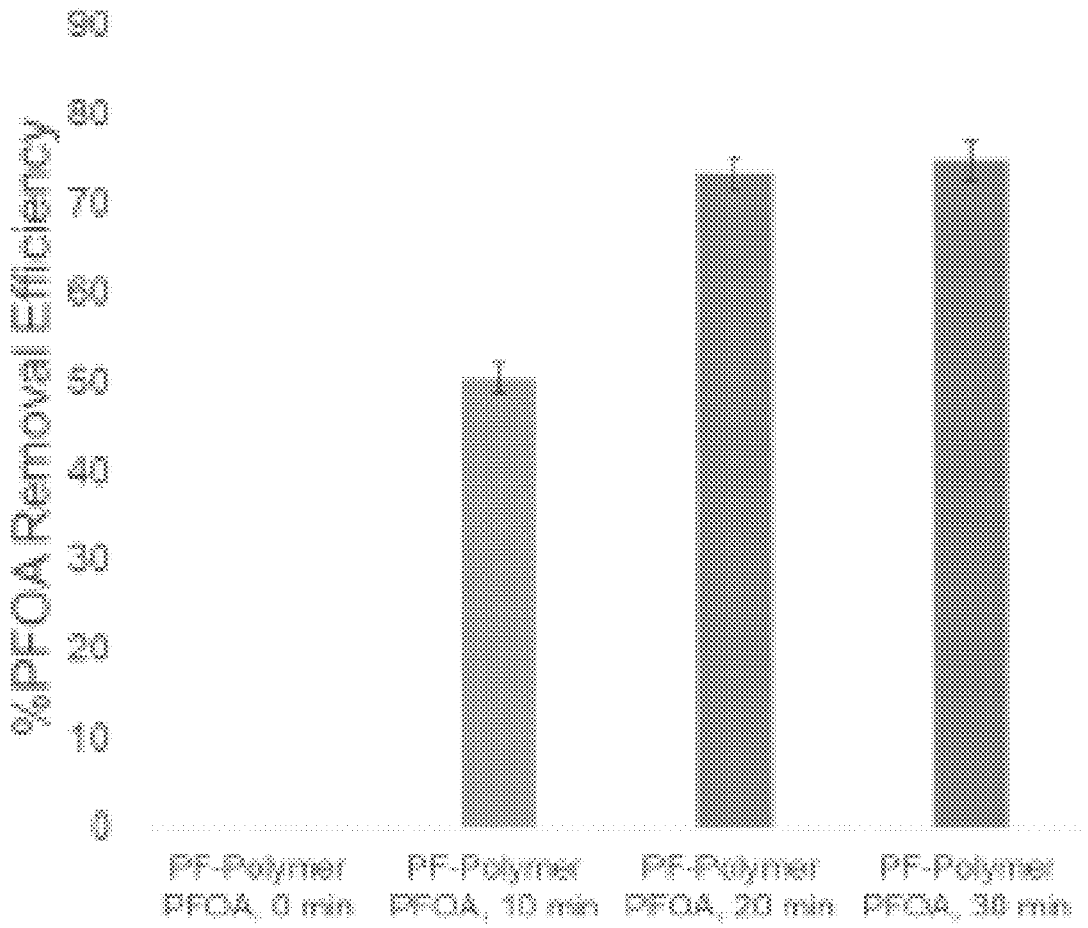
FIG. 16 shows the selectivity studies for PFOA removal efficiency by the ionic fluoropolymer observed using phenol as model hydrocarbon contaminant in deionized water. The rapid removal kinetics of PFOA is observed by ionic fluoropolymer, [sorbent]=750 mg/L; $[PFOA]_0$=1.84 mM, pH~3.15.
Figure 17:
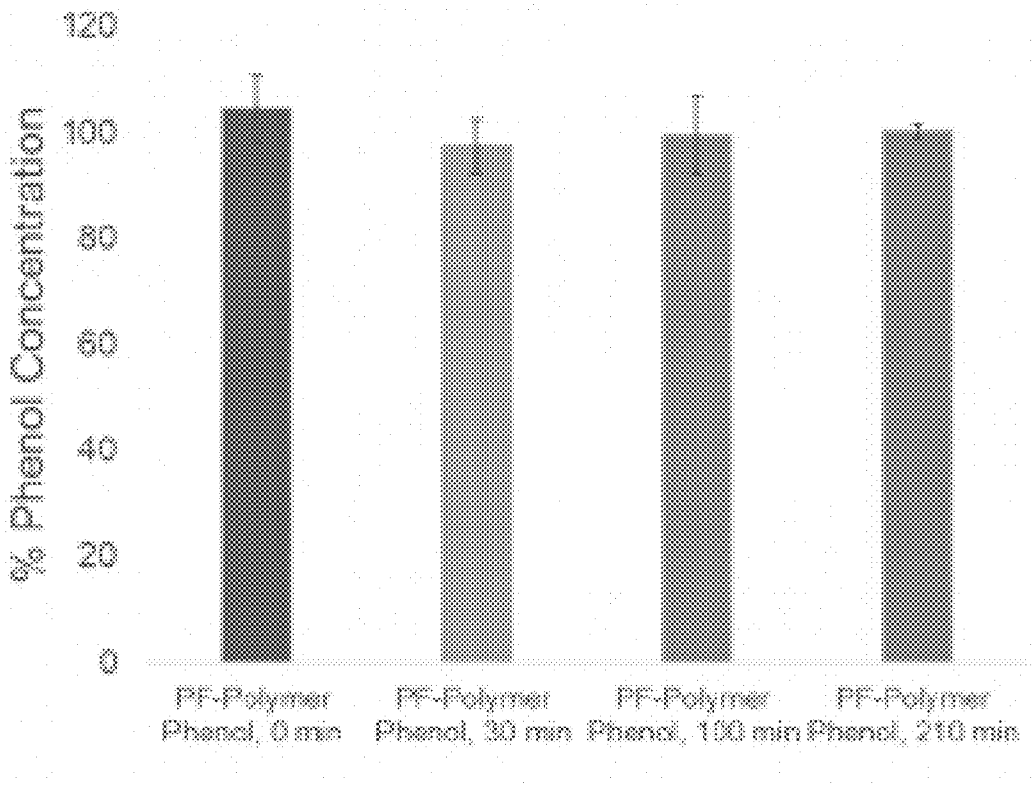
FIG. 17 shows no phenol removal is seen in presence of ionic fluoropolymer suggesting selectivity for PFAS by fluoropolymer, [sorbent]=750 mg/L: $[Phenol]_0$=1.50 mM, PH ~ 3.

With respect to the removal mechanism, it is hypothesized that the tethered quaternary phosphonium moieties in the styrene substituted ionic fluoropolymer exchanges with PFOA/PFOS anion in solution. Fluorinated nature of the perfluoropolyether backbone is favorable for PFAS (PFOA/PFOS) anion adsorption and ion-pairing with the tethered ionic head groups containing phosphonium cation units. Therefore, combination of both ionic (electrostatic) and noncovalent interactions (Vander Waals interaction) work cooperatively for promoting PFAS (PFOA/PFOS) uptake in the fluoropolymer aqueous solutions. To further understand structure-property correlation and study the selectivity of ionic fluoropolymer for PFOA/PFOS, we chose phenol as model oil-field hydrocarbon contaminant in presence of various ionic polymer adsorbents. We observed no meaningful adsorption of phenol by the styrene-based ionic fluoropolymer with removal efficiency approaching ~2% monitored over a period of 60 minutes whereas styrene-based ionic hydrocarbon polymer showed slow kinetics of increasing phenol adsorption with maximum phenol removal efficiency of ~12% over the same duration of 60 minutes (FIG. 15). On the other hand, kinetic adsorption experiments performed in presence of high surface area powdered activated carbon displayed rapid and efficient adsorption of phenol with more than 70% phenol removal within 15 minutes of sorption before saturation of adsorption sites as seen from the FIG. 15. Again, rapid and efficient PFOA removal was observed in presence of the fluoropolymer while no phenol removal by fluoropolymer under similar experimental conditions (FIGS. 16 and 17). These results clearly demonstrated high selectivity of ionic fluoropolymer for PFOA contaminant removal in the class of perfluorocarboxylic acids (PFCAs). It also displayed complex interplay between role of hydrophobic interactions and surface adsorption sites of adsorbents. Phenol with pKa~10, predominantly exists in protonated form in aqueous solutions at acidic pH ~3, with strong intermolecular hydrogen bonding in water. Therefore, it is expected that electrostatic component of ionic polymers would not play a major role via anion exchange in phenol separation and predominant mechanism of phenol removal would be attributed to hydrophobic interactions coupled with high surface area adsorbent support. Despite the presence of aromatic moieties in ionic fluoropolymer backbone (Step III), combination of low surface area, weak electrostatic and weak noncovalent forces of interactions with the fluoropolymer and strong intermolecular hydrogen bonding in water all likely resulted in negligible phenol removal by the fluoropolymer. Upon switching to styrene-based hydrocarbon polymer, it displayed minor but considerably improved efficacy for phenol removal which was possibly due to improved hydrophobic interactions between the ionic hydrocarbon polymer without fluorous component and phenol. Nonetheless, results indicated ionic fluoropolymer designed here could selectively remove PFAS from water through synergistic roles of fluorophilic interactions and anion exchange at both environmentally relevant concentrations in mg/L range as well as at high PFOA concentrations in mM range.

Figure 18:
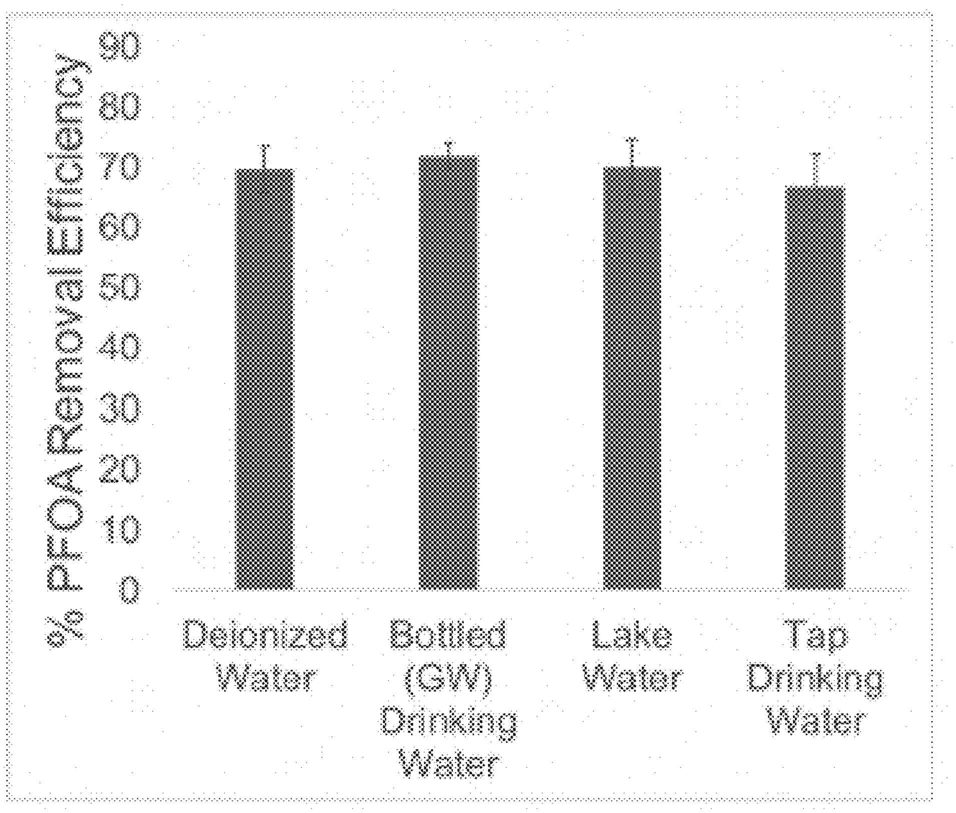
FIG. 18 is a graph of the percentage PFOA removal after 11 h of equilibrium adsorption by ionic fluoropolymer in diverse water matrices including real environmental water samples collected from Lake Martin, Louisiana all spiked with 3.84 mM PFOA.
Figure 19:
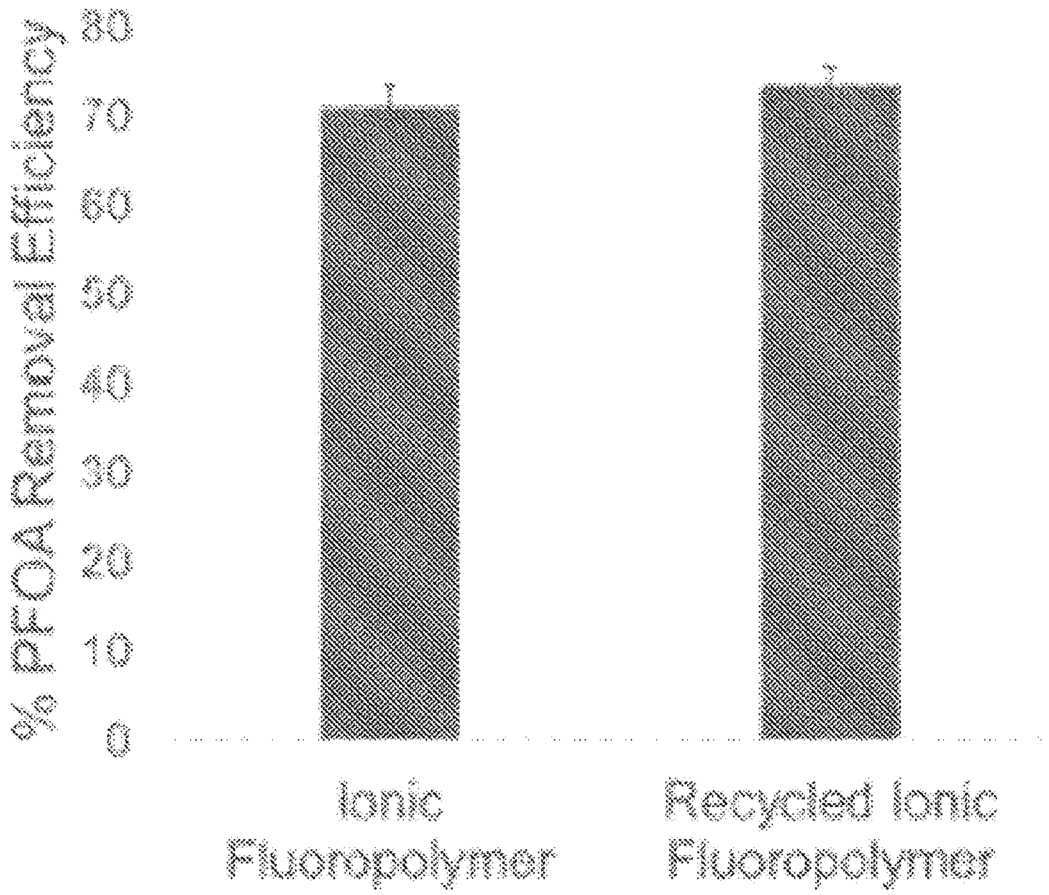
FIG. 19 is a graph the recyclability performance of the ionic fluoropolymer after regeneration in 3 h adsorption equilibrium using PFOA as model PFAS compound spiked at 3.84 mM initial PFOA concentration [Sorbent loading]=5 mg/mL: $[PFOA]_0$=3.84 mM, pH=2.69.

FIG. 18 is a graph of the percentage PFOA removal after 11 h of equilibrium adsorption by ionic fluoropolymer in diverse water matrices including real environmental water samples collected from Lake Martin, Louisiana all spiked with 3.84 mM PFOA. FIG. 19 shows the recyclability performance of the ionic fluoropolymer after regeneration in 3 h adsorption equilibrium using PFOA as model PFAS compound spiked at 3.84 mM initial PFOA concentration [Sorbent loading]=5 mg/mL; $[PFOA]_0$=3.84 mM, pH=2.69.

After benchmarking the ionic polymer materials in the removal of representative perfluoroalkyl carboxylic acids (PFCAs) such as PFOA and PFOS anions in simulated water (FIGS. 16 and 17), fluoropolymer was investigated in real environmental water matrices collected from Lake Martin, Louisiana and spiked with high concentration of PFOA at 3.84 mM. At the same time, deionized water, tap drinking water and RO purified bottled drinking water all spiked at 3.84 mM initial PFOA concentrations were used as reference water matrices. Batch equilibrium adsorption experiments of each water samples using ionic fluoropolymer adsorbent (5 mg/mL) for 3 h sorption, resulted in more than >70% PFOA removal in all water matrices tested within the experimental measurement uncertainties (FIGS. 18 and 19). Real water matrices collected from lakes such as Lake Martin, Louisiana contain and are exposed to complex mixtures of organic and inorganic constituents which are difficult to simulate in a laboratory setting. Some inorganic constituents found in Lake Martin water samples included fluoride (0.02 ppm), chloride (5.15 ppm), sulfate (<0.005 ppm), nitrate (0.125 ppm), nitrite (1.395 ppm) and phosphate (<0.005 ppm) measured elsewhere.[61] Again, the fact that ionic fluoropolymer removed PFOA from lake water in presence of dissolved organic matter and a number of interfering anions with high efficiency comparable to removal efficiency observed in pure water matrices strongly indicated excellent selectivity of polymer for PFAS removal from real environmental water. This provided further support for the proposed mechanistic framework for PFAS adsorption as seen from FIG. 20.

Figure 20:
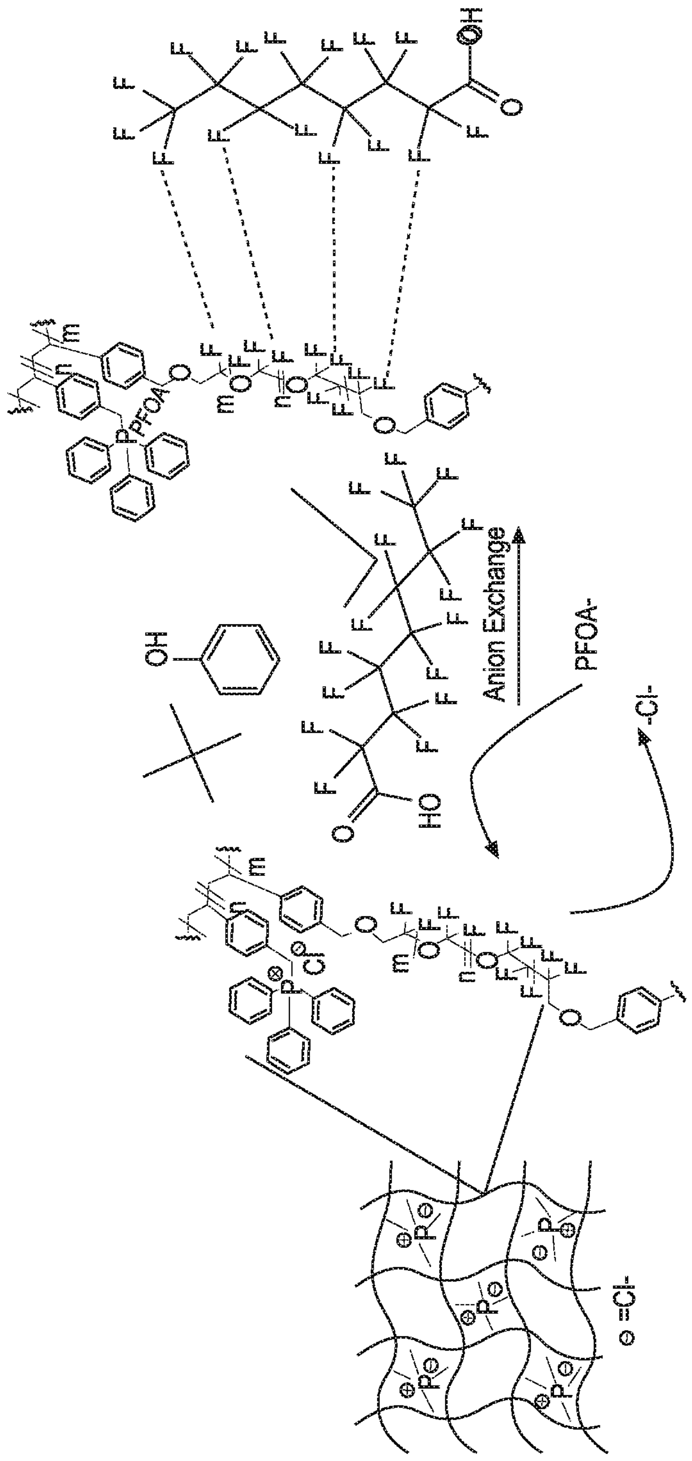
FIG. 20 depicts a mechanistic illustration of selective PFAS removal by ionic fluoropolymer through electrostatic, favorable non-covalent interactions and hydrophobic interactions acting cooperatively.
Figure 21:
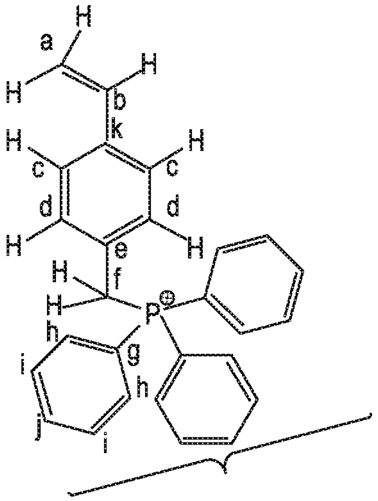
FIG. 21 is a $^{13}C$ NMR spectrum of triphenyl vinyl benzyl phosphonium chloride (100 MHz, 298K, $CDCl_3$).
Figure 21:
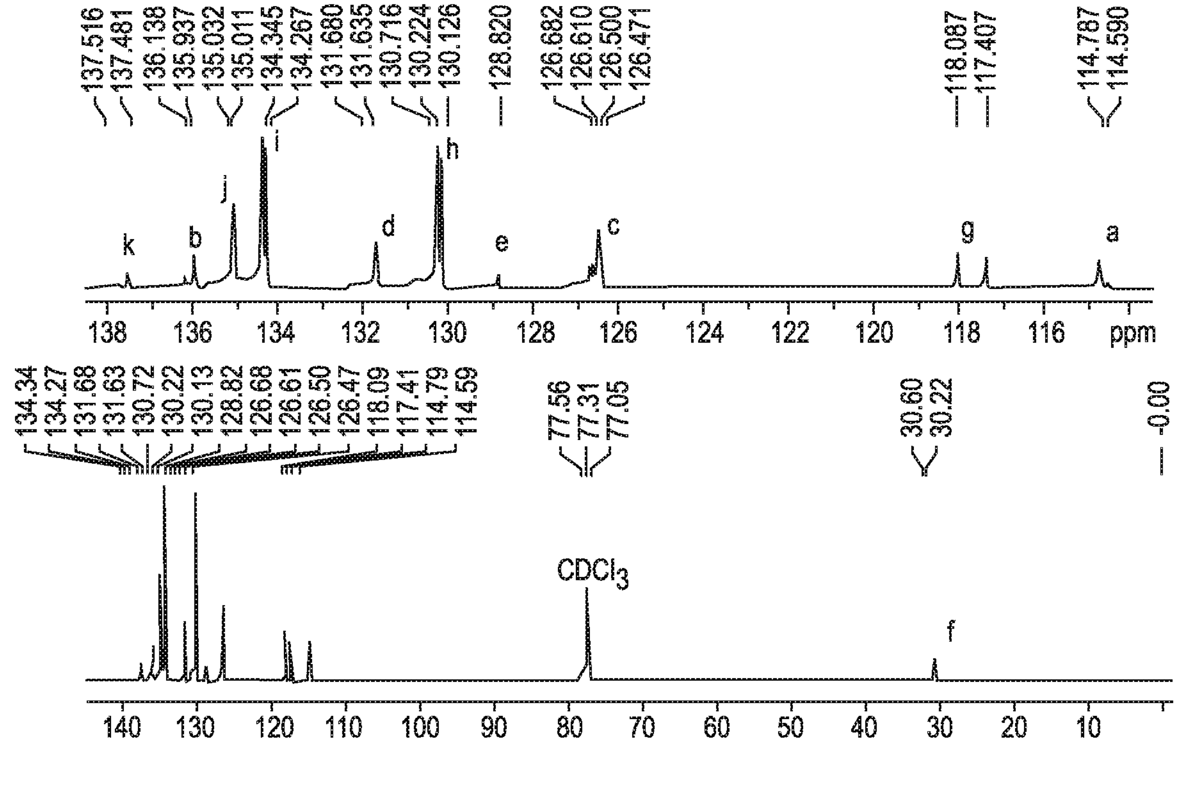
Figure 22:
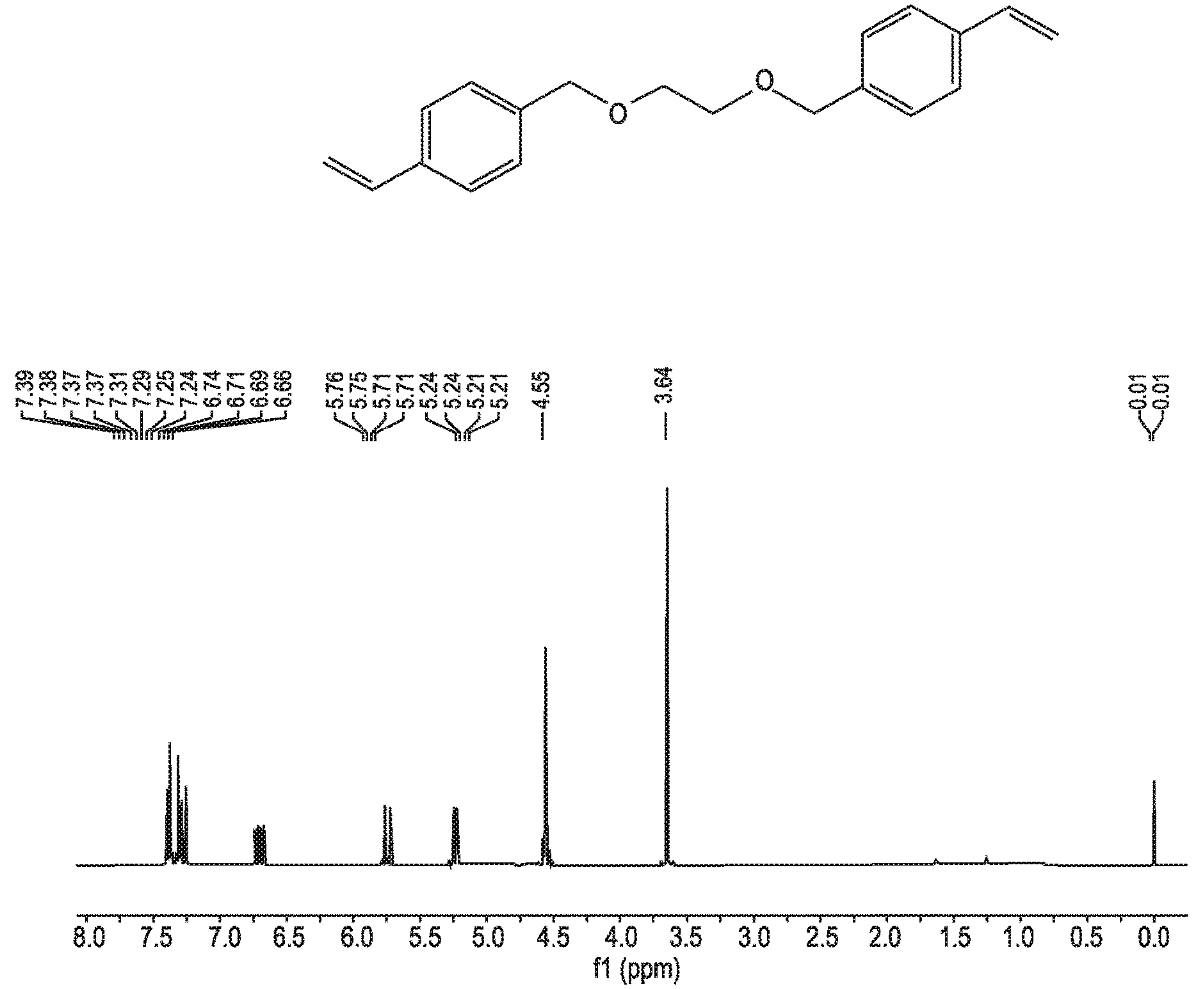
FIG. 22 is a 1H NMR spectrum of 1,2-Bis(4-vinylbenzyloxy) ethane monomer (400 MHZ, 298K, $CDCl_3$).
Figure 23:
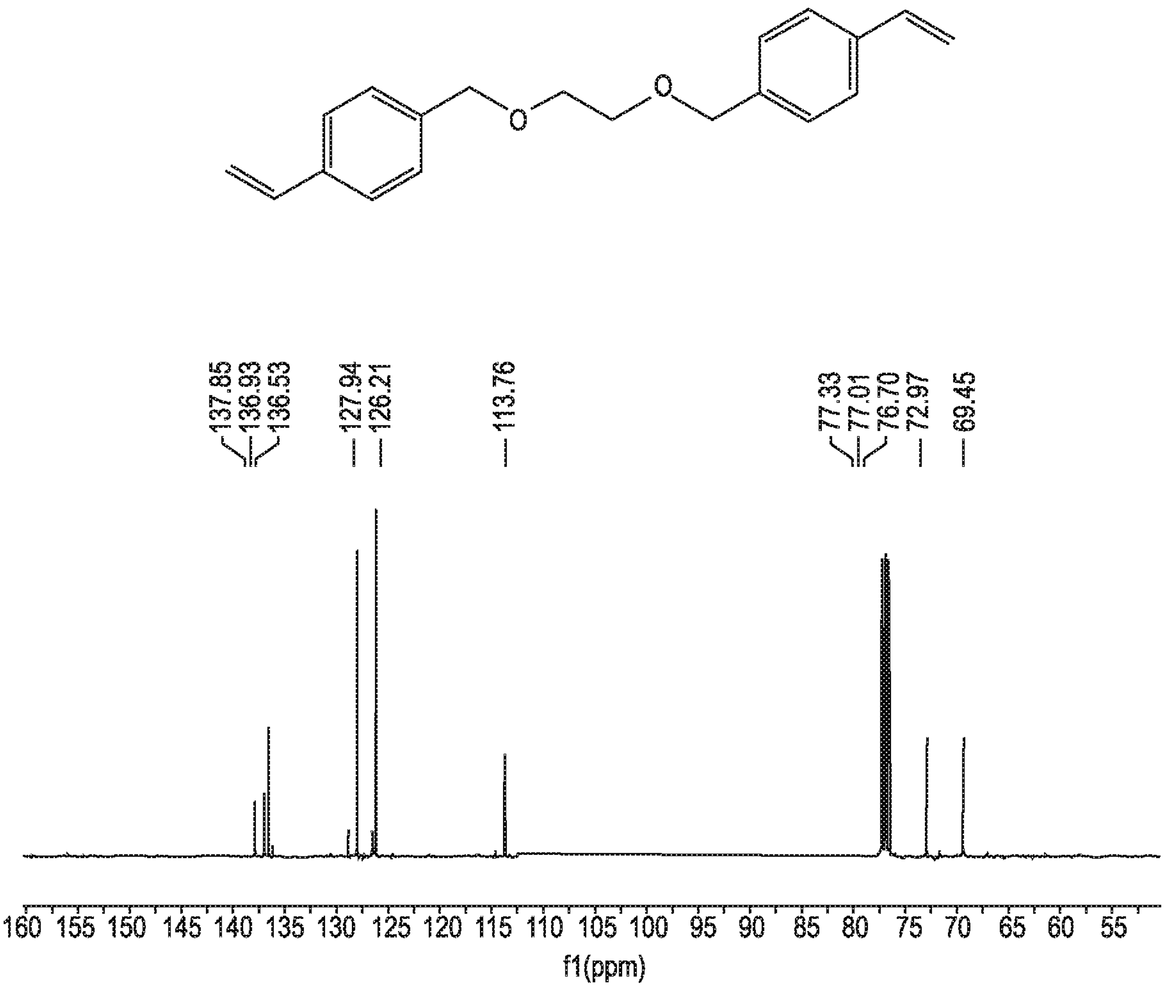
FIG. 23 is a $^{13}C$ NMR spectrum of 1,2-Bis(4-vinylbenzyloxy) ethane monomer (100 MHZ, 298K, $CDCl_3$).
Figure 24:
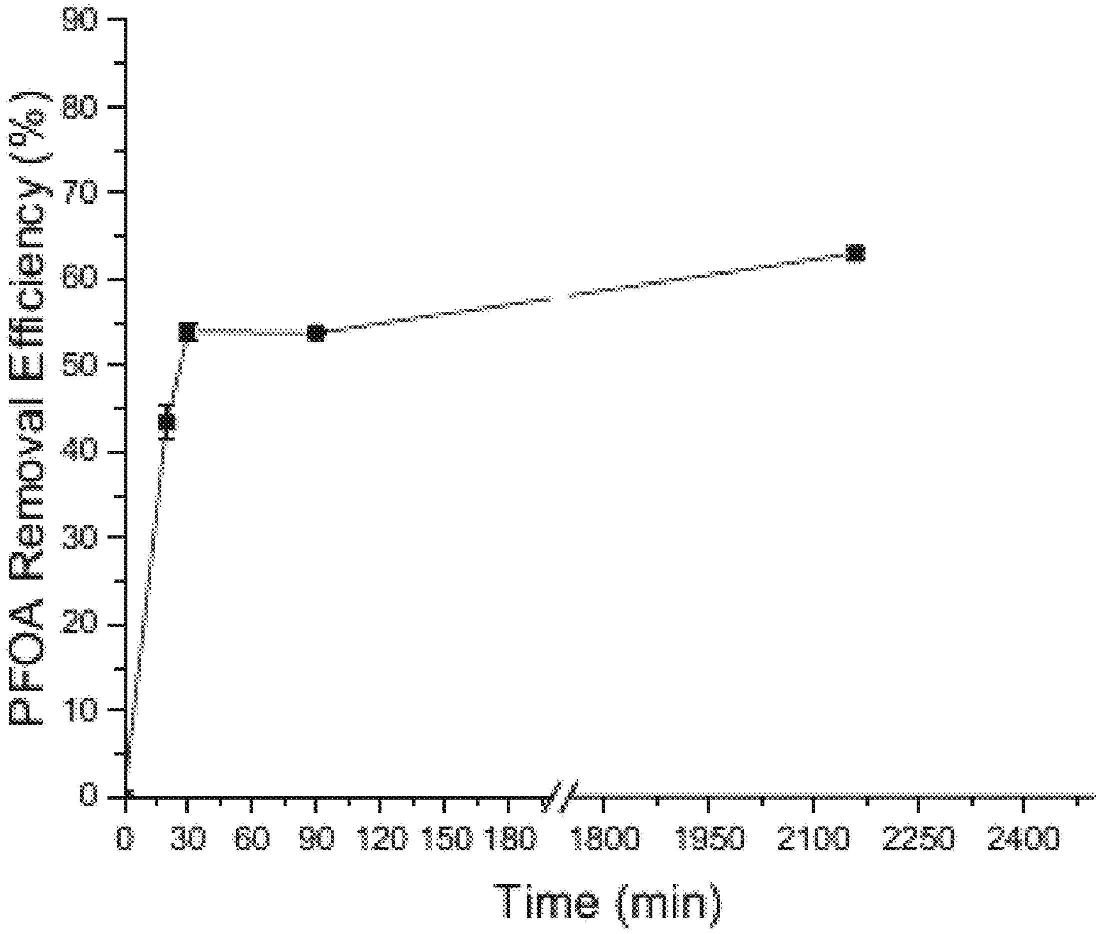
FIG. 24 is a graph of the kinetics of PFOA removal efficiency by ionic fluoropolymer in local drinking water studied at wide dynamic range (0.16 μM to 5.92 mM) of initial PFOA concentrations employed. [sorbent]=5 mg/mL: $[PFOA]_0$=5.92 mM in drinking water matrix, pH~2.60
Figure 25:
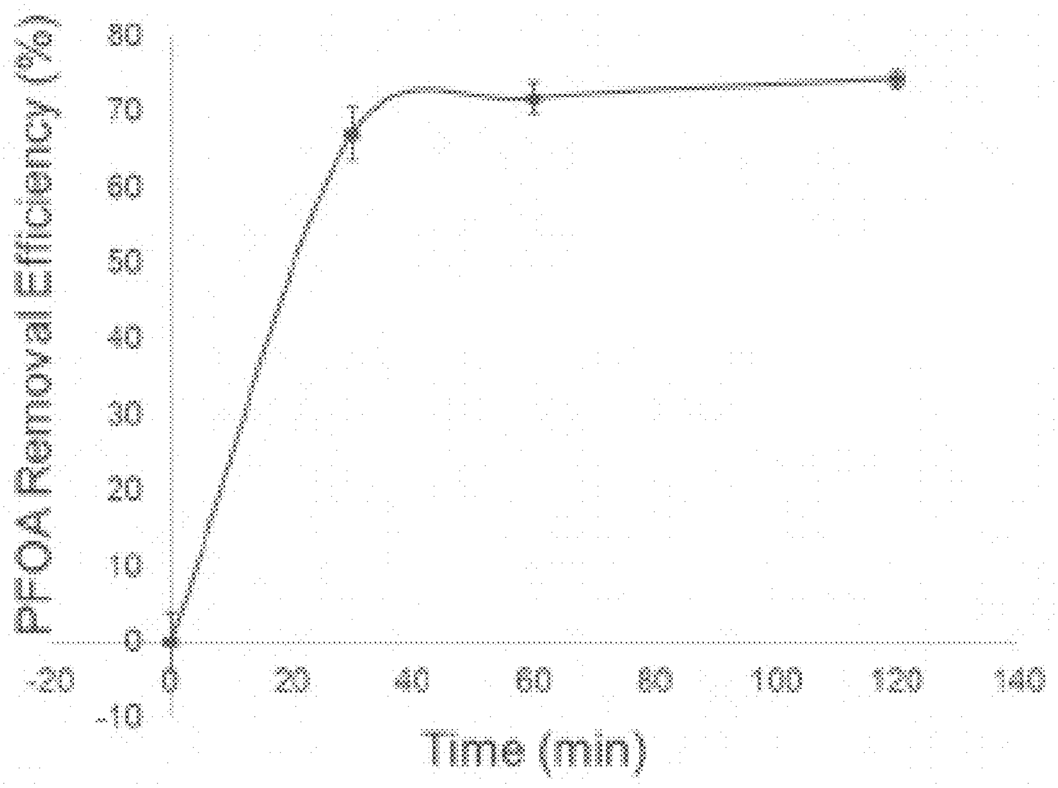
FIG. 25 is a graph of the kinetics of PFOA removal efficiency by ionic fluoropolymer in local drinking water studied at wide dynamic range (0.16 μM to 5.92 mM) of initial PFOA concentrations employed. [sorbent]=170 mg/L: $[PFOA]_0$=0.16 μM or 66 ppb in deionized water matrix, pH~5.66.
Figure 26:
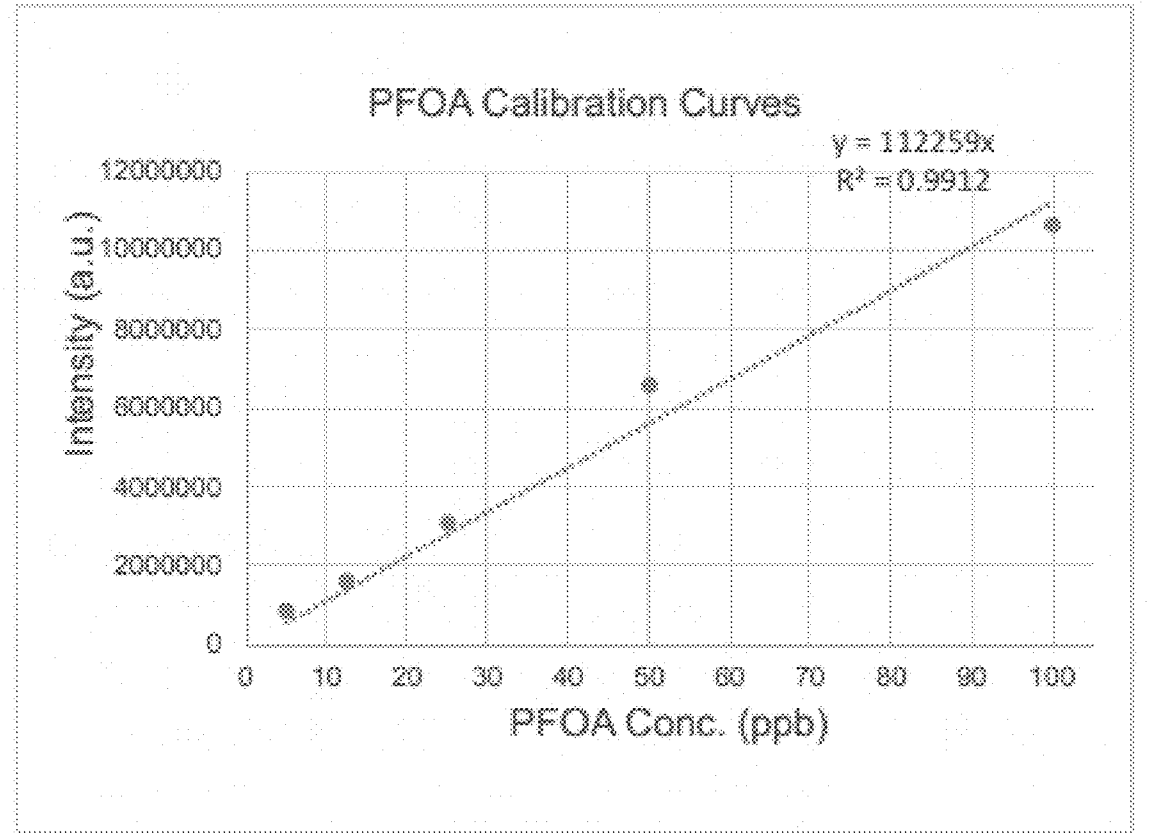
FIG. 26 is a graph of the PFOS calibration standards prepared in the range from 0.1 ppb to 100 ppb analyzed by LC-MS.
Figure 27:
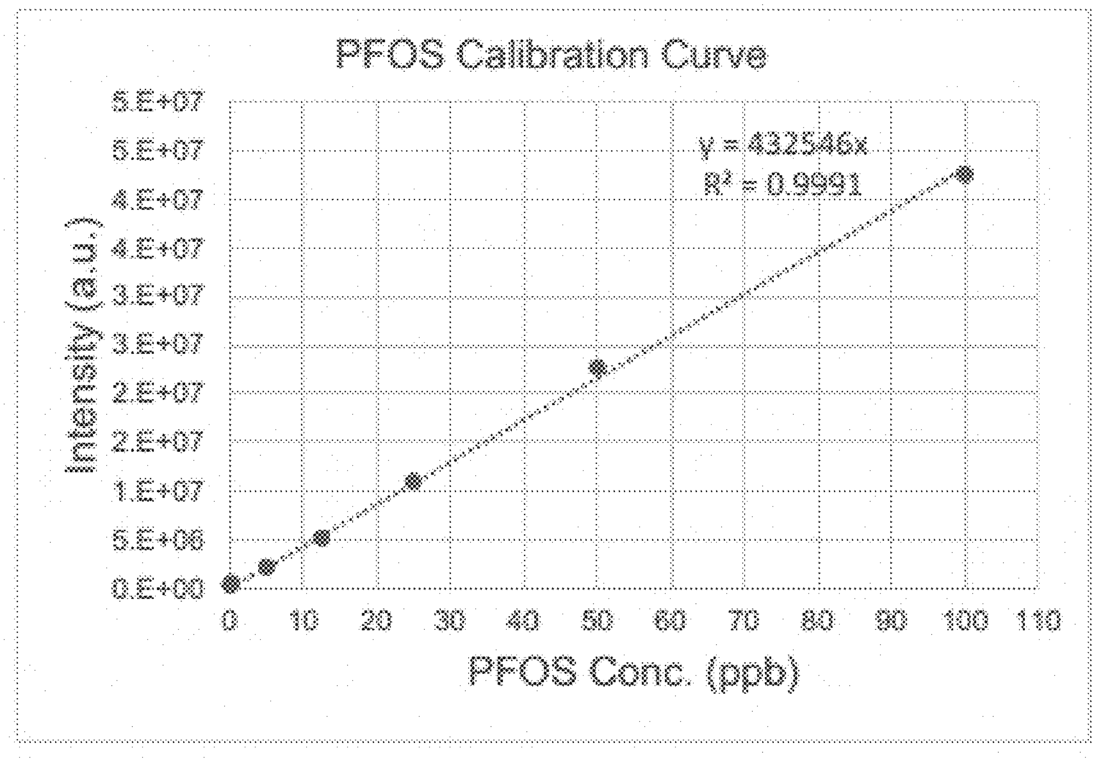
FIG. 27 is a graph of the PFOS calibration standards prepared in the range from 0.1 ppb to 100 ppb analyzed by LC-MS.
Figure 28:
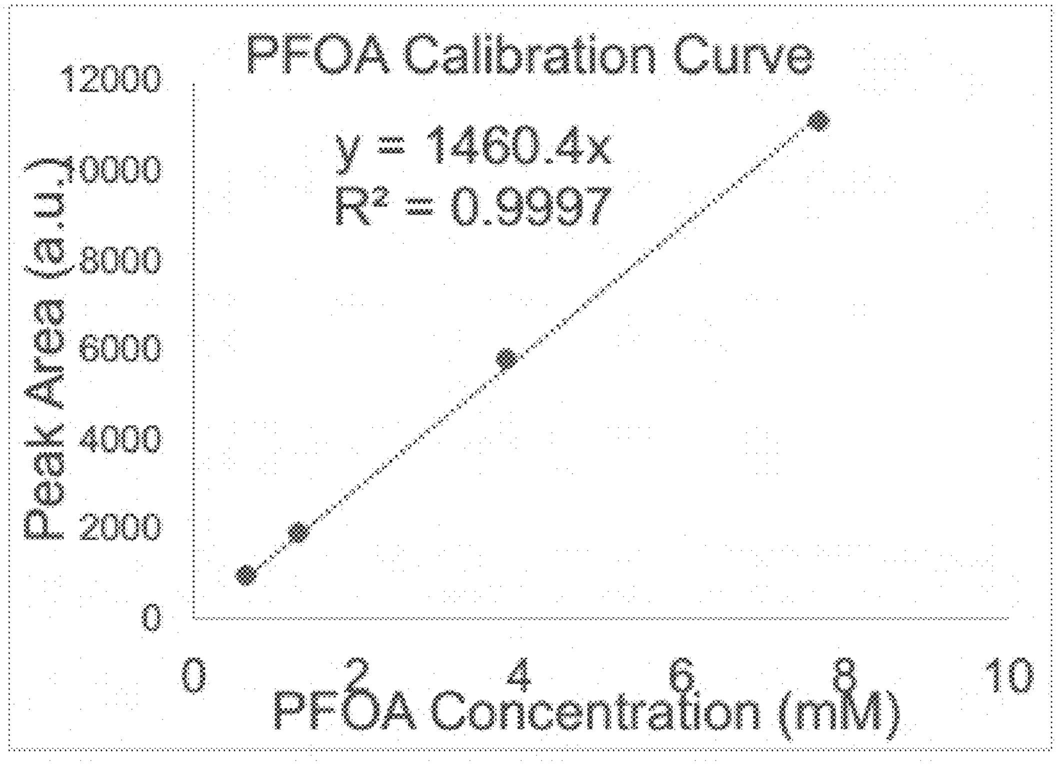
FIG. 28 is a graph of the PFOS calibration standards prepared in the range from 0.64 mM to 7.68 mM analyzed by HPLC method.

Furthermore, we tested the reusability of ionic fluoropolymer to be able to regenerate the fluoropolymer after PFOA sorption by soaking and mild agitation with 400 mM methanolic ammonium acetate solution to desorb PFOA and regenerate polymer for subsequent reuse cycles. FIG. 20 shows that the ionic fluoropolymer could be regenerated efficiently for additional reuse in batch equilibrium adsorption experiments without any loss in the performance by the polymer which is fascinating feature of these type of polymeric materials. Also, in a separate series of experiments it was found that the aqueous fluoropolymer prepared in deionized water containing PFOS (Initial concentration of PFOS=58 ppb) re-examined after 4 months of storage showed similar >85% PFOS removal efficiency as found before 4 months (FIG. 19). These polymers can be reused because of their recycling potential and durability and a concentrated stream of PFAS could be easily discarded or destroyed by utilizing established or emerging technologies like incineration.[26-31]

Styrene-based perfluorinated anion exchange polymer composition bearing quaternary tetra-aryl phosphonium cation moiety was synthesized by radical polymerization method. Ionic fluoropolymer exhibited excellent PFOA/PFOS removal at both ultralow environmentally relevant concentrations (sub-ppb level) and in concentrated stream of PFOA solutions with sorption capacity exceeding much greater than that of powdered activated carbon (charcoal) in batch equilibrium adsorption studies. Structure-property correlation studies performed by various ionic polymers showed critical requirement of fluorophilic groups along with cation units in highly selective PFOA/PFAS removal from waters in presence of organic hydrocarbons such as phenol. Irreversible electrostatic interaction through anion exchange coupled with noncovalent fluorophilic interactions drive PFAS removal by ionic fluoropolymer. Like in pure deionized water, ionic fluropolymer efficiently removed PFOA from real environmental water matrices collected from Lake Martin, Louisiana spiked with PFOA in presence of background inorganic constitutents, micropollutants and dissolved organic matter. Thus, this study has potential of the ionic fluoropolymers in developing water purification technologies targeting rapid and selective separation of perfluoroalkyl species from diverse PFAS compounds under environmentally relevant concentrations and beyond at target contaminated sites.

HPLC Analysis

HPLC analyses of PFOA, and phenol were performed by employing high performance liquid chromatography (HPLC) with isocratic elution on an Agilent 1100 series instrument coupled with variable wavelength UV detector. PFOA was detected by Zorbax SB-C18 Rapid Resolution column (1.8 μm, 50×2.1 mm) while using methanol and 20 mM ammonium acetate mixture (75:25 v/v) as the mobile phase at a flow rate of 0.22 mL/min and detection wavelength of 210 nm for PFOA quantification.

LC-MS Analysis

Quantification of target perfluoroalkyl acids (PFCAs) post-equilibrium adsorption experiments by mass spectrometric measurements were conducted on a Bruker amaZon Speed ETD (Billerica, MA) ion trap mass spectrometer coupled to a Thermo Scientific Ultimate 3000 RS HPLC system (Waltham, MA). The system was controlled with Bruker TrapControl software (ver. 8.0) and Bruker Compass HyStar (Ver. 5.18.1). Samples were injected in flow through mode with an isocratic mobile phase composition consisting of 50% water with 0.1% formic acid and 50% acetonitrile with 0.1% formic acid, and the flow rate was kept at 0.4 mL/min. Capillary voltage was set at 4,500 V, while the end plate offset was 500 V. The nebulizer was set to deliver nitrogen gas at 35 psi, while the same gas was used for drying at a flow of 10 L/min and a temperature of 250° C. Spectra were acquired in negative mode with a single reaction monitoring approach. The ion trap was set to accumulate a mass window centered at 413 m/z for PFOA and 499 m/z for PFOS with a 2 Da width. The mass range monitored was 50-600 Da, and accumulation was carried with an ion charge control (ICC) of 200,000 or 10 ms, whichever condition was met first for each spectrum. The system smart parameter setting (SPS) was set to 413 and 3 scans were averaged to generate each data point. Fragmentation vas carried out with a relative amplitude of 100%, and the SmartFrag parameters were set to change this amplitude from 80 to 120% over a 40 ms time. Chromatograms were acquired with rolling averaging of 3 data points. Each sample was injected in three technical replicates.

Data analysis was carried out with Bruker Data Analysis (ver. 5.3). To generate the final chromatographic trace, the MS/MS signal was extracted to output the intensity of the 369 m/z fragment of PFOA which represents the loss of the carboxylic moiety whereas the PFOS was analyzed for signal isolated at m/z 499. Each generate extracted ion chromatogram was manually integrated, and the resulting data were used to calculate a calibration with values between 0.1 and 100 ppb.

MALDI Mass Spectrometry Analysis

MALDI analyses of perfluoropolyether compound (Fluorolink E10-H), and styrene functionalized perfluorinated monomer: MALDI-MS spectra of Fluorolink E10-H precursor and after styrene functionalization in the course of reaction were acquired using a MALDI-TOF/TOF mass spectrometer (UltrafleXtreme, Bruker Daltonics, Billerica, MA, USA) with 5 ppm mass accuracy. The sample is generally mixed with a matrix mixture (DHB, 2,5-dihydroxybenzoic acid in THF) and NaTFA, trifluoroacetic acid sodium salt (dopant) in equal amounts. A 1 μL aliquot of each mixture was deposited on the MALDI target plate. This approach is called "Dry droplet" method. The same mixture (1:1:1, sample, matrix, and dopant) was also recreated directly on plate by spiking a 1 μL of each component on the same sample well. This approach is called "on-plate mixing" method.

External calibration was performed with a standard mixture of peptides to verify intensity and resolution benchmarks. Spectra were recorded in negative ion mode in the mass range 700-3860 m/z. Each spot was irradiated in 40 random locations with 25 laser shots each, resulting in a total of 1000 laser shots. The signal from these 1000 shots was summed to generate a representative spectrum of each spot. If not otherwise stated, the same number of shots (1,000) was used to generate all spectra. The standard deviation of the calibration was 5 ppm. Data were analyzed with Bruker flexAnalysis 3.3 software and exported to mzXML file format for sharing purposes.

Nuclear Magnetic Resonance (NMR) Spectroscopy

Solution state $^{1}$H and $^{13}$C NMR spectra were mainly recorded using a Bruker Avance AVIII-400 MHz NMR spectrometer or a Varian 400 MHz NMR spectrometer in specified deuterated solvents. Some $^{13}$C NMR spectra were recorded on High-Performance 60 MHz Benchtop NMR from Nanalysis.

Fourier-Transform Infrared (FTIR) Spectroscopy

Fourier transform infrared spectroscopy (FTIR) was performed using an Agilent Cary 630 attenuated total reflection (ATR) FTIR spectrometer in frequency range 650-4000 $cm^{-1}$.

Surface Area Analysis

The Brunauer-Emmett-Teller (BET) surface area and the porosity of the fluoropolymer was measured by nitrogen physisorption data at 77 K obtained with the Nova Touch LX gas sorption analyzer from Quantachrome Instruments.

Synthesis of Styrene Substituted Fluorinated Monomer:

In a 100 ml round bottom flask, 8.50 gm (~5 mmol) of perfluoropolyether diol compound (Fluorolink E10 H, Average MW ~1700 amu) is dissolved in 15 mL DMF and flushed with $N_2$. Sodium hydride, NaH in excess (0.46 gm, 3.9 eq., 19.46 mmol, hexane washed to remove oil) is slowly added to the Fluorolink E10 H while keeping flask in an ice bath and then allowed to stir for about 1.5 h at the room temperature. This is followed by dropwise addition of vinyl benzyl chloride (1.78 gm, 11.66 mmol, 2.3 eq.) into the above reaction mixture immersed in an ice bath (set at ~10° C.) using a syringe pump and the reaction is allowed to continue up to 72 h while keeping the reaction temperature below 20° C. to obtain styrene substituted compound. Post reaction, DMF is removed under reduced pressure at ~50° C. using the rotary evaporator. 125 mL of water is added to the reaction mixture and the solution is extracted thrice with 75 mL of dry diethyl ether or ethyl acetate using a separatory funnel.

Ether extracts are combined and then dried under vacuum to obtain the styrene substituted perfluoropolyether compound as light-yellow viscous liquid (yield, ~5.80 gm).

$^{1}$H NMR (400 MHz, DMSO-d6) δ 2.88 (residual DMF) 3.554-3.390 (broad), 4.637 (s), 5.379, 5.357 (d, J=8.8 Hz), 5.967, 5.932 (d, J=14 Hz), 6.825, 6.803, 6.790, 6.768 (dd), 7.615, 7.598 (d, J=6.8 Hz) 7.587, 7.570 (d, J=6.8 Hz)

Synthesis of Styrene Substituted Hydrocarbon Based Non-Fluorinated Monomer Analogue, 1,2-Bis(4-vinylbenzyloxy) ethane Synthesis of 1,2-Bis (4-vinylbenzyloxy) ethane monomer is achieved following the protocol established from literature.[1] Ethylene glycol (1.23 gm, 20 mmol) dissolved in DMF (40 mL) is treated with NaH (1.85 gm, 46 mmol) for 1 hour at room temperature followed by dropwise addition of 4-vinyl benzyl chloride (7.03 gm, 46 mmol) to the reaction flask submerged in an ice-cold water bath set at ~10° C. and allowed to stir up to 22 h. Post-reaction DMF is removed under vacuum at 50° C. and 100 mL of water is added to reaction flask and the reaction product is purified by extraction thrice with 75 mL of dry diethyl ether in a separatory funnel. All ether extracts are combined and then dried under reduced pressure using rotary evaporator to obtain the light-yellow liquid product.

$^{1}$H NMR (400 MHz, $CDCl_3$) d 3.64 (s) 4.55 (s), 5.24, 5.21 (d, J=12 Hz), 5.75, 5.71 (d, J=16 Hz), 6.74, 6.71, 6.69, 6.66 (dd), 7.39, 7.37 (d, J=8 Hz) 7.31, 7.29 (d, J=8 Hz).

Synthesis of Triphenyl 4-Vinyl Benzyl Phosphonium Chloride Monomer

The synthesis of triphenyl 4-vinyl benzyl phosphoniun chloride is accomplished by following nucleophilic substitution reaction between triphenyl phosphine and 4-vinyl benzyl chloride at mild temperatures published elsewhere.[2] In a typical procedure, triphenyl phosphene (5.58 gm, 21.29 mmol) and 4-vinyl benzyl chloride (6.50 gm, 42.58 mmol) in 1:2 molar ratio and 6 mL of dry methanol is placed in a 100 mL round bottom flask. The reaction flask is attached with reflux condenser and heated on pre-heated oil bath at 40° C. for 24 h under inert $N_2$ atmosphere. After the reaction, methanol was evaporated using a rotary evaporator and the entire liquid mass was dissolved in 15 ml dichloromethane. The solid ionic monomer is isolated by precipitation in excess hexane (125 mL). The same purification process was repeated twice to obtain the solid monomer product (product yield~7.35 gm), triphenyl 4-vinyl benzyl phosphonium chloride with ~88% yield and kept in a refrigerator for subsequent use in copolymerization reaction.

$^{1}$H NMR (400 MHz, $CDCl_3$) d 5.296 (residual DCM) 5.230, 5.208 (d J=8.8 Hz), 5.677, 5.642 (d, J=14 Hz), 6.612, 6.590, 6.577, 6.555 (dd), 5.451, 5.422 (d) 7.141 (m), 7.051 (m), 7.743-7.598 (m).

Thermally Induced Copolymerization Reaction

In a 20 mL scintillation vial equipped with magnetic stir bar, 1.60 gm of styrene substituted perfluoropolyether compound (1.60 gm, 80 wt %), triphenyl 4-vinyl benzyl phosphonium chloride (0.40 gm, 20 wt %), azobisisobutyronitrile (AIBN, 20 mg, 1 wt %) and DMF (2.0 gm) is placed. The vial is sealed with rubber septum and flushed with $N_2$ for 5 minutes and then immersed in oil bath heated to 70° C. under stirring for 5 h in presence of inert $N_2$ atmosphere. Solid gel like particles is obtained within 15-20 minutes and the entire mass is gelled after 1 h of reaction. After 5 h reaction, vial is naturally cooled to room temperature and solidified gel is finely grounded into powder form to obtain the cross-linked ionic fluoropolymer (yield~1.90 gm) that is dried under vacuum at room temperature for application in water treatment experiments.

Similarly, in the preparation of non-fluorinated hydrocarbon-based ionic polymer analogue, proportional amounts of 1,2-Bis (4-vinylbenzyloxy) ethane monomer (0.40 gm, 80 wt %), triphenyl 4-vinyl benzyl phosphonium chloride monomer (0.1 gm, 20 wt %), azobisisobutyronitrile (AIBN, 5 mg, 1 wt %) all dissolved in DMF (0.5 gm) is taken in a 20 mL scintillation vial and copolymerization reaction is carried out for 5 h at 70° C. under $N_2$ atmosphere to obtain the styrene-based hydrocarbon polymer solid which is finely grounded into powder using mortar and pestle.

Reaction Scheme for the Synthesis of Styrene Functionalized Hydrocarbon Based Ionic Polymer Synthesis of 1,2-Bis(4-vinylbenzyloxy) ethane, monomer

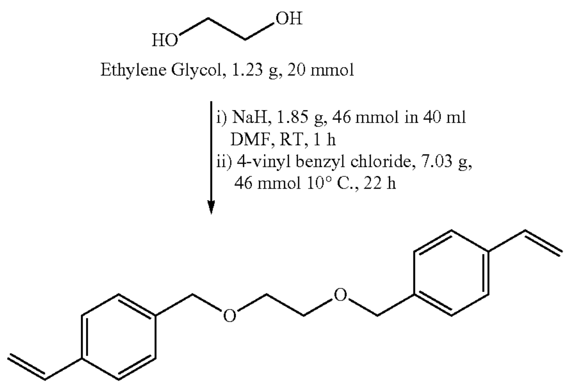

Styrene substituted hydrocarbon based monomer, 1,2-Bis(4-vinylbenzyloxy)ethane)

Copolymerization reaction between 1,2-Bis(4-vinylbenzyloxy) ethane and triphenyl vinyl benzyl phosphonium chloride

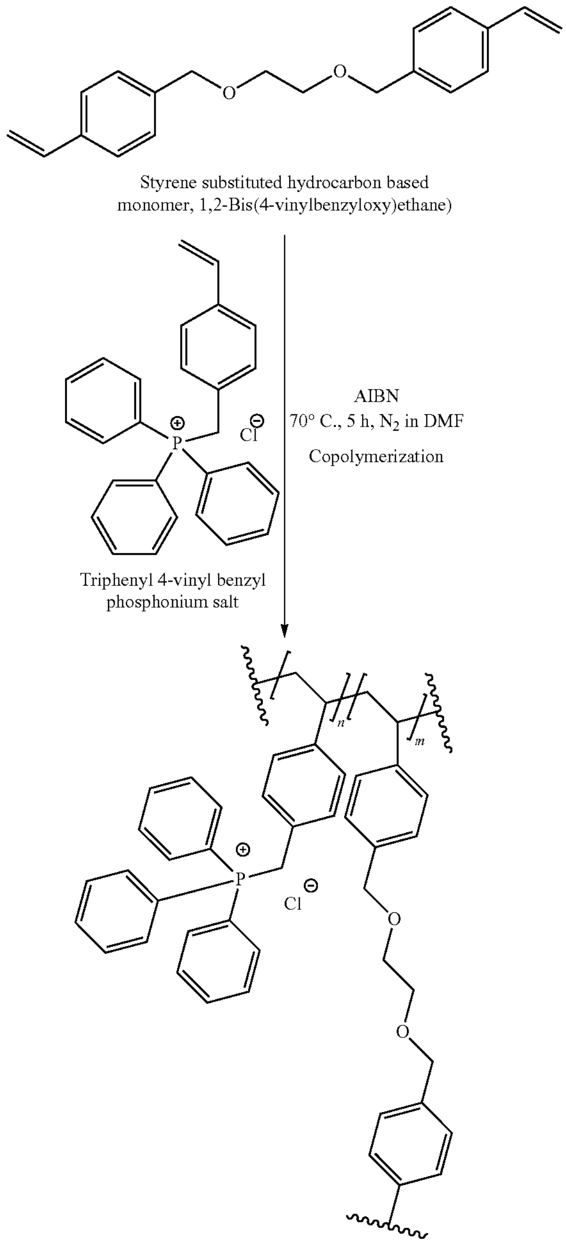

Styrene based ionic hydrocarbon polymer

For the development of new ion-exchange polymers in remediation of Per- and polyfluoro alkyl substances, styrenic fluoropolymers compositions containing a quaternary tetra-aryl phosphoniun bearing styrene moiety for styrenic fluoropolymers were made, and their selective removal of perfluorooctanoic acid (PFOA) and perfluorooctane sulfonic acid (PFOS)—a type of PFAS at sub-ppb level concentrations were demonstrated. Specially, the polymer selectively and rapidly removes PFAS with more than 90% removal efficiency from both deionized and drinking water in presence of other organic co-contaminants such as phenols coupled with excellent stability of polymer. By examining the polymer with different concentrations of PFAS tested, it is implied that ionic fluoropolymer designed herein favors PFOA and PFOS anions over other competing anions or organic species in solution via irreversible anion exchange facilitated by strong van der Waal forces of interactions with fluorine rich backbone of the polymer. Synthesis of the targeted fluoropolymer design, structural characterization, and polymer application in selective removal of PFAS is discussed.

This study has implications in developing water purification technologies targeting rapid and selective separation of perfluoroalkyl species under environmentally relevant concentrations.

NMR Characterization of Compounds:

Triphenyl 4-Vinyl Benzyl Phosphonium Salt (13C: 100 MHz, CDCl3), δ (ppm) 137.51, 135.93, 135.03, 134.34, 131.68, 130.22, 128.82, 126.50, 118.08, 114.78, 30.60

(1H: 400 MHz, CDCl3), δ (ppm) 7.70 (m, 15H), 7.13 (d, 8 Hz, 2H), 7.04 (d, 8 Hz, 2H), 6.59, (dd, 10.8 Hz, 17.6 Hz, 1H)

Styrene-Substituted Perfluoropolyether Compound (1H: 400 MHz, CDCl3), δ (ppm) 7.43-7.26 (m, 8H), 6.73-6.68 (m, 1H), 7.75 (dd, 11.6 Hz, 14 Hz, 1H), 5.25 (dd, 8.4 Hz, 17.2 Hz, 1H), —OCH2 should be singlet, 3.88-3.62 (m, polymeric chain hydrogen), 13C: 15 MHz, DMSO-D6), δ (ppm) 136.48, 133.82, 129.44, 126.74, 115.11 (substituted styrene carbons), 71.50, 69.27, 67.18, 46.32 (perfluoro polyether carbons) 41.33-37.15 (DMSO-D6- septet)

(19F: 376 MHz, $CDCl_3$), δ (ppm) 51.86-55.33 ($—OCF_2$), 77.93 and 80.05 ($—CF_2$), 88.97-88.99 and 90.81 ($—OCF_2CF_2$)

One of ordinary skill in the art will readily appreciate that alternative, but functionally equivalent components, materials, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 10 carbon atoms, 1 to 8 carbon atoms, 1 to 6 carbon atoms, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "charged" refers to a material that has an ionic group as part of its chemical structure. A negatively charged material is an anion and a positively charged material is a cation. An oppositely charged counterion is typically associated with the ionic group. Adjusting the pH can alter the charge of some ionic groups.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. It should also be appreciated that the numerical limits may be the values from the examples. Certain lower limits, upper limits and ranges appear in at least one claims below. All numerical values are "about" or "approximately" the indicated value, and take into account experimental error and variations that would be expected by a person having ordinary skill in the art.

REFERENCES

1. Lindstrom, A. B.; Strynar, M. J.; Libelo, E. L., Polyfluorinated compounds: past, present, and future. Environmental science & technology 2011, 45 (19), 7954-7961.
2. Kissa, E., Fluorinated surfactants and repellents. CRC Press: 2001; Vol. 97.
3. Barzen-Hanson, K. A.; Roberts, S. C.; Choyke, S.; Oetjen, K.; McAlees, A.; Riddell, N.; McCrindle, R.; Ferguson, P. L.; Higgins, C. P.; Field, J. A., Discovery of 40 classes of per- and polyfluoroalkyl substances in historical aqueous film-forming foams (AFFFs) and AFFF-impacted groundwater. Environmental science & technology 2017, 51 (4), 2047-2057.
4. Wang, Z.; DeWitt, J. C.; Higgins, C. P.; Cousins, I. T., A never-ending story of per- and polyfluoroalkyl substances (PFASs)? ACS Publications: 2017.
5. Wei, Z.; Xu, T.; Zhao, D., Treatment of per- and polyfluoroalkyl substances in landfill leachate: status, chemistry and prospects. Environmental Science: Water Research & Technology 2019, 5 (11), 1814-1835.
6. Sun, M.; Arevalo, E.; Strynar, M.; Lindstrom, A; Richardson, M.; Kearns, B.; Pickett, A.; Smith, C.; Knappe, D. R., Legacy and emerging perfluoroalkyl substances are important drinking water contaminants in the Cape Fear River Watershed of North Carolina. Environmental science & technology letters 2016, 3 (12), 415-419.
7. Gebbink, W. A.; Van Asseldonk, L.; Van Leeuwen, S. P., Presence of emerging per- and polyfluoroalkyl substances (PFASs) in river and drinking water near a fluorochemical production plant in the Netherlands. Environmental science & technology 2017, 51 (19), 11057-11065.
8. Whitehead, H. D.; Venier, M.; Wu, Y.; Eastman, E.; Urbanik, S.; Diamond, M. L.; Shalin, A.; Schwartz-Narbonne, H.; Bruton, T. A.; Blum, A.; Wang, Z.; Green, M.; Tighe, M.; Wilkinson, J. T.; McGuinness, S.; Peaslee, G. F. Fluorinated Compounds in North American Cosmetics. *Environ. Sci. Technol. Lett.* 2021, 8, 538-544.
9. Hopkins, Z. R.; Sun, M.; DeWitt, J. C.; Knappe, D. R., Recently detected drinking water contaminants: GenX and other per- and polyfluoroalkyl ether acids. Journal-American Water Works Association 2018, 110 (7), 13-28.
10. Kwiatkowski, C. F.; Andrews, D. Q.; Bimbaum, L. S.; Bruton, T. A.; DeWitt, J. C.; Knappe, D. R.; Maffini, M. V.; Miller, M. F.; Pelch, K. E.; Reade, A., Scientific basis for managing PFAS as a chemical class. Environmental Science & Technology Letters 2020, 7 (8), 532-543.
11. Barry, V.; Winquist, A.; Steenland, K., Perfluorooctanoic acid (PFOA) exposures and incident cancers among adults living near a chemical plant. Environmental health perspectives 2013, 121 (11-12), 1313-1318.

12. Xin, Y.; Ren, X.-M.; Wan, B.; Guo, L.-H., Comparative in vitro and in vivo evaluation of the estrogenic effect of hexafluoropropylene oxide homologues. Environmental science & technology 2019, 53 (14), 8371-8380.
13. Sheng, N.; Cui, R.; Wang, J.; Guo, Y.; Wang, J.; Dai, J., Cytotoxicity of novel fluorinated alternatives to long-chain perfluoroalkyl substances to human liver cell line and their binding capacity to human liver fatty acid binding protein. Archives of toxicology 2018, 92 (1), 359-369.
14. Grandjean, P.; Andersen, E. W.; Budtz-Jorgensen, E.; Nielsen, F.; Molbak, K.; Weihe, P.; Heilmann, C., Serum vaccine antibody concentrations in children exposed to perfluorinated compounds. Jama 2012, 307 (4), 391-397.
15. Braun, J. M.; Chen, A.; Romano, M. E.; Calafat, A. M.; Webster, G. M.; Yolton, K.; Lanphear, B. P., Prenatal perfluoroalkyl substance exposure and child adiposity at 8 years of age: The HOME study. Obesity 2016, 24 (1), 231-237.
16. Saikat, S.; Kreis, I.; Davies, B.; Bridgman, S.; Kamanyire, R., The impact of PFOS on health in the general population: a review. Environmental Science: Processes & Impacts 2013, 15 (2), 329-335.
17. Gomis, M. I.; Vestergren, R.; Borg, D.; Cousins, I. T., Comparing the toxic potency in vivo of long-chain perfluoroalkyl acids and fluorinated alternatives. Environment international 2018, 113, 1-9.
18. Sunderland, E. M.; Hu, X. C.; Dassuncao, C.; Tokranov, A. K.; Wagner, C. C.; Allen, J. G., A review of the pathways of human exposure to poly- and perfluoroalkyl substances (PFASs) and present understanding of health effects. Journal of exposure science & environmental epidemiology 2019, 29 (2), 131-147.
19. Rodriguez, K. L.; Hwang, J.-H.; Esfahani, A. R.; Sadmani, A.; Lee, W. H., Recent Developments of PFAS-Detecting Sensors and Future Direction: A Review. Micromachines 2020, 11 (7), 667.
20. Yuqin Wang, Seth B. Darling*, and Junhong Chen* Selectivity of Per- and Polyfluoroalkyl Substance Sensors and Sorbents in Water ACS Appl. Mater. Interfaces 2021, 13, 51, 60789-60814.
21. Ateia, M.; Alsbaiee, A.; Karanfil, T.; Dichtel, W., Efficient PFAS removal by amine-functionalized sorbents: critical review of the current literature. Environmental Science & Technology Letters 2019, 6 (12), 688-695.
22. Kumarasamy, E.; Manning, I. M.; Collins, L. B.; Coronell, O.; Leibfarth, F. A., Ionic fluorogels for remediation of per- and polyfluorinated alkyl substances from water. ACS central science 2020, 6 (4), 487-492.
23. Ji, W.; Xiao, L.; Ling, Y.; Ching, C.; Matsumoto, M.; Bisbey, R. P.; Helbling, D. E.; Dichtel, W. R., Removal of GenX and perfluorinated alkyl substances from water by amine-functionalized covalent organic frameworks. Journal of the American Chemical Society 2018, 140 (40), 12677-12681.
24. Zahra Abbasian Chaleshtari, Reza Foudazi. A Review on Per- and Polyfluoroalkyl Substances (PFAS) Remediation: Separation Mechanisms and Molecular Interactions. ACS ES&T Water 2022, 2 (12), 2258-2272.
25. Imparting Selective Fluorophilic Interactions in Redox Copolymers for the Electrochemically Mediated Capture of Short-Chain Perfluoroalkyl Substances J. Am. Chem. Soc. 2023 https://doi.org/10.1021/iacs.2c10963.
26. Saleh, N. B.; Khalid, A.; Tian, Y.; Ayres, C.; Sabaraya, I. V.; Pietari, J.; Hanigan, D.; Chowdhury, I.; Apul, O. G., Removal of poly- and per-fluoroalkyl substances from aqueous systems by nano-enabled water treatment strategies. Environmental Science: Water Research & Technology 2019, 5 (2), 198-208.
27. Cui, J.; Gao, P.; Deng, Y., Destruction of per- and polyfluoroalkyl substances (PFAS) with advanced reduction processes (ARPs): A critical review. Environmental science & technology 2020, 54 (7), 3752-3766.
28. Sahu, S. P.; Qanbarzadeh, M.; Ateia, M.; Torkzadeh, H.; Maroli, A. S.; Cates, E. L. Rapid degradation and mineralization of perfluorooctanoic acid by a new petitjeanite Bi3O(OH)(PO4)(2) microparticle ultraviolet photocatalyst. Environ. Sci. Technol. Lett. 2018, 5, 533-538.
29. Trang, B.; Li, Y.; Xue, X.; Ateia, M.; Houk, K. N.; Dichtel, W. R. Low-Temperature Mineralization of Perfluorocarboxylic Acids. Science 2022, 377, 839-845.
30. Zizi Li, Zhi-Mei Luo, Yanjun Huang, Jia-Wei Wang, Gangfeng Ouyang. Recent trends in degradation strategies of PFOA/PFOS substitutes. Chemosphere 2023, 315, 137653.
31. Zekun Liu, Zhanghao Chen, Jinyu Gao, Yaochun Yu, Yujie Men, Cheng Gu, Jinyong Liu. Accelerated Degradation of Perfluorosulfonates and Perfluorocarboxylates by UV/Sulfite+Iodide: Reaction Mechanisms and System Efficiencies. Environmental Science & Technology 2022, 56 (6), 3699-3709.
32. Boone, J. S.; Vigo, C.; Boone, T.; Byrne, C.; Ferrario, J.; Benson, R.; Donohue, J.; Simmons, J. E.; Kolpin, D. W.; Furlong, E. T. Per- and Polyfluoroalkyl Substances in Source and Treated Drinking Waters of the United States. Sci. Total Environ. 2019, 653, 359-369.
33. Drinking Water Health Advisory for Perfluorooctanoic Acid (PFOA); EPA, 2016.
34. https://www.eea.europa.eu/publications/emerging-chemical-risks-in-europe (accessed Oct. 9, 2021).
35. Kurwadkar S., Dane J., Kanel S. R, Nadagouda M. N., Cawdrey R W., Ambade B., Struckhoff G. C., Wilkin R. Per- and polyfluoroalkyl substances in water and wastewater: A critical review of their global occurrence and distribution. Sci. Total Environ. 2022; 809:151003.
36. Duchesne, A. L.; Brown, J. K.; Patch, D. J.; Major, D.; Weber, K. P.; Gerhard, J. I. Remediation of PFAS-Contaminated Soil and Granular Activated Carbon by Smoldering Combustion. Environ. Sci. Technol. 2020, 54, 12631-12640.
37. Liu, C. J.; Werner, D.; Bellona, C. Removal of Per- and Polyfluoroalkyl Substances (PFASs) from Contaminated Groundwater using Granular Activated Carbon: a Pilot-Scale Study with Breakthrough Modeling. Environ. Sci. Water Res. Technol. 2019, 5, 1844-1853.
38. McCleaf, P.; Englund, S.; Ostlund, A.; Lindegren, K.; Wiberg, K.; Ahrens, L. Removal Efficiency of Multiple Poly- and Perfluoroalkyl Substances (PFASs) in Drinking Water using Granular Activated Carbon (GAC) and Anion Exchange (AE) Column Tests.Water Res. 2017, 120, 77-87.
39. Zaggia, A.; Conte, L.; Falletti, L.; Fant, M.; Chiorboli, A. Use of Strong Anion Exchange Resins for the Removal of Perfluoroalkylated Substances from Contaminated Drinking Water in Batch and Continuous Pilot Plants. Water Res. 2016, 91, 137-46.
40. Wang, F.; Shih, K. Adsorption of Perfluorooctanesulfonate (PFOS) and Perfluorooctanoate (PFOA) on Alumina: Influence of Solution pH and Cations. Water Res. 2011, 45, 2925-30.
41. Parida, S. K.; Dash, S.; Patel, S.; Mishra, B. K. Adsorption of Organic Molecules on Silica Surface. Adv. Colloid Interface Sci. 2006, 121, 77-110.

42. Tang, C. Y.; Shiang Fu, Q.; Gao, D.; Criddle, C. S.; Leckie, J. O. Effect of Solution Chemistry on the Adsorption of Perfluorooctane Sulfonate onto Mineral Surfaces. Water Res. 2010, 44, 2654-62.

43. Liu, Q.; Zhou, Y.; Lu, J.; Zhou, Y. Novel Cyclodextrin-based Adsorbents for Removing Pollutants from Wastewater: A Critical Review. Chemosphere 2020, 241, 125043.

44. Ching, C.; Klemes, M. J.; Trang, B.; Dichtel, W. R.; Helbling, D. E. Beta-Cyclodextrin Polymers with Different Cross-Linkers and Ion-Exchange Resins Exhibit Variable Adsorption of Anionic, Zwitterionic, and Nonionic PFASs. Environ. Sci. Technol. 2020, 54, 12693-12702.

45. Xiao, L.; Ling, Y.; Alsbaiee, A.; Li, C.; Helbling, D. E.; Dichtel, W. R. Beta-Cyclodextrin Polymer Network Sequesters Perfluorooctanoic Acid at Environmentally Relevant Concentrations. J. Am. Chem. Soc. 2017, 139, 7689-7692.

46. Aditya Choudhary and Dmitry Bedrov Interaction of Short-Chain PFAS with Polycationic Gels: How Much Fluorination is Necessary for Efficient Adsorption? ACS Macro Lett. 2022, 11, 9, 1123-1128.

47. Manning, I. M.; Chew, N. G. P.; Macdonald, H. P.; Miller, K. E.; Strynar, M. J.; Coronell, O.; Leibfarth, F. A. Hydrolytically Stable Ionic Fluorogels for High-Performance Remediation of Per- and Polyfluoroalkyl Substances (PFAS) from Natural Water. Angew. Chem., Int. Ed. 2022, 61, e202208150.

48. Sahu, S.; Clay, A.; Nguyen, M.; Wang, Y. Perfluorinated Anion Exchange Polymeric Materials for Remediation of Perfluoroalkyl Species and Beyond, Abstract of Papers, American Chemical Society National Meeting, Spring 2021, April 5-30.

49. Li, R.; Alomari, S.; Stanton, R.; Wasson, M. C.; Islamoglu, T.; Farha, O. K.; Holsen, T. M.; Thagard, S. M.; Trivedi, D. J.; Wriedt, M. Efficient Removal of Per- and Polyfluoroalkyl Substances from Water with Zirconium-Based Metal-Organic Frameworks. Chem. Mater. 2021, 33, 3276-3285.

50. Elika Karbassiyazdi, Medha Kasula, Sweta Modak, Jasneet Pala, Mohammad Kalantari, Ali Altaee, Milad Rabbani Esfahani, Amir Razmjou, A juxtaposed review on adsorptive removal of PFAS by metal-organic frameworks (MOFs) with carbon-based materials, ion exchange resins, and polymer adsorbents, Chemosphere, 2023, 311, 136933.

51. Wei Wang, Ziming Zhou, Haipei Shao, Shuangxi Zhou, Gang Yu, Shubo Deng, Cationic covalent organic framework for efficient removal of PFOA substitutes from aqueous solution, Chemical Engineering Journal 2021, 412, 127509.

52. Kevin J. T. Noonan, Kristina M. Hugar, Henry A. Kostalik, IV, Emil B. Lobkovsky, Hdctor D. Abrufna, and Geoffrey W. Coates Phosphonium-Functionalized Polyethylene: A New Class of Base-Stable Alkaline Anion Exchange Membranes J. Am. Chem. Soc. 2012, 134,44, 18161-18164.

53. Wang, Y.; Wang, Y.; Sahu, S.; Gallo, A. A.; Zhou, X.-D. Efficient Synthesis of High-Performance Anion Exchange Membranes by Applying Clickable Tetrakis(dialkylamino)phosphonium Cations. Polymers 2023, 15, 352. https://doi.org/10.3390/polym15020352.

54. Gérald Lopez, Bruno Améduri, Jean-Pierre Habas A perfluoropolyether-based elastomers library with on-demand thermorheological features European Polymer Journal Volume 95, October 2017, Pages 207-215.

55. Yong-Seok Choi, Na Kyung Kim, Hyo Kang, Hyun-Ki Jang, Myungkyung Noh, Jinseok Kim, Da-Jung Shon, Byung-Soo Kim and Jong-Chan Lee Antibacterial and biocompatible ABA-triblock copolymers containing perfluoropolyether and plant-based cardanol for versatile coating applications RSC Adv., 2017, 7, 38091-38099.

56. Howell, J. L.; Perez, E. W.; Waterfeld, A.; Friesen, C. M.; Thrasher, J. S. Thermally Stable Perfluoropolyethers and Processes Therefore and Therewith. US Patent U.S. Pat. No. 6,753,301 B2, 2001.

57. Mark E. Wilson, Kolja Paech, Wen-Jing Zhou, and Mark J. Kurth, Solvent and Reagent Accessibility within Oligo (ethylene glycol) Ether [PEG] Cross-Linked Polystyrene Beads J. Org. Chem. 1998, 63, 5094-5099.

58. Yajnaseni Biswas, Tanmoy Maji, Madhab Dule and Tarun K. Mandal, Tunable doubly responsive UCST-type phosphonium poly(ionic liquid): a thermosensitive dispersant for carbon nanotubes Polym. Chem., 2016, 7, 867-877.

59. Goss, K.-U. The pKa values of PFOA and other highly fluorinated carboxylic Acids. Environ. Sci. Technol. 2008, 42, 456-458.

60. Cheng, J.; Psillakis, E.; Hoffmann, M. R.; Colussi, A. J. Acid dissociation versus molecular association of perfluoroalkyl oxoacids: Environmental implications. J. Phys. Chem. A 2009, 113, 8152-8156.

61. Aubrey L. Hillman & Scott St. Romain Lake Martin, Louisiana sediments as a record of geomorphology, paleoenvironment, and human activities *J Paleolimnol* (2020) 64:91-105.

What is claimed is:

1. A method for at least partially removing one or more perfluoroalkyl or polyfluoroalkyl substances from a mixture containing the one or more perfluoroalkyl or polyfluoroalkyl substance, the method comprising:

contacting a mixture containing one or more perfluoroalkyl or polyfluoroalkyl substances with a styrenic fluoropolymer comprising a formula:

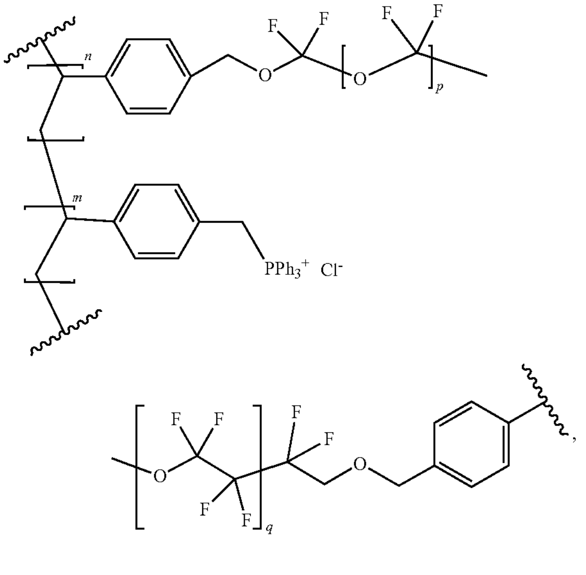

wherein m, n, p, and q are independently selected from an integer from 1 to 1000; and separating the styrenic fluoropolymer from the mixture after the content of the one or more perfluoroalkyl or polyfluoroalkyl substances has been reduced.

2. The method of claim 1, wherein m, n, p, and q are independently selected from an integer from 1 to 100.

3. The method of claim 1, wherein m, n, p, and q are independently selected from an integer from 5 to 20.

4. The method of claim 1, wherein the mixture containing one or more perfluoroalkyl or polyfluoroalkyl substances is an aqueous mixture.

5. The method of claim 1, wherein the mixture containing one or more perfluoroalkyl or polyfluoroalkyl substances is an aqueous mixture.

6. The method of claim 1, wherein the one or more perfluoroalkyl or polyfluoroalkyl substances is perfluorooctanoic acid.

7. The method of claim 1, wherein the one or more perfluoroalkyl or polyfluoroalkyl substances is perfluorooctane sulfonic acid.

* * * * *